US010545470B2

(12) United States Patent
Brandes et al.

(10) Patent No.: US 10,545,470 B2
(45) Date of Patent: Jan. 28, 2020

(54) CONFIGURABLE MODE MODEL

(71) Applicant: Rockwell Automation Technologies, Inc., Mayfield Heights, OH (US)

(72) Inventors: Russell W. Brandes, Brunswick, OH (US); Dale E. Reed, Cleveland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 61 days.

(21) Appl. No.: 15/809,789

(22) Filed: Nov. 10, 2017

(65) Prior Publication Data
US 2019/0146435 A1 May 16, 2019

(51) Int. Cl.
*G06F 3/00* (2006.01)
*G05B 19/042* (2006.01)
*G06F 9/54* (2006.01)

(52) U.S. Cl.
CPC ............ *G05B 19/042* (2013.01); *G06F 9/54* (2013.01); *G05B 2219/24177* (2013.01)

(58) Field of Classification Search
CPC ....................................................... G06F 9/54
USPC ......................................................... 719/310
See application file for complete search history.

(56) References Cited

U.S. PATENT DOCUMENTS

| 8,943,013 | B2 * | 1/2015 | Plache | G05B 19/045 |
| | | | | 370/392 |
| 9,715,221 | B2 * | 7/2017 | Zheng | G05B 17/02 |

| 2002/0116083 | A1 | 8/2002 | Schulze |
| 2003/0225697 | A1 | 12/2003 | DeTreville |
| 2004/0123172 | A1 | 6/2004 | Sheller |
| 2007/0283300 | A1 | 12/2007 | Fritz et al. |
| 2008/0010342 | A1 | 1/2008 | Gebhardt et al. |
| 2008/0126352 | A1 | 5/2008 | Case |
| 2011/0225289 | A1 | 9/2011 | Prasad et al. |

(Continued)

FOREIGN PATENT DOCUMENTS

CN    1490732    4/2004

OTHER PUBLICATIONS

Ljubo Mercep, Case Study on Implementing Future Human-Machine Interfaces. (Year: 2013).*

(Continued)

*Primary Examiner* — Lechi Truong
(74) *Attorney, Agent, or Firm* — Amin, Turocy & Watson, LLP

(57) ABSTRACT

An industrial control device allows end users to customize the mode model that defines rules for arbitrating between program and operator control. The industrial control device includes configuration tools that allow the user to define which set of states or modes are to be used for arbitrating between program control and operator control in accordance with the usages and standards of a given industrial facility or enterprise. The configuration tools also allow the commands for transitioning between the selected ownership states to be modified to conform to a desired ownership mode model. Using the mode model configuration tools, users can adapt the ownership mode model to conform to their own customer-specific or industry-specific standards of operator/program arbitration. In some scenarios, the customized mode model can be applied to defined multilevel equipment groupings such that control ownership is cascaded to all devices of a defined ownership chain.

20 Claims, 39 Drawing Sheets

(56) References Cited

U.S. PATENT DOCUMENTS

| | | |
|---|---|---|
| 2011/0270418 A1 | 11/2011 | Law et al. |
| 2011/0288830 A1 | 11/2011 | Garg et al. |
| 2012/0209968 A1 | 8/2012 | Lawson et al. |
| 2013/0080139 A1 | 3/2013 | Novaes |
| 2013/0132553 A1 | 5/2013 | Stratton et al. |
| 2014/0280528 A1* | 9/2014 | Brandes ............... G06F 15/177 709/204 |
| 2018/0149010 A1* | 5/2018 | Zheng ................... E21B 44/00 |

OTHER PUBLICATIONS

Van Der Linden. et al. "Towards evolvable state machines for automation systems", ICONS 2013: The Eighth International Conference on Systems, Jan. 27-Feb. 1, 2013—Seville, Spain. Copyright IARIA, 2013. ISBN: 978-1-61208-246-2. pp. 148-153.

Office Action for U.S. Appl. No. 13/797,618 dated May 7, 2015, 29 pages.

Final Office Action for U.S. Appl. No. 13/797,618 dated Oct. 13, 2015, 25 pages.

Office Action for U.S. Appl. No. 13/797,618 dated Apr. 28, 2016, 31 pages.

Chinese Office Action dated Apr. 6, 2016 for Chinese Application No. 201410085536.8, 17 pages (with translation).

Final Office Action for U.S. Appl. No. 13/797,618 dated Nov. 16, 2016, 32 pages.

\* cited by examiner

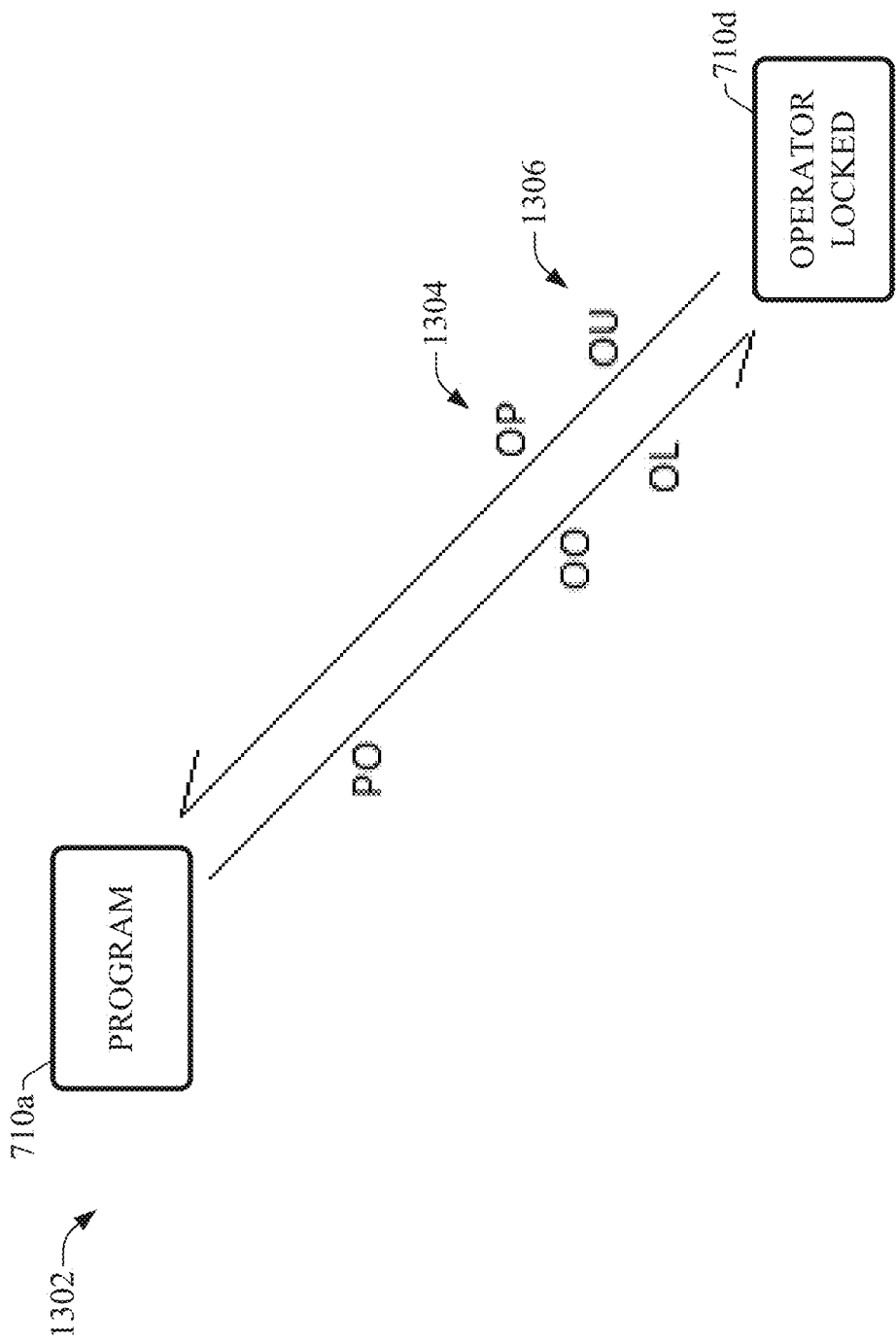

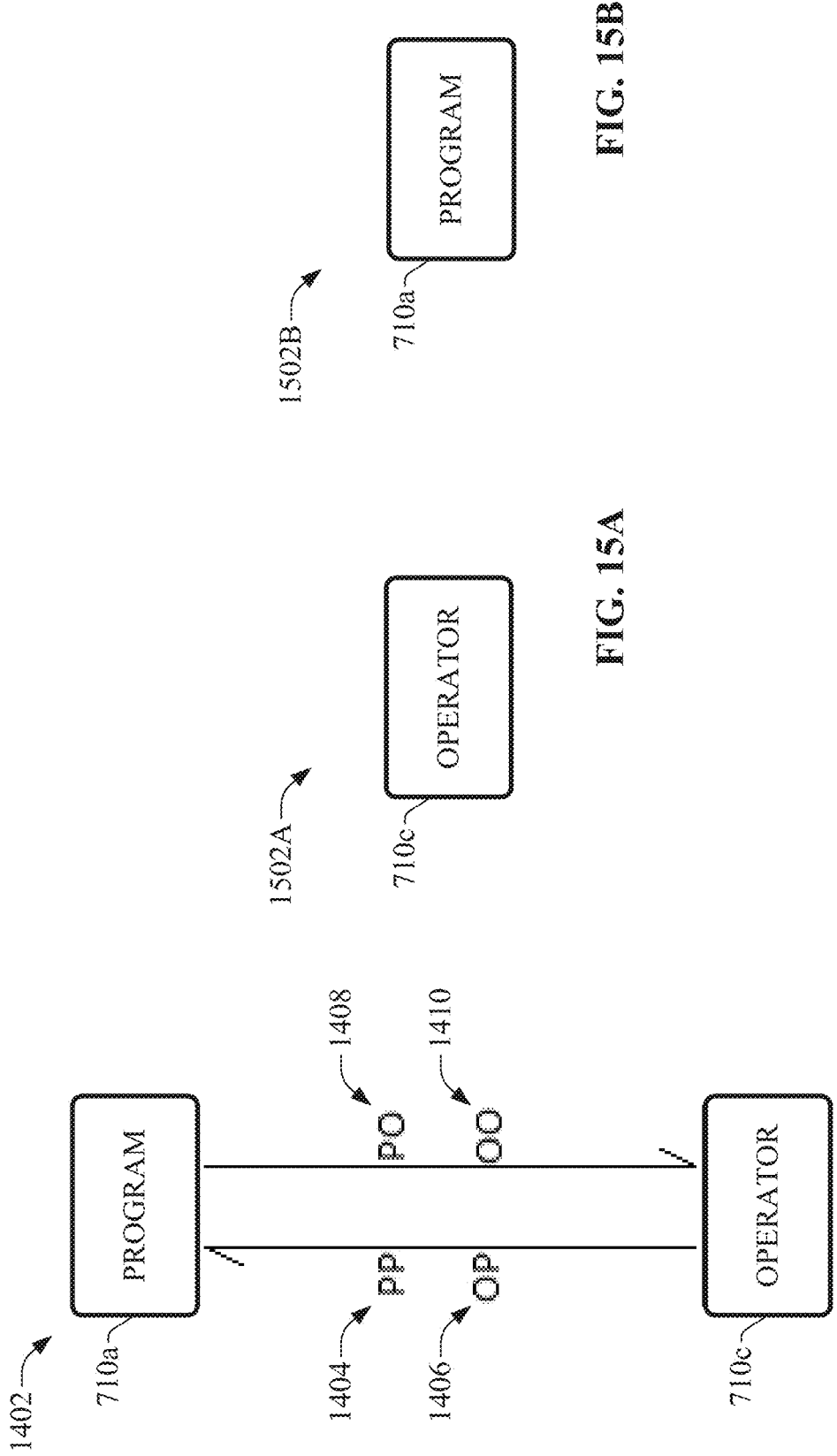

CONFIGURABLE MODE MODEL

BACKGROUND

The subject matter disclosed herein relates generally to industrial automation systems, and, more particularly, to programmatic ownership arbitration within industrial control devices.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an industrial controller is provided, comprising a client interface component configured to exchange data with a configuration application that executes on a client device; a program execution component configured to execute an industrial control program; an arbitration component configured to arbitrate between program requests for control of a portion of the industrial control program and operator requests for control of the portion of the industrial control program based on arbitration rules defined by mode model data; and a mode model configuration component configured to modify the mode model data in accordance with mode modal configuration data received via the client interface component.

Also, according to one or more embodiments, a method for configuring ownership arbitration for an industrial control system is provided, comprising receiving, by an industrial controller comprising a processor, mode model configuration input defining a modification to a default mode model used by the industrial controller to arbitrate program requests and operator requests for control of an aspect of an industrial control program executed by the industrial controller; modifying, by the industrial controller, the mode model in accordance with the mode model configuration input to yield a modified mode model; receiving, by the industrial controller, one of a program request or an operator request for control of the aspect of the industrial control program; and arbitrating, by the industrial controller, the one of the program request or the operator request based on the modified mode model.

Also, a non-transitory computer-readable medium is provided having stored thereon executable instructions that, in response to execution, cause a, industrial controller comprising a processor to perform operations, the operations comprising in response to receiving mode model configuration data defining a change to a default ownership mode model, modifying the default ownership mode model in accordance with the mode model configuration data to yield a modified ownership mode model; and arbitrating, based on the modified ownership mode model, between program ownership requests for a portion of an industrial control program executed by the industrial controller and operator ownership requests for the portion of the industrial control program.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 13 is a diagram illustrating an example mode model configuration in which operator access is predominant.

FIG. 14 is a diagram illustrating an example mode model configuration that disallows locked control.

FIG. 15A is a diagram illustrating an example mode model configuration in which the operator has sole access and control privileges at all times.

FIG. 15B is a diagram illustrating an example mode model configuration in which the program has sole access and control privileges at all times.

DETAILED DESCRIPTION

Figure 1:
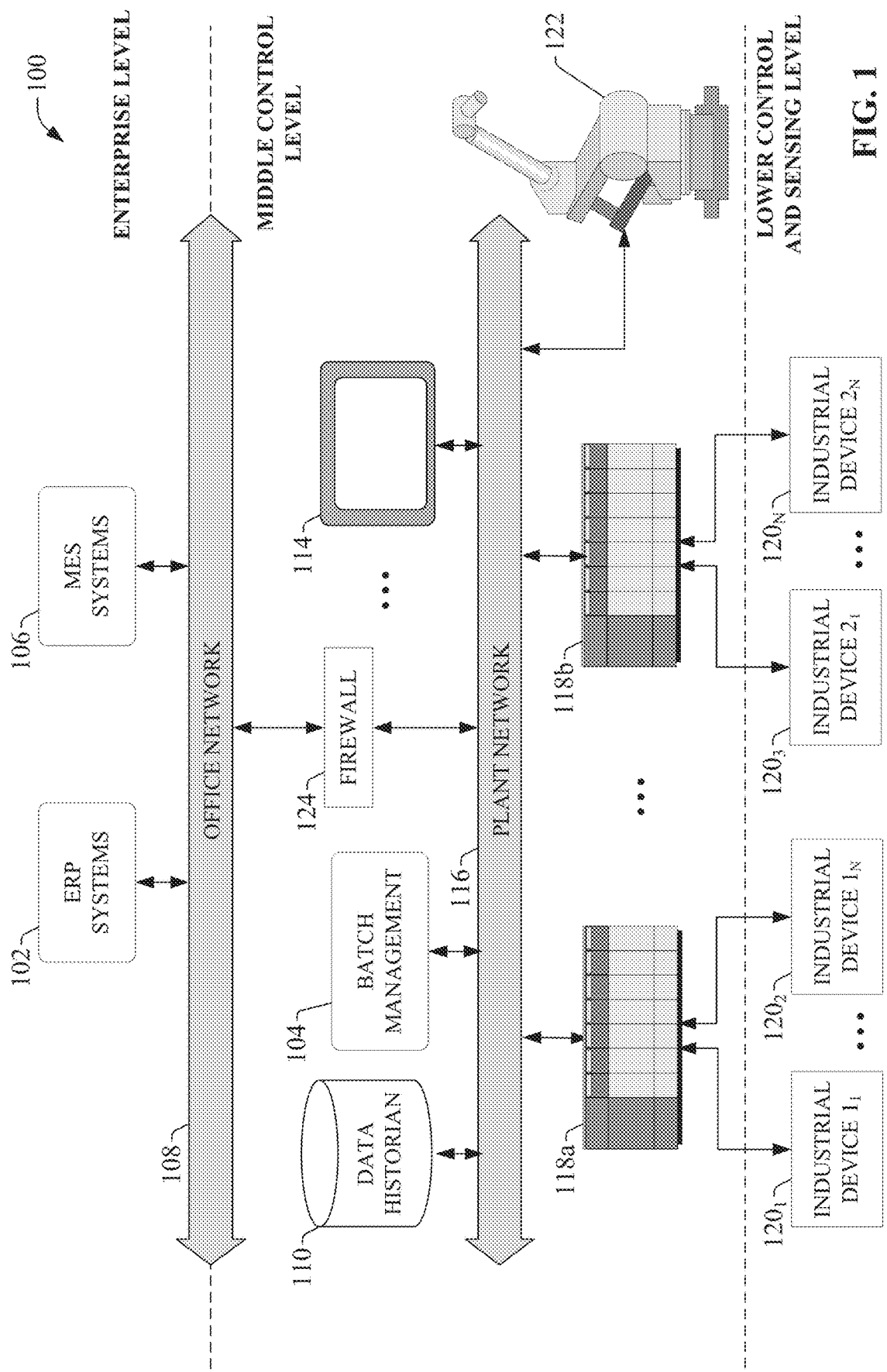
FIG. 1 is a diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100, comprising diverse industrial devices and assets. In this example, industrial controllers 118 are deployed throughout an industrial plant environment to monitor and control respective industrial systems or processes relating to product manufacture, machining, motion control, batch processing, material handling, or other such industrial functions. Industrial controllers 118 execute respective control programs to facilitate monitoring and control of industrial devices 120 making up the controlled industrial systems. The control programs executed by industrial controllers 118 can comprise any conceivable type of code used to process input signals read from the industrial devices 120 and to control output signals generated by the industrial controllers and directed to the industrial devices 120, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic or hydraulic actuators, signaling devices, robot controllers, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Example networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer.

Other industrial devices or assets can include industrial robots 122, which may operate in accordance with programs executed by their own internal controllers, in conjunction with information exchanged with one or more external controllers (e.g., industrial controllers 118). Some industrial environments may also include a number of sub-systems that perform various production, quality, or safety functions, including but not limited to vision systems, safety systems (e.g., optical presence sensing systems, safety relay systems, etc.), product quality check systems (e.g., leak test systems), or other such assets.

Some industrial environments may also include one or more data historians 110 that aggregate and store production information collected from the industrial controllers 118 or other data sources, or a device documentation store containing electronic documentation for the various industrial devices making up the controlled industrial systems. Other industrial devices or assets may include enterprise resource planning (ERP) systems 102, manufacturing execution systems (MES) 106, batch management systems 104 that perform supervisory control of one or more industrial controllers 118 in connection with performing batch processes, or other such assets, some or all of which may reside on an office network 108 of the industrial environment (e.g., a separately managed network relative to plant network 116). The industrial network environment may also include a number of network architecture devices—such as firewall 124, hubs, routers, or switches—that connect separate networks and/or networked devices and manage data flow between the various devices and networks.

Figure 2:
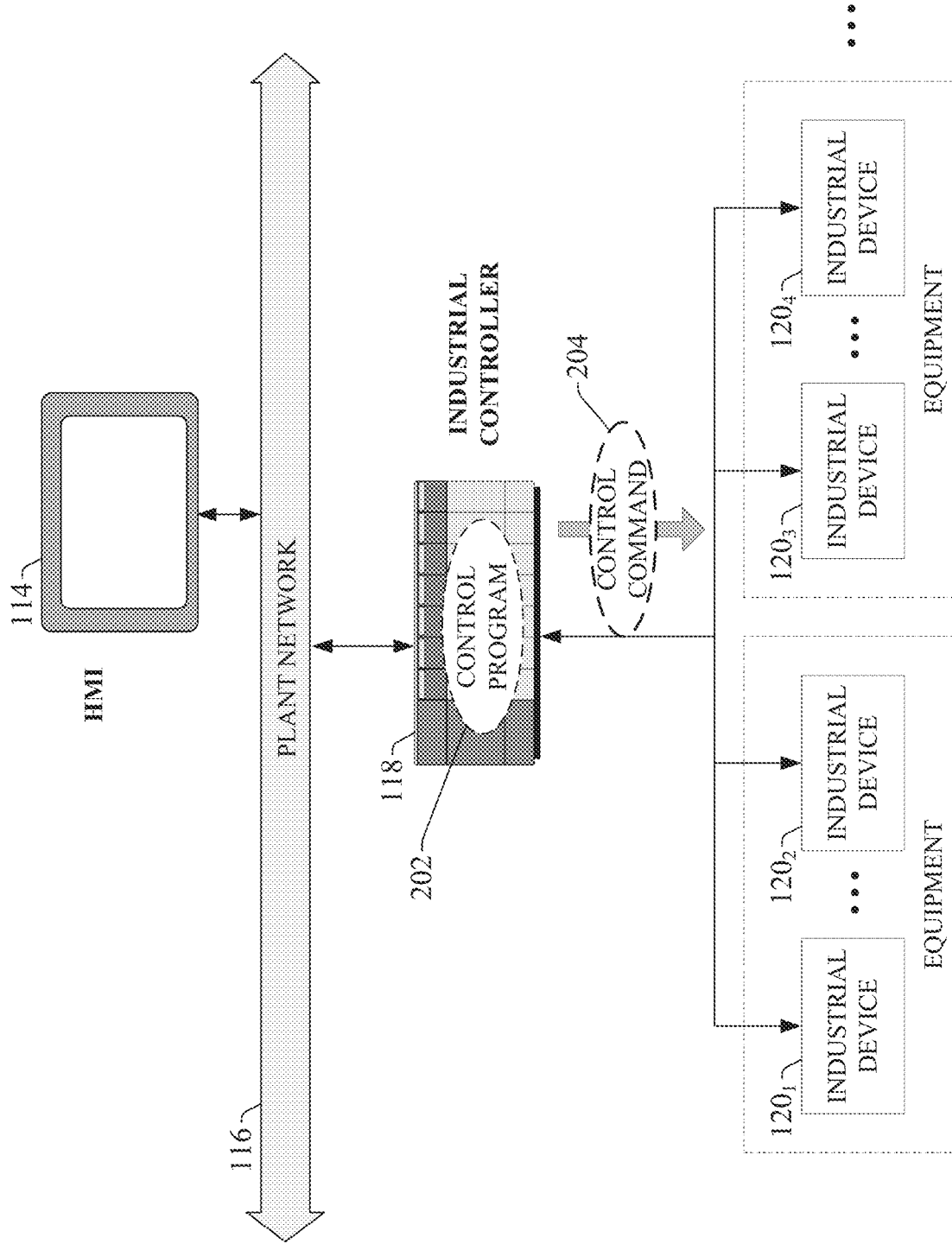
FIG. 2 is a diagram illustrating a control command initiated by the control program of an industrial controller.

Some industrial controllers include functionality that arbitrates whether the program or the operator has control of an industrial device or item of industrial equipment. FIG. 2 is a diagram illustrating a control command 204 initiated by the control program 202 of an industrial controller 118. As noted above, industrial controller 118 executes a control program 202—e.g., a ladder logic program, a sequential function chart program, etc.—that processes digital and analog input signals received from one or more of the industrial devices 120 of a controlled industrial automation system or process, and generates digital or analog outputs directed to one or more of the industrial devices 120 in accordance with user-defined control sequences defined by the control program 202. Example output signals, represented as control command 204 in FIG. 2, can include start commands directed to a pump or other piece of equipment, analog speed or position control outputs directed to a motor drive or other motion device, commands to move a pneumatic actuating device (e.g., a pusher arm, a conveyor stopper, a clamp, etc.), a command to open or close a valve, or other such command outputs. Industrial controller 118 will issue control commands 204 generated by the control program 202 if the control program 202—rather than an operator—currently has permission to issue such control commands 204.

Figure 3:
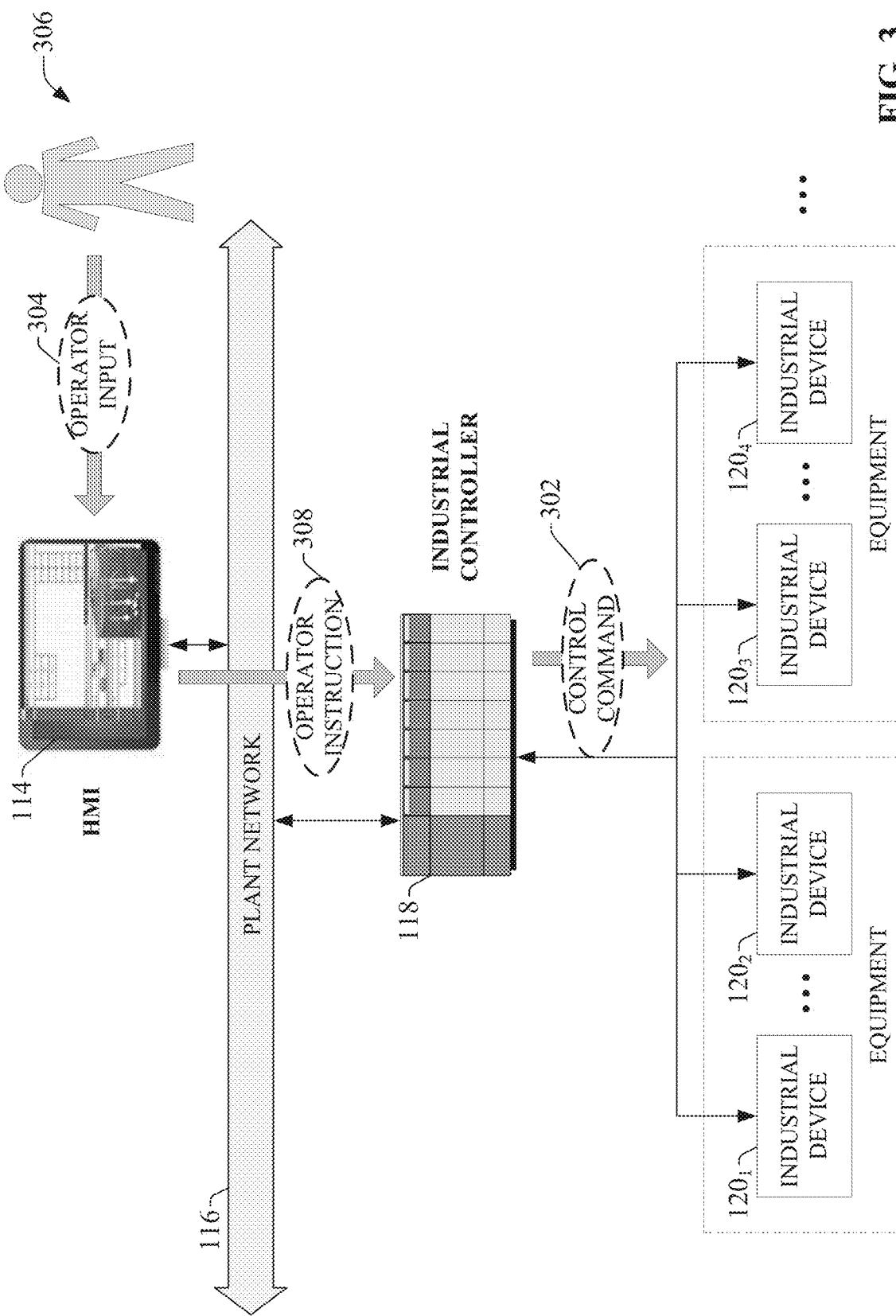
FIG. 3 is a diagram illustrating a control command initiated by an operator via and HMI.

FIG. 3 is a diagram illustrating a control command 302 initiated by an operator 306 via HMI 114. In this example, operator 306 has submitted operator input 304 via interaction with an interface screen rendered by HMI 114. The operator input may be, for example, a setpoint modification (e.g., a change to a speed, position, or level setpoint), a start or stop command, or other such inputs. In response, HMI 114 relays the operator's command input as an operator instruction 308 to industrial controller 118 via network 116 (e.g., a plant network on which the industrial controller 118 and HMI 114 reside, or a direct connection between the controller 118 and HMI 114). Provided the operator has permission to issue commands to the industrial devices or equipment, the industrial controller 118 will issue the control command 302 corresponding to the operator input 304 to the appropriate industrial device 120.

Figure 4:
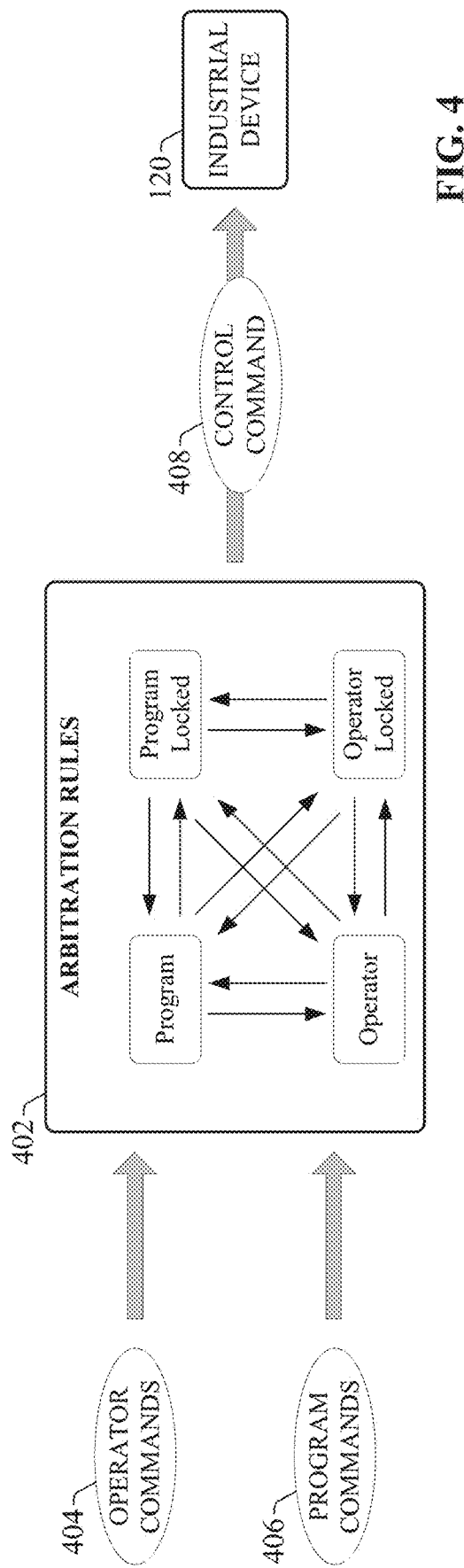
FIG. 4 is a diagram illustrating arbitration between operator control and program control using fixed arbitration rules.

Typically, the rules defining how the control system transfers control privileges between the program (program control) and the operator (operator control) are based on a fixed rule set or a state machine definition. FIG. 4 is a diagram illustrating arbitration between operator control and program control using fixed arbitration rules 402. Arbitration rules 402, which may be defined in an industrial controller's process library or firmware, define four available modes or states—Program, Program Locked, Operator, and Operator Locked—and the conditions for transferring between these four modes. Some arbitration rules 402 may define more or fewer than these four states. Program mode allows the control program 202 to access and issue commands to the relevant programmatic object (e.g., e.g., a function block, group of function blocks, or other programmatic entity representing an industrial device or system), and also allows the operator to acquire control at any time. Program Locked mode grants the program locked or uninterruptable control access to the object, such that the operator cannot acquire control until the program has released locked control. This mode may be initiated, for example, when the program is currently controlling a sequence of an industrial process that must not be interrupted by acquisition of operator control (except in the case of an emergency safety situation). Operator mode allows the operator—via interaction with an HMI or other type of user interface—to access and issue commands to the object, while also allowing the program to acquire control at any time as needed. Operator Locked mode grants the operator locked or uninterruptable control privilege, such that the program cannot acquire control until the operator has released locked control. This mode may be initiated, for example, to prevent automated program control while personnel are performing a maintenance operation on a controlled machine or system.

When an operator-originating command 404 (e.g., issued via an HMI, faceplate, or other user interface) or a program-originating command 406 is received at or received by the industrial controller, the current ownership mode determines whether the generated or received command is issued to an industrial device 120 as a control command 408. For example, if the system is currently in the Program Locked state, program commands 406 will be allowed to issue as control commands 408, but operator commands 404 will be ignored until the program releases locked control. Likewise, the Operator Locked state allows operator commands 404 to be issued as control commands 408, but prevents program commands 406 from being issued until the operator releases locked control. The Program state allows program commands 406 to be issued, while also allowing transitions to the Operator state at any time so that operator commands 404 can be issued. Similarly, the Operator state allows operator commands 404 to be issued, while also allowing the program to take control at any time so that program commands 406 can be issued.

Arbitration rules 402 define the available control states or modes (e.g., Program, Operator, Program Locked, and/or Operator Locked) as well as the commands available to the operator and the program for requesting transfers between these control states. These arbitration rules 402 are typically fixed, and may vary between control equipment vendors. However, the arbitration rules offered by a given vendor may not conform to the coding practices or standards of a given user or industry in terms of the command structures that are used. Often, control equipment vendors will define the control states and transition commands in a manner assumed to satisfy a majority of their customers. Consequently, end users must either compromise their standards by adapting to the arbitration standards offered by a chosen vendor, or generate custom code around the limitations of the vendor's arbitration standard in order to accommodate the user's own individual standard.

To address these and other issues, one or more embodiments described herein provide industrial devices that allow end users to customize the mode model that defines rules for arbitration between program and operator control. In one or more embodiments, an industrial controller or another control device includes configuration capabilities that allow the user to define which set of states or modes (e.g., Program, Operator, Program Locked, and/or Operator Locked) are to be used for arbitrating between program control and operator control, in accordance with usages and standards of a given industrial facility or enterprise. The configuration functions can also adapt the command set for transitioning between the defined states in accordance with the states selected by the user, and also allow the user to further customize these command sets to conform to a desired mode model. By offering industrial controllers that support a maximal set of mode states that may be desired by potential end users and granting the ability to tailor this available set of allowable states, a given industrial controller can accommodate all possible user configurations. Using the mode model configuration capabilities, users can adapt the mode model to conform to their own customer-specific or industry-specific standards of operator/program arbitration, rather than forcing end users to adapt to a fixed vendor-defined mode model.

Figure 5:
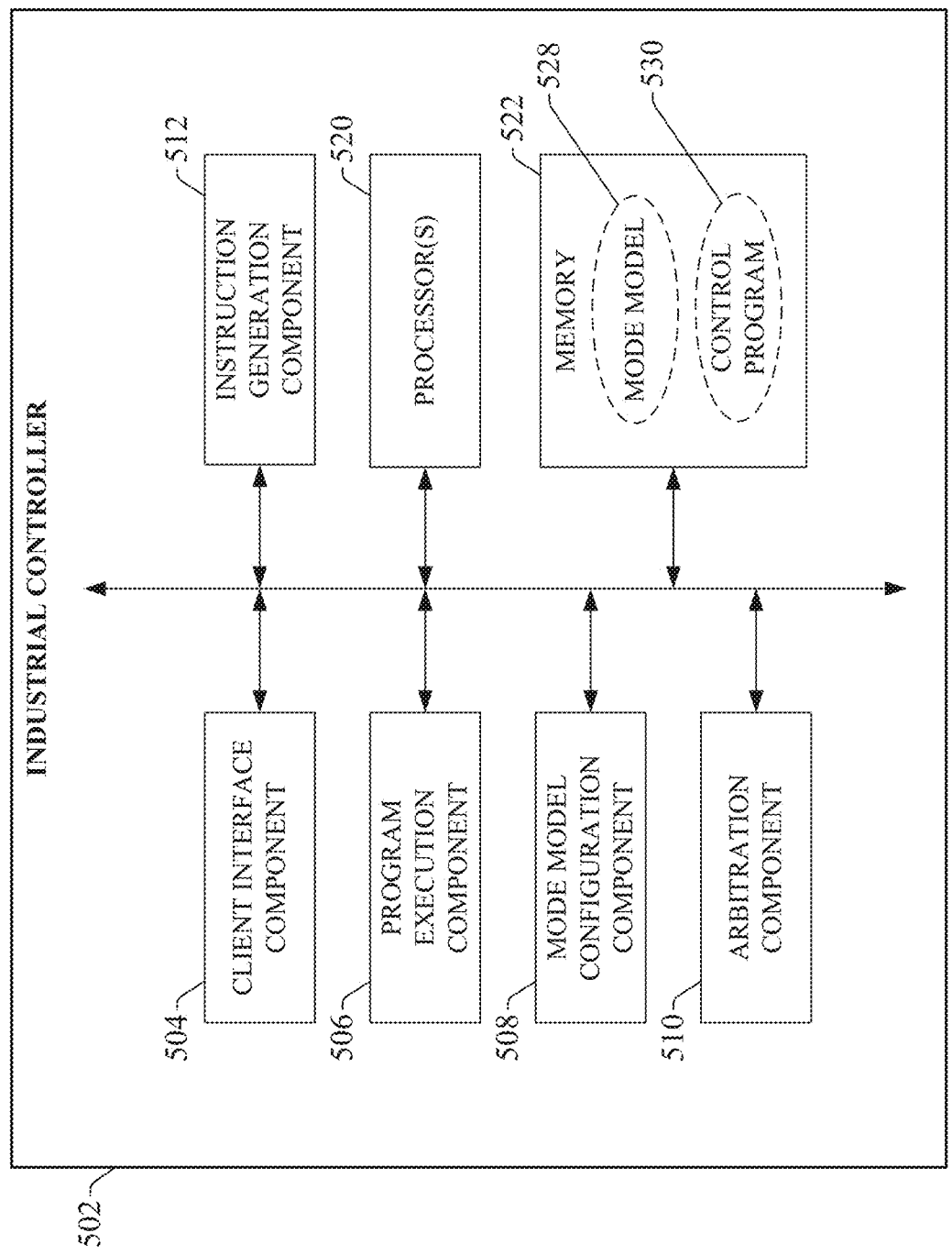
FIG. 5 is a block diagram of an example industrial controller that supports user-configuration of mode model data.

FIG. 5 is a block diagram of an example industrial controller 502 that supports user-configuration of mode model data 528. Although examples described herein depict the mode model configuration features as being embodied on an industrial controller 502, the mode model configuration functionality can also be embodied in other types of industrial devices that support arbitration between program and operator control of an industrial device, system, or asset. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial controller 502 can include a client interface component 504, a program execution component 506, a mode model configuration component 508, an arbitration component 510, an instruction generation component 512, one or more processors 520, and memory 522. In various embodiments, one or more of the client interface component 504, program execution component 506, mode model configuration component 508, arbitration component 510, instruction generation component 512, the one or more processors 520, and memory 522 can be electrically and/or communicatively coupled to one another to perform one or more of the functions of the industrial controller 502. In some embodiments, components 504, 506, 508, 510, and 512 can comprise software instructions stored on memory 522 and executed by processor(s) 520. Industrial controller 502 may also interact with other hardware and/or software components not depicted in FIG. 5. For example, processor(s) 520 may interact with one or more external user interface devices, such as a keyboard, a mouse, a display monitor, a touchscreen, or other such interface devices.

Client interface component 504 can be configured to exchange data with a client device interfaced with the industrial controller 502, such as a desktop, laptop, or tablet computer; a mobile device such as a smart phone; or other such client device. As will be described in more detail below, connectivity between the client device and industrial controller 502 can allow a user to define the control program 530 (e.g., ladder logic or other type of industrial control program) to be executed by the processor 520, as well as to define the states and transition commands for the mode model to be used as the basis for arbitration between program and operator control.

Program execution component 506 can be configured to execute a control program 530 (e.g., a ladder logic program, a sequential function chart program, etc.) stored on the industrial controller's memory 522 to facilitate monitoring and control of an industrial process via the industrial controller's digital and/or analog I/O. Mode model configuration component 508 can be configured to generate and display, via client interface component 504, configuration interface displays on a client device, and to define mode model data 528 based on mode model configuration input received via interaction with the interface displays. During runtime, the resulting mode model data 528 is used to arbitrate between operator and program control of an industrial system, device, or process. Arbitration component 510 can be configured to regulate transition between program control and operator control during runtime in accordance with the mode model data 528.

Instruction generation component 512 can be configured to compile state machine configuration data entered by the user (e.g., via client interface component 504) to generate an executable state machine instruction. The one or more processors 520 can perform one or more of the functions described herein with reference to the systems and/or methods disclosed. Memory 522 can be a computer-readable storage medium storing computer-executable instructions and/or information for performing the functions described herein with reference to the systems and/or methods disclosed.

Figure 6:
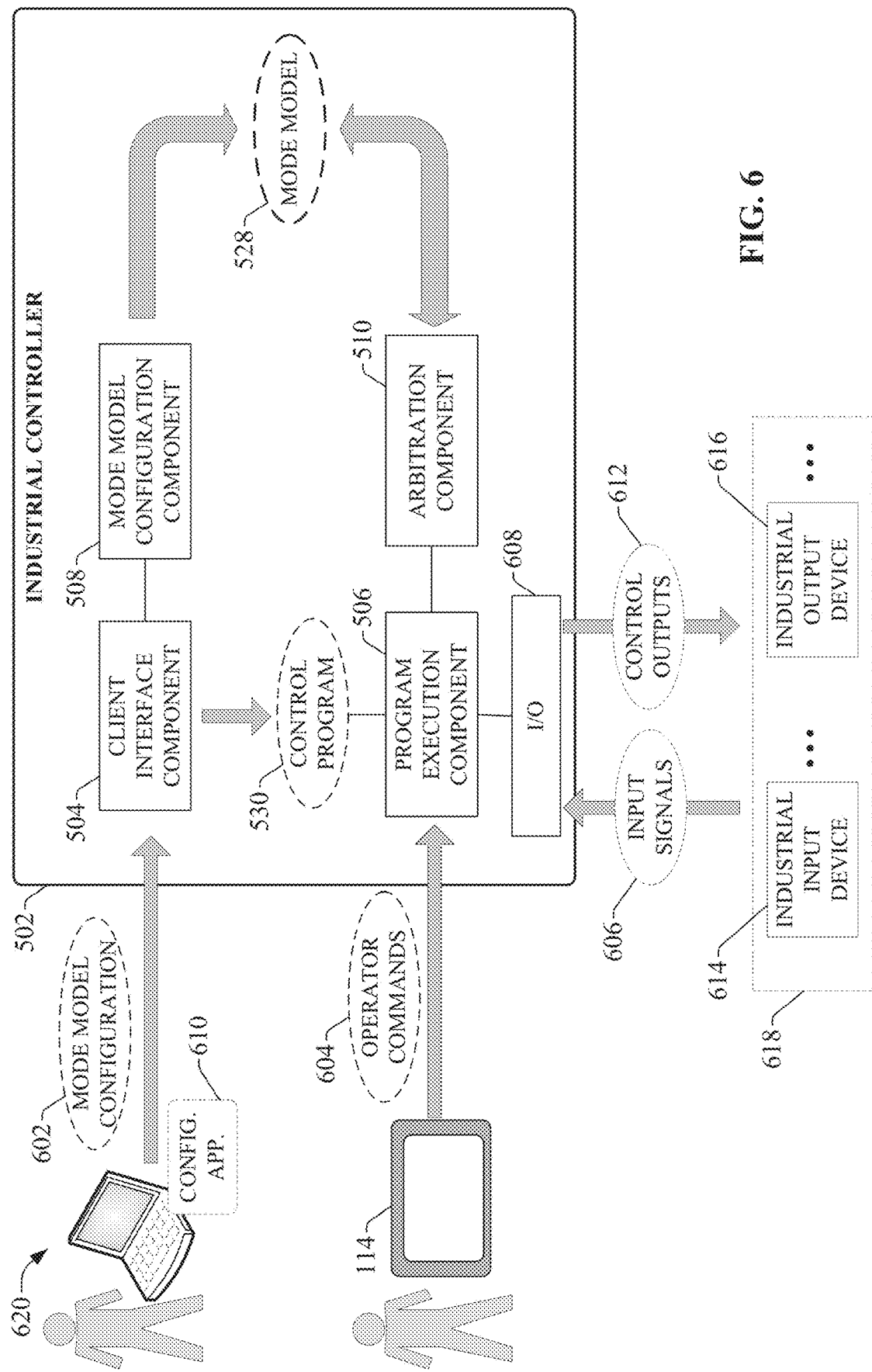
FIG. 6 is a diagram illustrating generalized data flows for customizing and using mode model data for arbitration between program- and operator-issued control commands on industrial controller.

FIG. 6 is a diagram illustrating generalized data flows for customizing and using mode model data 528 for arbitration between program- and operator-issued control commands on industrial controller 502. Although the example illustrated in FIG. 6 depicts the mode model configuration aspects as being implemented on an industrial controller 502 (e.g., a PLC or other type of industrial controller), the mode model configuration aspects described herein can also be implemented on other types of industrial control devices or systems that support arbitration between operator commands and program commands, including but not limited to motor drives, batch management systems, etc. Industrial controller 502 includes a program execution component 506 that executes a user-defined control program 530, which may be a ladder logic program, a sequential function chart program, structured text, a function block diagram, or another type of control program. In an example implementation, the user's client device 610 (e.g., laptop computer, desktop computer, tablet computer, personal mobile device, etc.) can execute a controller configuration application 610 used to develop and download control program 530 to the industrial controller 502 (e.g., to the controller's processor module), as well as to configure other functional aspects of the controller (e.g., networking or communication settings, I/O module definitions, data ranges for analog inputs and outputs, etc.).

To facilitate monitoring and control of an industrial machine, system, or process 618 during runtime, industrial controller 502 receives input signals 606 from one or more industrial input devices 614 (e.g., sensors, telemetry devices, etc.) via the controller's analog and/or digital I/O 608, and program execution component 506 generates analog and/or digital control outputs 612 directed to one or more industrial output devices 616 (e.g., actuators, motor drives, contactors, indicator lights, etc.) based on values of the input signals 606 and control sequences defined by the control program 530. Control outputs 612 can also be initiated in response to operator commands 604 received via an HMI 114 or other type of user interface or faceplate (e.g., the user controls of a motor drive).

During runtime, arbitration component 510 decides whether commands generated by the control program 530 or received by an operator (e.g., via HMI 114) will be issued to the industrial output devices 616 as control outputs based on whether the program or operator currently has control of the system. In particular, arbitration component 510 regulates or gates control outputs 612 based on a determination of whether the control system is currently in Operator, Program, Operator Locked, or Program Locked mode. Transition between these modes or states is determined by mode model data 528, which defines the available modes as well as the commands or conditions for transitioning between these states.

According to one or more embodiments, mode model data 528 can be configured by the end user to suit the needs of the user's control application, or to conform to the coding practices or standards used within the industrial facility. In an example embodiment, the mode model data 528 can be configured using the same configuration application 610 used to program the industrial controller 502. In such embodiments, configuration application 610 can include graphical interfaces that guide the user through the process of selecting from the available ownership modes and configuring the state transitions between the modes. In another example embodiment, client interface component 504 can be configured to generate and serve such graphical interfaces to a client device 620 communicatively connected to the industrial controller 502. In either case, the graphical interfaces generate and submit mode model configuration data 602 based on user interactions with the interfaces, and mode model configuration component 508 configures mode model data 528 based on the configuration data 602 submitted by the user.

Some example graphical interfaces can be configured to allow the user to select one of several pre-defined mode models; e.g., a mode model that most closely conforms to the user's programming standards for operator/program arbitration. For example, the graphical interfaces may render a number of selectable buttons that respectively correspond to pre-defined arbitration mode models, where selection of a button corresponding to a pre-defined mode model and subsequent compiling of the configuration causes the selected pre-defined mode model to be used for arbitration within the industrial controller 502. Some such embodiments can also allow the user to make further modifications to a selected one of the pre-defined mode models. For example, the user may select a pre-defined mode model that most closely matches the user's in-house arbitration programming standard, and proceed to modify the selected mode model—e.g., by adding or removing arbitration states, by modifying the transition commands used to transition between the states, etc.—via interaction with the interface (e.g., via interaction with a state machine representation of the selected mode model). In general, any suitable interface that allows the user to select which arbitration states will be used by an industrial control system, as well as to configure conditions for transitioning between the selected states, is within the scope of one or more embodiments of this disclosure.

FIGS. 7-26 illustrate mode model diagrams representing example ownership mode models that can be selected as the basis for ownership arbitration in industrial controller 502. One or more of these illustrated mode model configurations can serve as the selectable pre-defined mode models described above. It is to be appreciated, however, that these mode models are only intended to be exemplary, and that other mode model configurations are within the scope of one or more embodiments of this disclosure.

Figure 7:
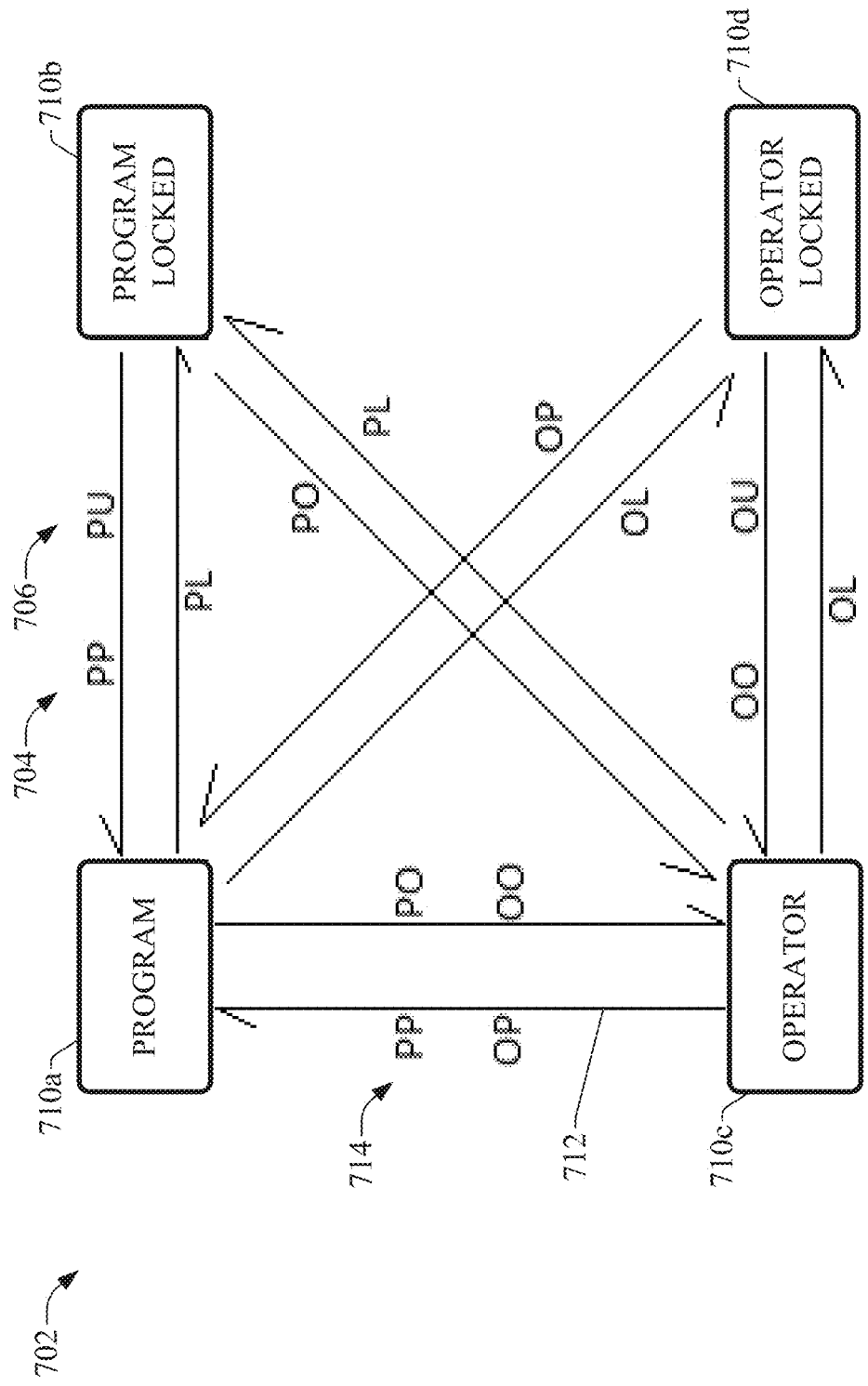
FIG. 7 is a diagram illustrating an example default mode model configuration.

FIG. 7 is a diagram illustrating an example default mode model configuration 702. In general, a user-defined ownership mode model configuration defines the available ownership states for the mode model, as well as the transition commands for transitioning between the defined states. The default mode model configuration depicted in FIG. 7 comprises four available ownership states—Program 710a, Program Locked 710b, Operator 710c, and Operator Locked 710d. These ownership modes are described above in connection with FIG. 4. The arrows 712 between the states 710 represents a transition from one state to another, and the command abbreviations 714 (e.g., PP, OP, etc.) associated with each arrow 712 represent one or more commands that initiate the transition represented by the arrow 712.

Abbreviations for transition commands used in the figures are summarized as follows:
 OO—The Operator requests access to the object
 OP—The Operator requests to situate the object for program access
 OL—The Operator requests uninterruptable access to the object
 OU—The Operator requests removal of uninterruptable access to the object
 PP—The Program requests access to the object
 PO—The Program requests to situate the object for operator access
 PL—The Program requests uninterruptable access to the object
 PU—The Program requests removal of uninterruptable access to the object Accordingly, with reference to example default ownership mode model configuration 702, if the system is currently in Operator mode 710c, whereby the operator currently has control ownership of a programmatic object, the system will transition to Program mode 710a if the program requests access to the object (by setting the PP transition command or bit) and the operator releases control by situating the object for program access (by setting the OP transition command or bit). In the reverse direction, if the system is in Program mode, setting the OO and PO commands (the operator requests access and the program situates the object for operator access, respectively) causes the system to transition to Operator mode. Conditions for transitioning between the other states are similarly determined as depicted in FIG. 7.

In the default ownership mode model illustrated in FIG. 7, all four available states (Program, Program Locked, Operator, and Operator Locked) are used, and all available commands for transitioning between the states are available. Bi-directional transitions between any two of the states are possible, with the exception of direct transitions between Program Locked mode and Operator Locked mode. Each transition direction (represented by an arrow) between any two of the states has a corresponding command or set of commands that initiate that transition For example, as indicated by the arrows between Program mode 710a and Operator mode 710c, if the system is currently in Operator mode 710c, the system will transition to Program mode 710a if the program requests access to the object (by setting the PP transition command or bit) and the operator releases control by situating the object for program access (by setting the OP transition command or bit). In the reverse direction, if the system is in Program mode, setting the OO and PO commands (the operator requests access and the program situates the object for operator access, respectively) causes the system to transition to Operator mode. Conditions for transitioning between the other states are similarly determined as depicted in FIG. 7.

Figure 8:
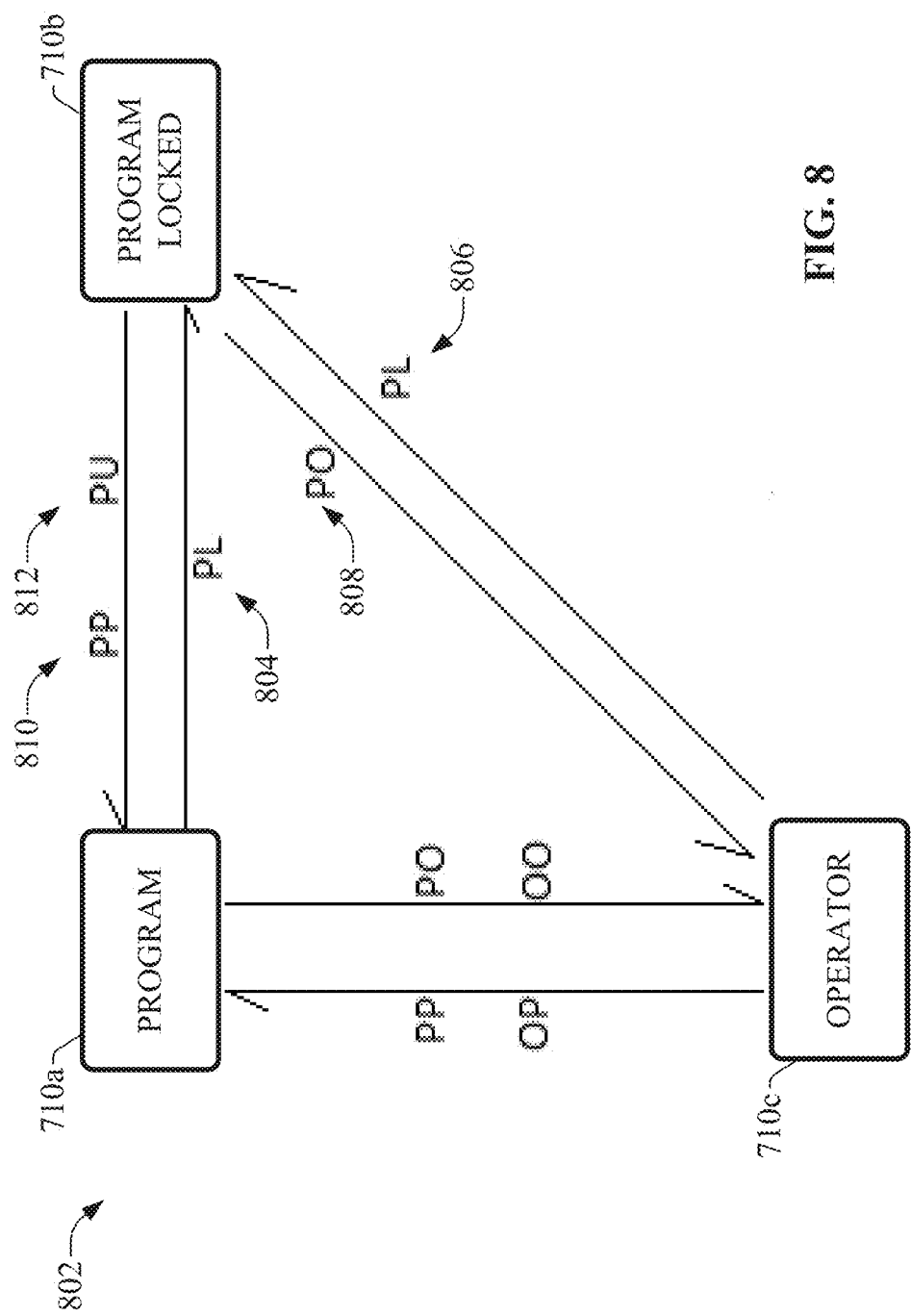
FIG. 8 is a diagram illustrating an example mode model configuration in which program access is the intended relaxed state.

FIG. 8 is a diagram illustrating an example mode model configuration 802 in which program access is the intended relaxed state. That is, operator control will be allowed if and when the program is disinterested in accessing and controlling the target object, and the program can obtain access from the operator at any time. Accordingly, mode model configuration 802 disables the Operator Locked state, and only the Program, Program Locked, and Operator states are used. Setting the PL command at any time will cause the system to transition to Program Locked mode regardless of the current ownership mode (as indicated by commands 804 and 806 and their associated transition arrows). The program can release uninterruptable (locked) access to the object and transfer control to the operator by setting the PO command 808 (situate object for operator control), or transfer control to interruptible program control by setting the PP command 810 and the PU command 812. In this configuration, direct transitions between any two of the three available modes is permitted.

Figure 9:
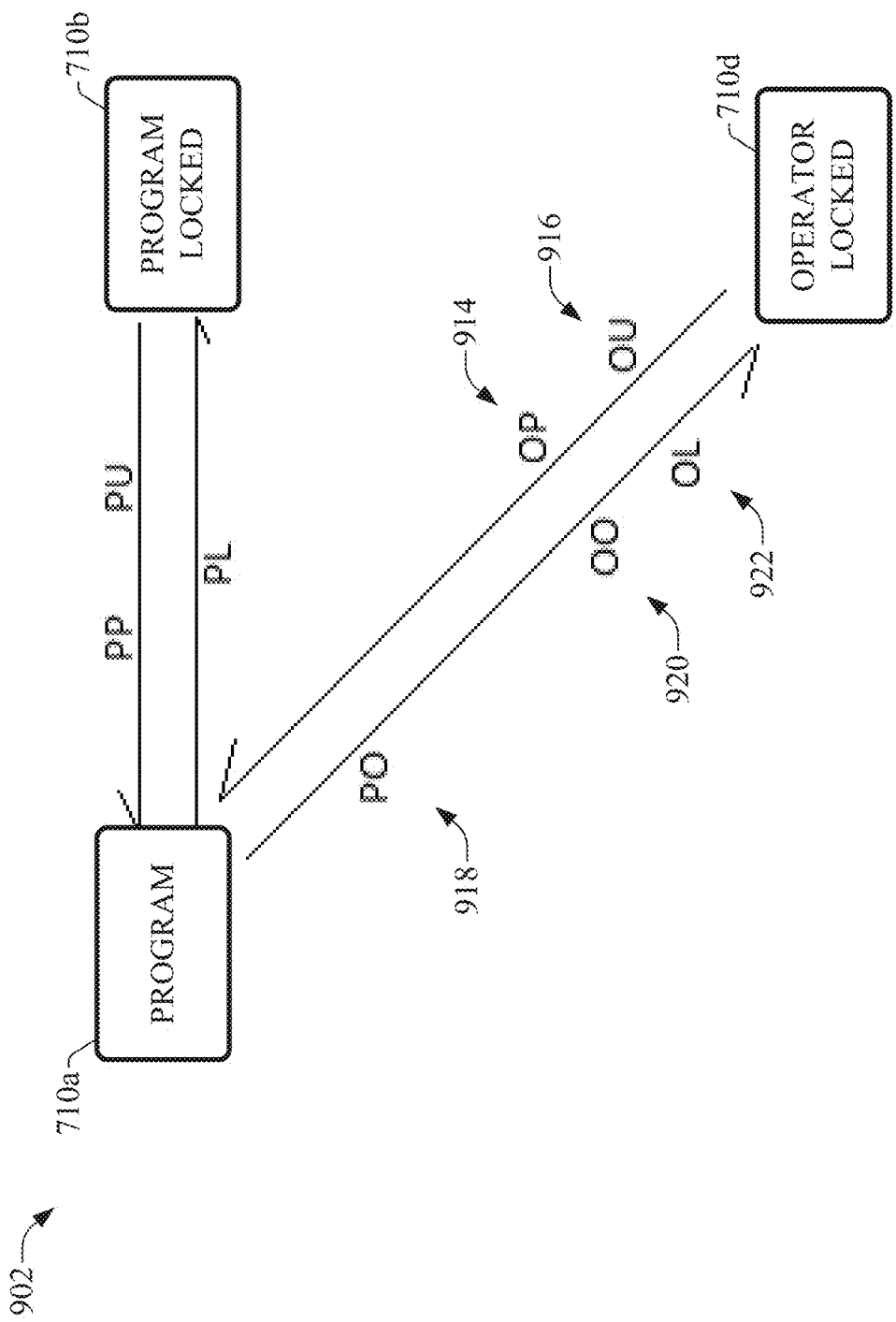
FIG. 9 is a diagram illustrating another example mode model configuration in which program access is the intended relaxed state.

FIG. 9 is a diagram illustrating another example mode model configuration 902 in which program access is the intended relaxed state. This configuration 902 differs from configuration 802 in that Operator mode is disabled and Operator Locked mode is enabled. Similar to configuration 802, configuration 902 allows the operator to take control of the object if and when the program is disinterested in accessing the object. However, in this configuration, if the system is in Program mode 710a, the operator can request uninterruptable (locked) access and control privileges from the program by setting the OO command 920 and the OL command 922 (operator request for access and operator request for locked access, respectively) and will obtain access when the program sets the PO command 918 in response (program situates object for operator control). Once the operator obtains access, the operator can hold control privileges in an uninterruptable manner until the operator no longer wishes to access the object, at which time the operator can return control to the program by setting the OP command 914 and the OU command 916 (the operator situates the object for program access and unlocks uninterruptable control, respectively). As with all ownership mode model configurations described herein, the mode model configuration component 508 allows the user to modify the transition commands used to transition between any two states as desired in order to conform to the in-house programming standards for ownership arbitration. In this configuration, direct transition between Program Locked and Operator Locked modes are not permitted, but rather all transitions to and from the Program Locked and Operator Locked modes must be via Program mode.

Figure 10:
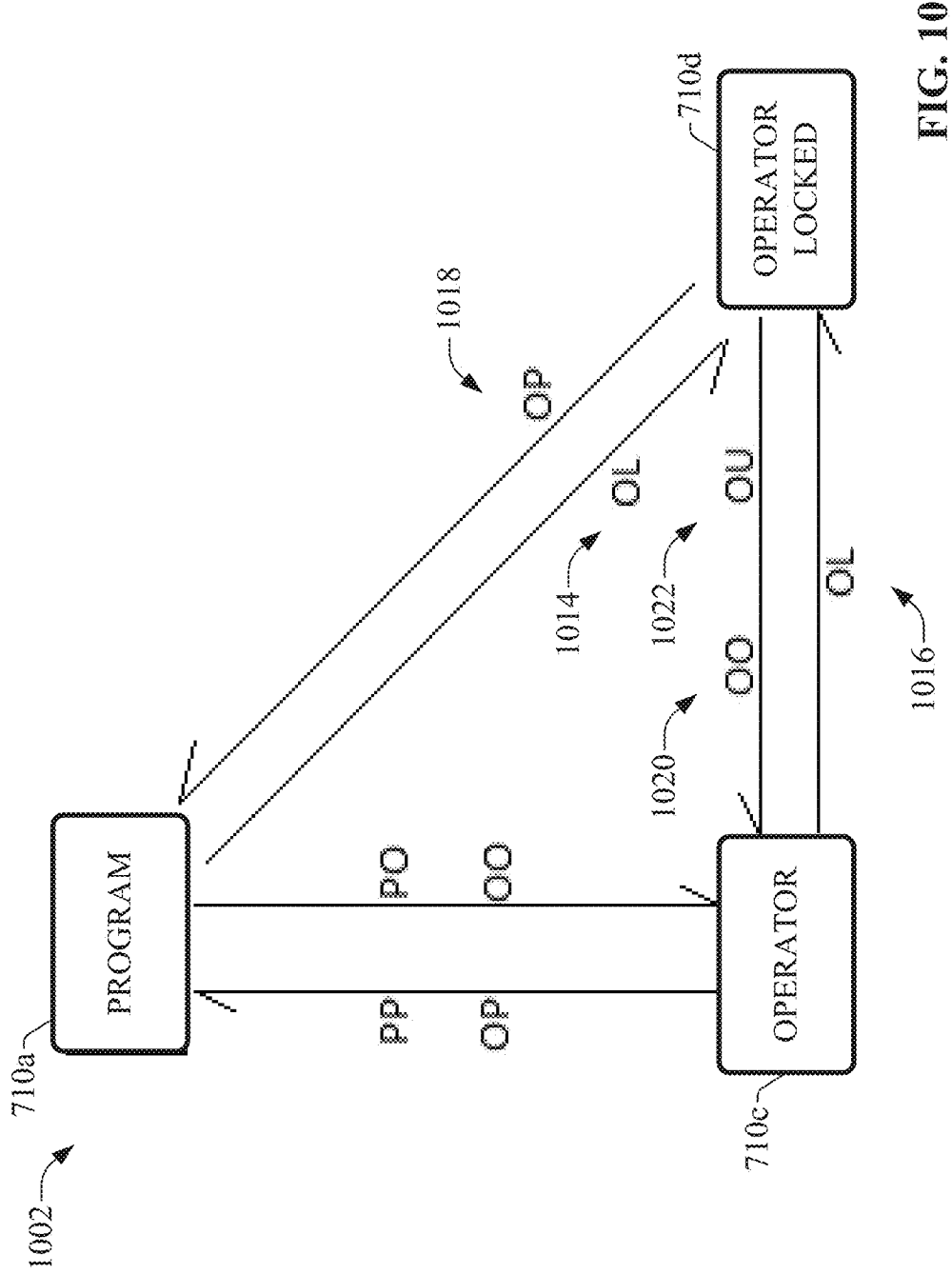
FIG. 10 is a diagram illustrating an example mode model configuration in which operator access is the intended relaxed state.

FIG. 10 is a diagram illustrating an example mode model configuration 1002 in which operator access is the intended relaxed state. In this example configuration, program access and control will be allowed if and when the operator is disinterested in accessing the object, and the operator can obtain access from the program at any time. Accordingly, this configuration 1002 disables Program Locked mode, and only Program, Operator, and Operator Locked modes are used. Setting the OL command (operator requests locked or uninterruptable control) at any time will cause the system to transition to Operator Locked mode regardless of the current ownership mode (as indicated by commands 1014 and 1016 and their associated transition arrows). The operator can release uninterruptable (locked) access to the object and transfer control to the program by setting the OP command 1018 (situate object for program control), or transfer control to interruptible (unlocked) operator control by setting the OO command 1020 and the OU command 1022. In this configuration, direct transitions between any two of the three available modes is permitted.

Figure 11:
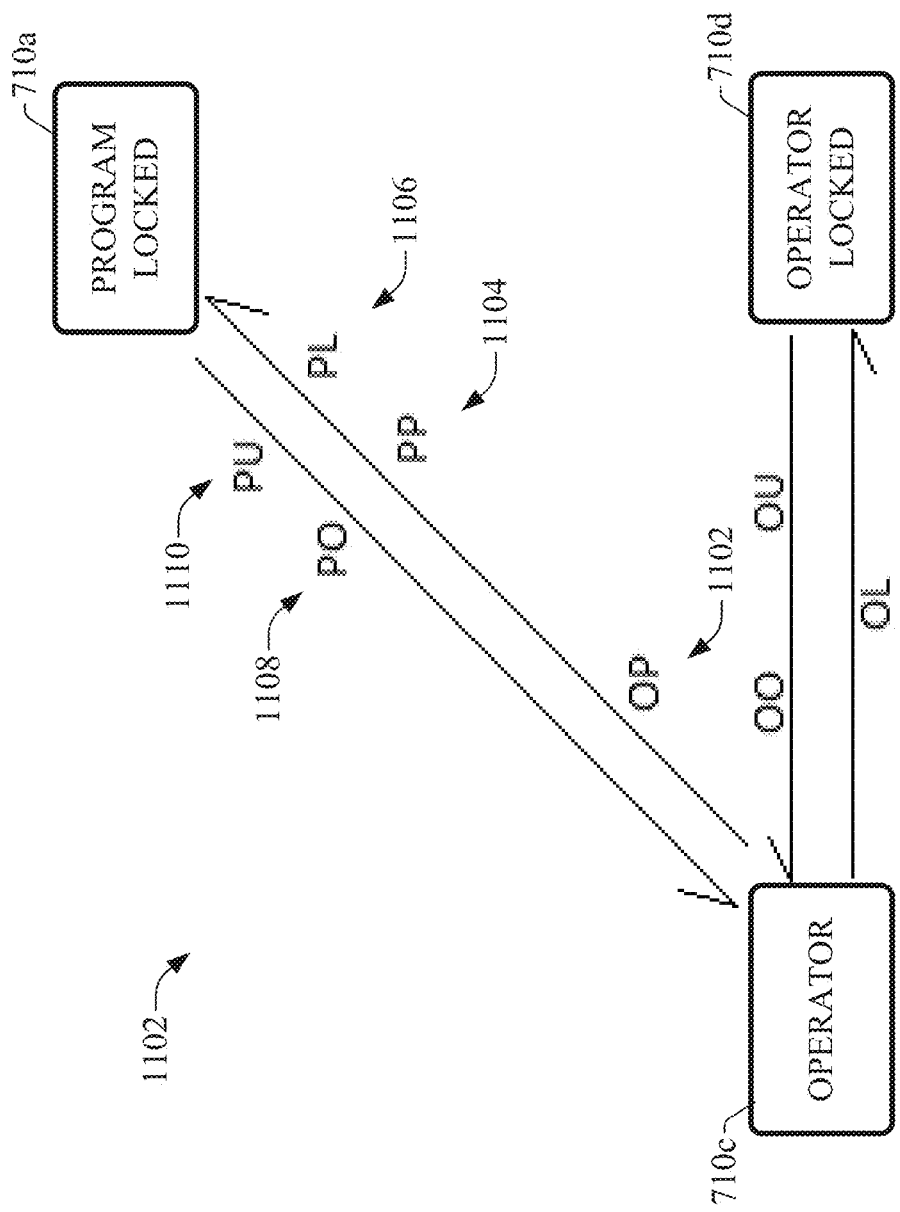
FIG. 11 is a diagram illustrating another example mode model configuration in which operator access is the intended relaxed state.

FIG. 11 is a diagram illustrating another example mode model configuration 1102 in which operator access is the intended relaxed state. This mode model configuration differs from that of configuration 1002 in that Program mode is disabled and Program Locked mode is enabled. Thus, the program can take control of the object if and when the operator is disinterested in controlling the object (if the OP command 1102, PP command 1104, and PL command 1106 are set), and can hold control privileges in an uninterruptable manner until the program no longer wishes to access the object. The program releases control to the operator by setting the PU command 1110 and the PO command 1108. Direct transitions between Program Locked and Operator Locked modes are not permitted in this configuration 902B. Instead, transitions to and from Program Locked mode and Operator Locked mode most be via Operator mode.

Figure 12:
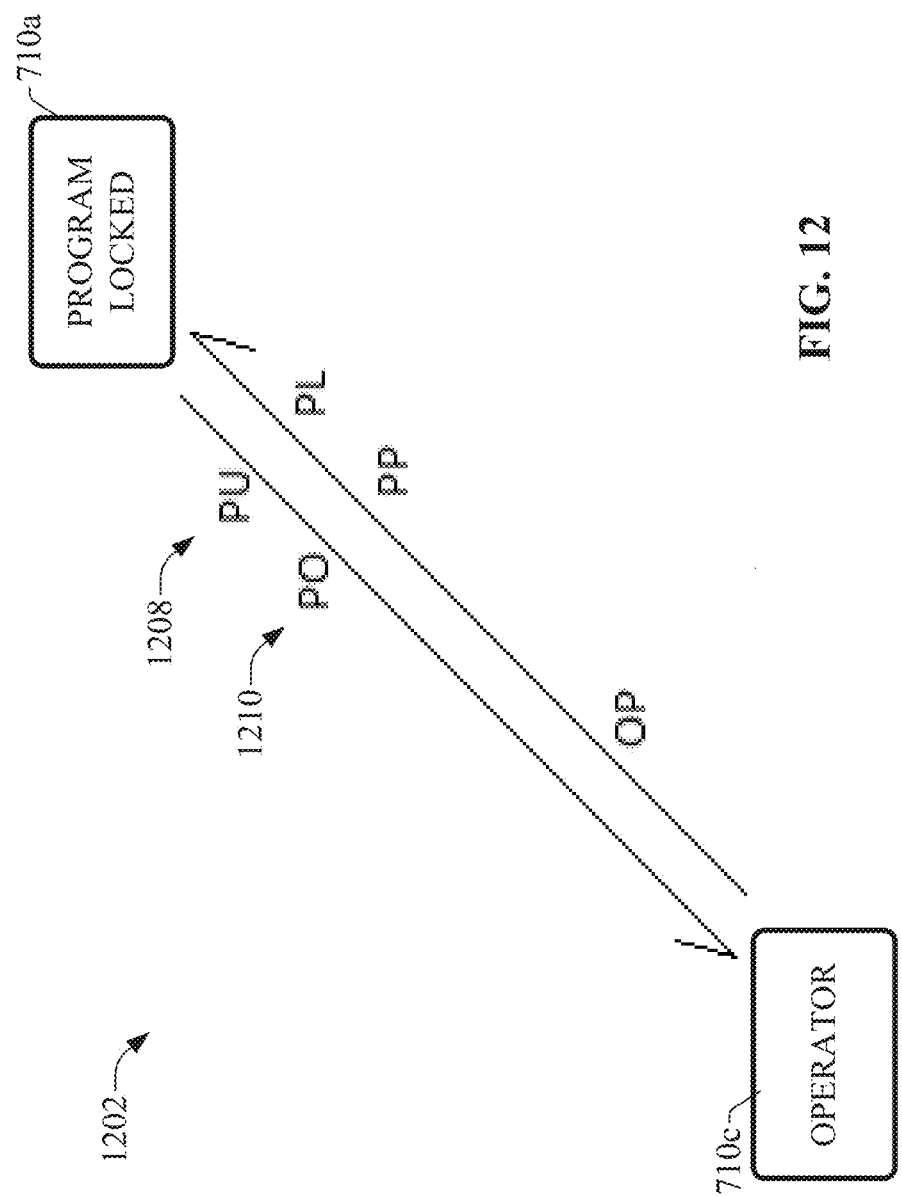
FIG. 12 is a diagram illustrating an example mode model configuration in which program access is predominant.

FIG. 12 is a diagram illustrating an example mode model configuration 1202 in which program access is predominant Only Operator and Program Locked modes are available in this configuration. Thus, program control will always be uninterruptable control, and the operator may only obtain access and control of the object if the program indicates disinterest in controlling the object and voluntarily cedes control to the operator (by setting the PU command 1208 and the PO command 1210, or one or more other transition commands selected by the designer during program development). While the system is in Operator mode, the program can obtain control at any time, since operator control is not uninterruptable.

FIG. 13 is a diagram illustrating an example mode model configuration 1302 in which operator access is predominant Only Program and Operator Locked modes are available in this configuration. Thus, operator control will always be uninterruptable, and the program may only obtain access and control of the object from the operator if the operator indicates disinterest in accessing the object (by setting the OP command 1304 and the OU command 1306). While the system is in Program mode, the operator can obtain control at any time, since program control is not uninterruptable.

FIG. 14 is a diagram illustrating an example mode model configuration 1402 that disallows locked control. In this configuration, only the Program and Operator modes are used, and Program Locked and Operator Locked modes are disable. According to this configuration 1402, both the program and the operator can freely obtain access and control of the object at any time as needed. When the system is in Operator mode, the program can obtain control when the PP command 1404 (program requests control) and the OP command 1406 (operator situates object for program control) are set. In the reverse direction, setting the PO command 1408 and the OO command 1410 causes control to transition from the program to the operator.

FIG. 15A is a diagram illustrating an example mode model configuration 1502A in which the operator has sole access and control privileges at all times. This configuration is set by disabling all ownership modes except for Operator mode. FIG. 15B is a diagram illustrating an example mode model configuration 1502B in which the program has sole access and control privileges at all times. This configuration is set by disabling all ownership modes except for program mode.

Figure 16:
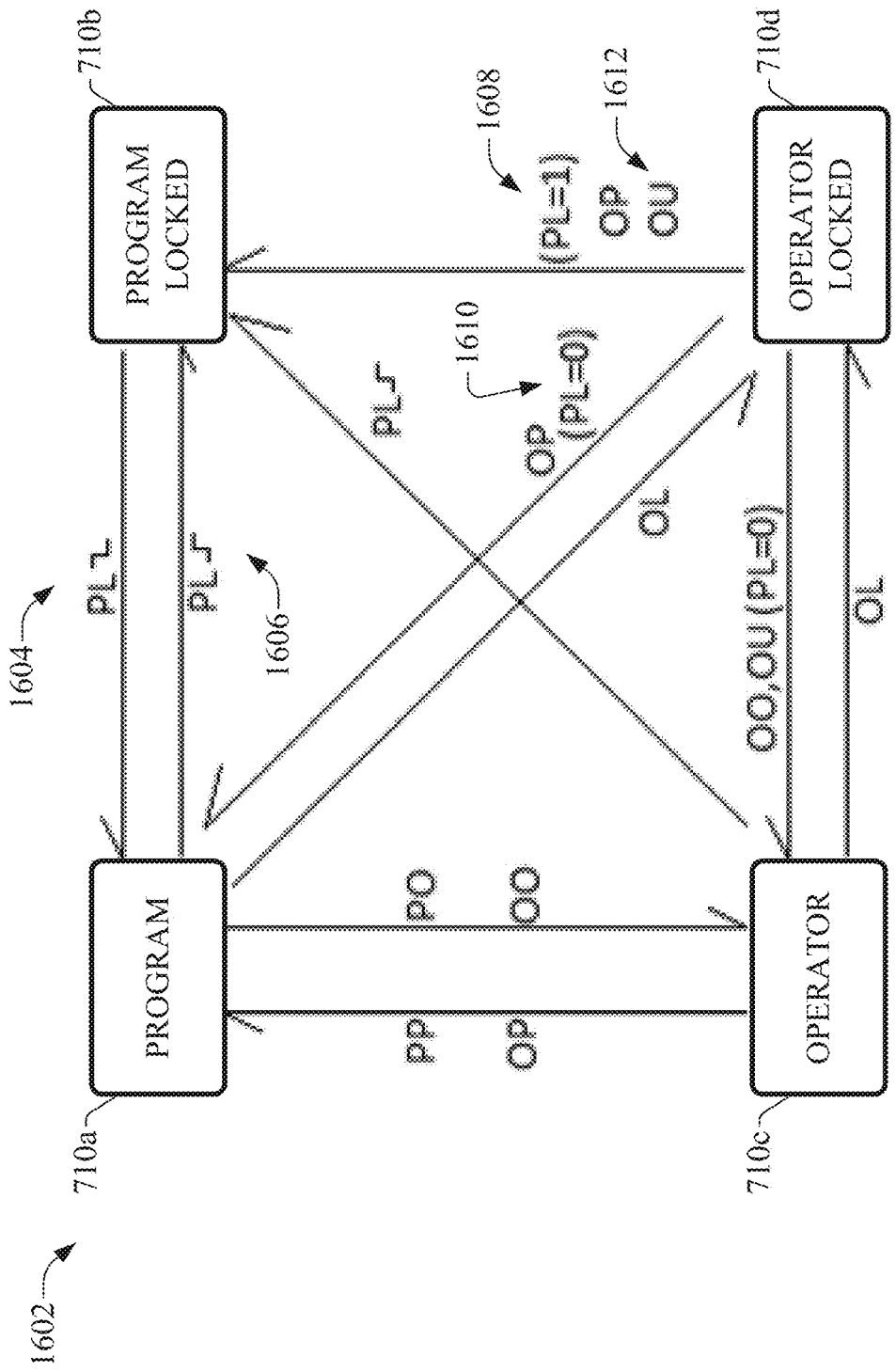
FIG. 16 is a diagram illustrating an example default mode model configuration in which the Program Lock command (PL) is set as Level.

FIG. 16 is a diagram illustrating an example default mode model configuration 1602 in which the Program Lock command (PL) is set as Level. Program Lock can be set as Level during configuration of the ownership mode model (e.g., using configuration application 610) by selecting a suitable control on a graphical interface that sets a Program Lock as Level bit as part of mode model configuration data 602. Setting Program Locked as Level disables the Program Unlock (PU) command, and allows locking and unlocking of program control to be set using only the state of the Program Lock (PL) command In this way, transitions to and from the Program Locked mode can be controlled with a Boolean command; namely, the Program Locked (PL) command bit. According to this configuration, setting the PL command high while in Program mode (as indicated by command 1606) will cause the system to transition to Program Locked mode, similar to the standard default configuration 702 (without Program Lock set as Level) illustrated in FIG. 7. However, in contrast to the standard default configuration 702, the system transitions from Program Locked mode back to Program mode when the PL command goes low, as indicated by command 1604, rather than requiring the PP command 704 or the PU command 706 to be set.

This configuration 1602 also differs from default configuration 702 in that a direct transition from Operator Locked mode and Program Locked mode is permitted, based on the state of the PL command. While in the Operator Locked mode, if the operator situates the object for program control by setting the OP command, the system will transition to Program mode (not locked) if the PL command is low (as indicated by command 1610), and will transition to Program Locked mode if the PL command is high (as indicated by command 1608) and the operator sets the OU (operator unlock) command 1612.

Figure 17:
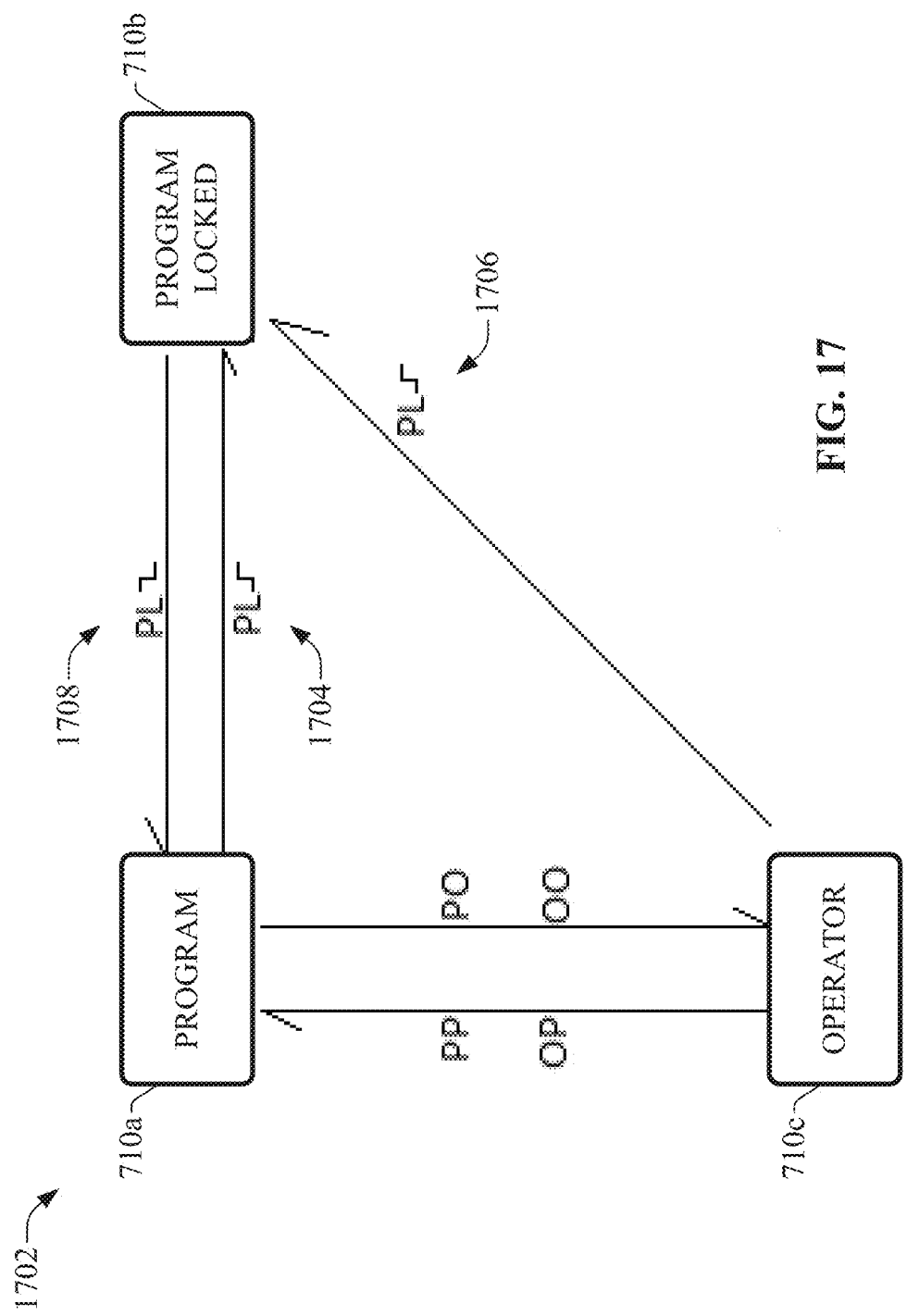
FIG. 17 is a diagram illustrating an example mode model configuration in which program control is the intended relaxed state, and in which the Program Lock command (PL) is set as Level.

FIG. 17 is a diagram illustrating an example mode model configuration 1702 in which program control is the intended relaxed state, and in which the Program Lock command (PL) is set as Level. This configuration 1702 is generally similar to configuration 802 of FIG. 8, except that transitions to and from Program Locked mode are controlled solely as a function of the state of the PL command (the PU command is not used). The program can assume control from the operator at any time as needed, since Operator Locked mode is disabled, and the system will transition to Program Locked mode any time the PL command is set high regardless of the current mode (as indicated by commands 1704 and 1706). Setting the PL command low, as indicated by command 1708, causes the system to transition to unlocked Program mode.

Figure 18:
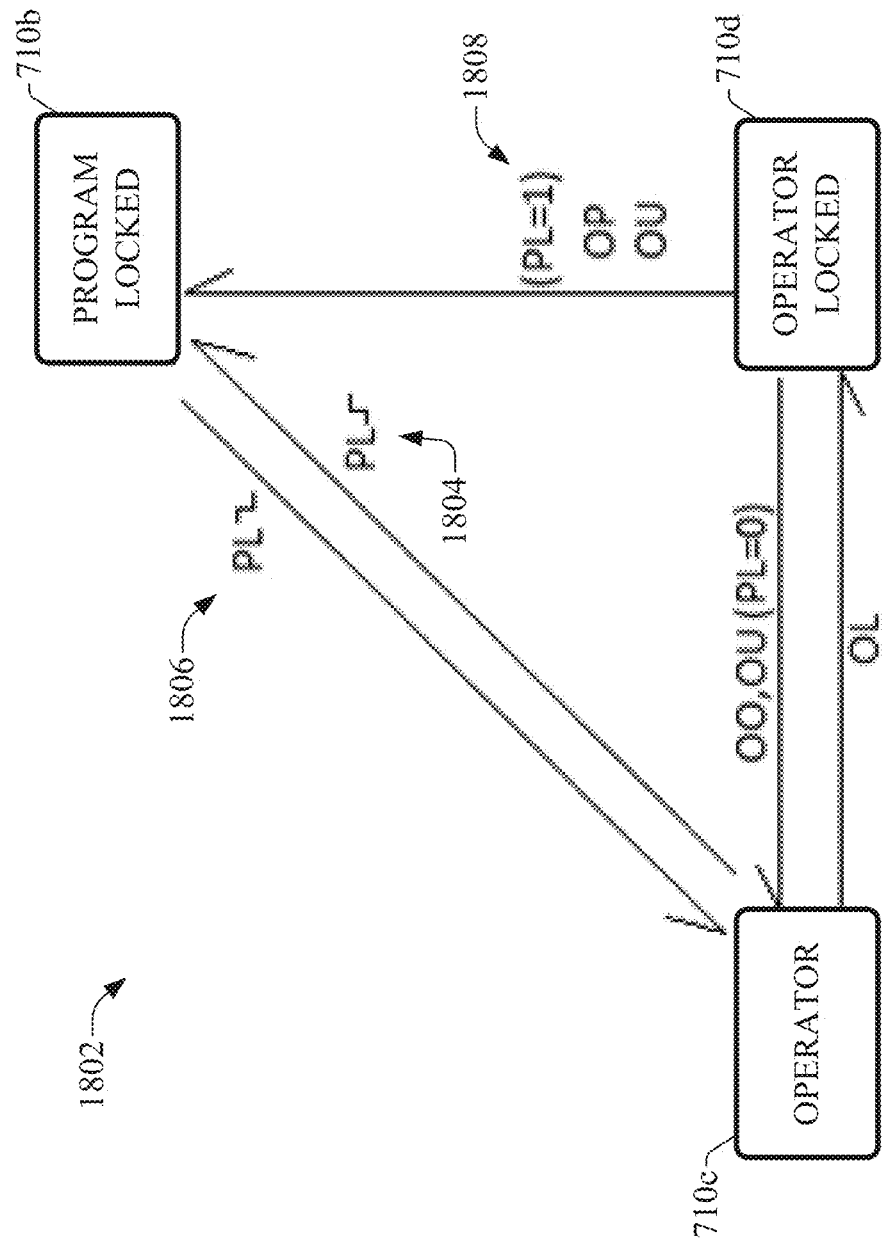
FIG. 18 is a diagram illustrating an example mode model configuration in which operator control is the intended relaxed state, the program is permitted to acquire uninterruptable control, and the Program Lock command (PL) is set as Level.

FIG. 18 is a diagram illustrating an example mode model configuration 1802 in which operator control is the intended relaxed state, the program is permitted to acquire uninterruptable control, and the Program Lock command (PL) is set as Level. Program mode is disabled, and the program can only assume locked (uninterruptable) control if permitted by the operator. As in all configurations in which Program Lock is set as Level, the PU (program unlock) command is not used, and transitions to and from Program Locked mode are controlled by the high or low state of the PL (program lock) command That is, if the system is currently in Operator mode (operator control is not locked), the program can assume locked control from the operator by setting the PL command high (as indicated by command 1804), and can return control to the operator by resetting the PL command low (as indicated by command 1806). Also, with the PL command set high (as indicated by command 1808) the system will allow direct transitions from Operator Locked mode to Program Locked mode when the OP or OU commands are set.

Figure 19:
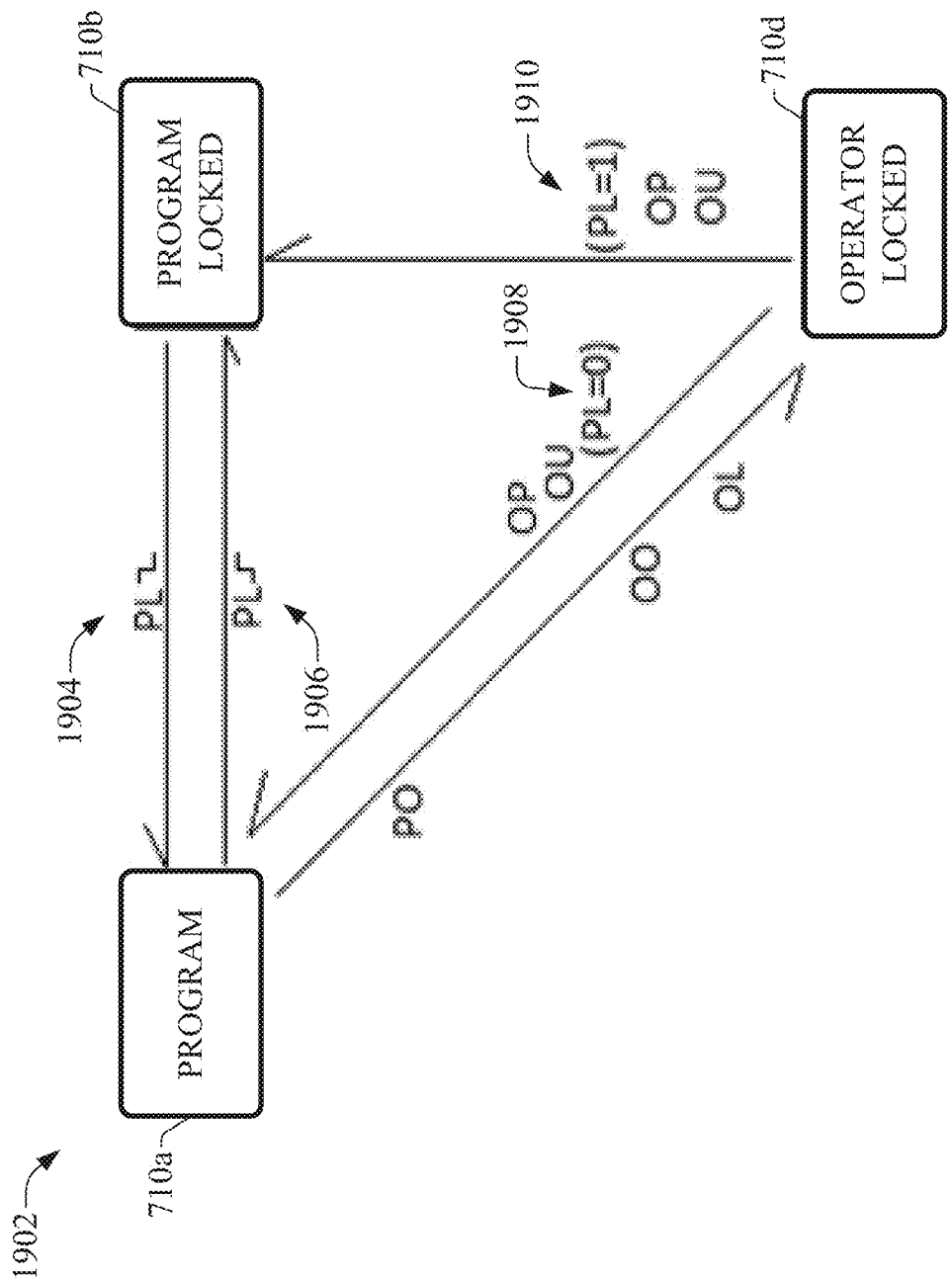
FIG. 19 is a diagram illustrating an example mode model configuration in which program control is the intended relaxed state, the operator is permitted to acquire uninterruptable control, and the Program Lock command (PL) is set as Level.

FIG. 19 is a diagram illustrating an example mode model configuration 1902 in which program control is the intended relaxed state, the operator is permitted to acquire uninterruptable control, and the Program Lock command (PL) is set as Level. This configuration is generally similar to configurate 902 depicted in FIG. 9, except that transitions to and from Program Locked mode are controlled by the state of the PL command. If the operator is not currently requesting control (one or both of the OL or OO commands are low), transition between Program mode and Program Locked mode are controlled solely by the high or low state of the PL command (as indicated by commands 1904 and 1906). The operator can obtain locked control only if the PL command is low, which places the system in unlocked Program mode. Once in Operator Locked mode, the operator can hold control as long as desired, and will relinquish control by setting the OP or OU commands, upon which the system will either transition to Program mode if the PL command is low (as indicated by command 1908) or Program Locked mode if the PL command is high (as indicated by command 1910).

Figure 20:
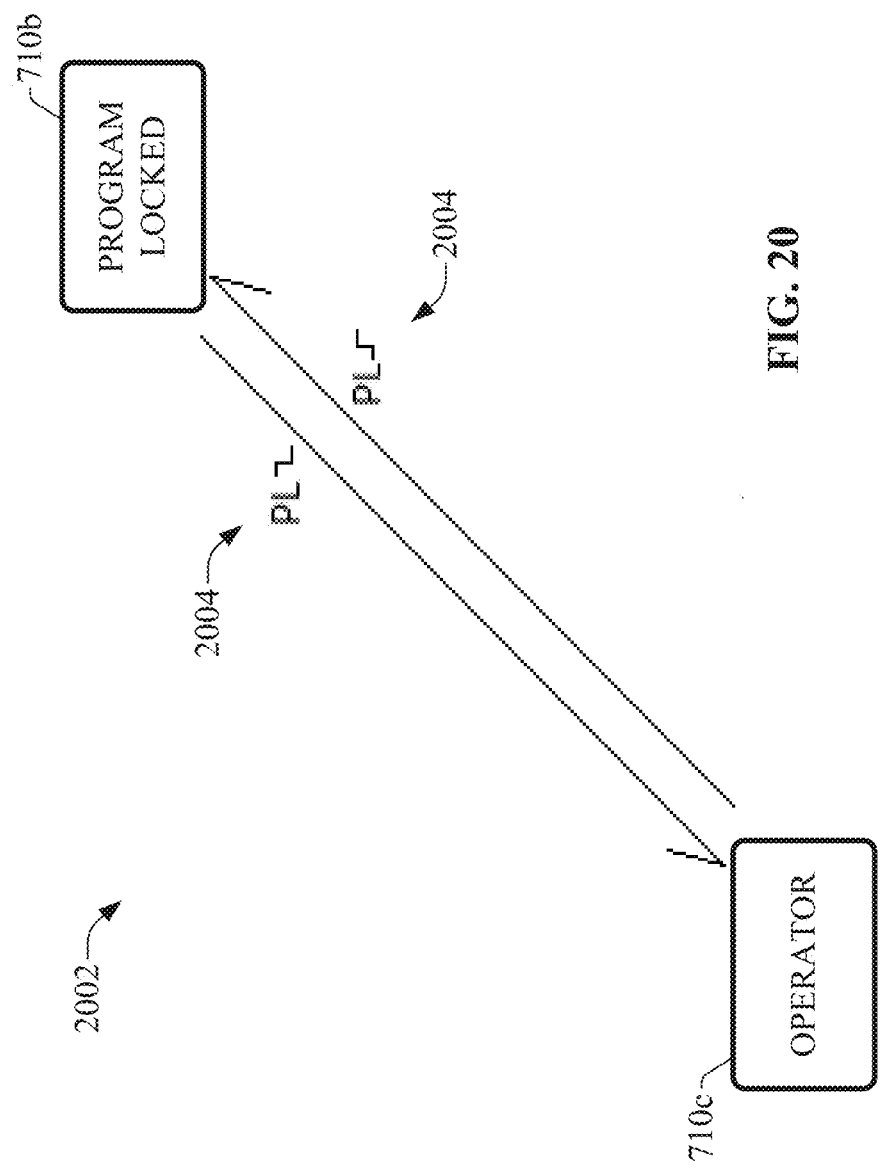
FIG. 20 is a diagram illustrating an example mode model configuration in which program access is predominant, and Program Lock is set as Level.

FIG. 20 is a diagram illustrating an example mode model configuration 2002 in which program access is predominant, and Program Lock is set as Level. This 2002 configuration is generally similar to configuration 1202 of FIG. 12, in that only the Operator and Program Locked modes are used, preventing the operator from assuming control from the program unless allowed by the program, and the program may assume control at any time. However, in contrast to configuration 1202, transitions between the Program Locked and Operator modes are controlled solely by the state of the PL command, such that setting the PL command high (command 2002) causes transition to Program Locked mode, and resetting the Program Locked command low (command 2006) causes transition to Operator mode.

Figure 21:
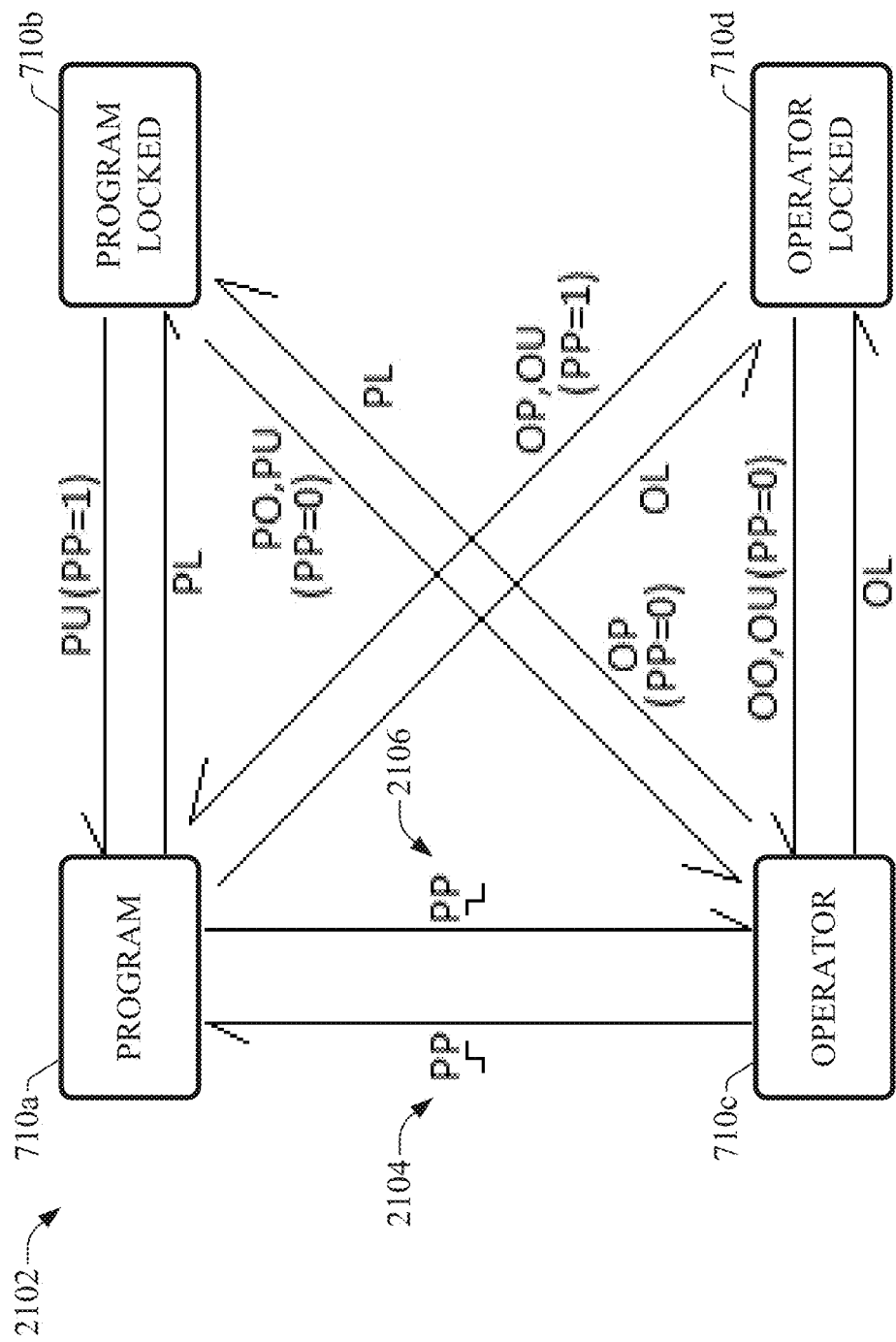
FIG. 21 is a diagram illustrating an example default mode model configuration in which the Program Request is set as Level.

FIG. 21 is a diagram illustrating an example default mode model configuration 2102 in which the Program Request is set as Level. As with setting Program Lock as Level, Program Request can be set as Level during configuration of the ownership mode model (e.g., using configuration application 610) by selecting a suitable control on a graphical interface that sets a Program Request as Level bit as part of mode model configuration data 602. Setting Program Request (or Program Acquire) as Level yields an ownership model configuration in which transitions between Program mode and Operator mode are controlled through the sole use of the PP command (program request to access the object). Thus, in contrast to default configuration 702 depicted in FIG. 7, transition from Operator mode to Program mode is initiated when the PP command is set high (command 2104, representing a program request for control), and transition from Program mode to Operator mode is initiated when the PP command is reset low (command 2106, indicating that the program is no longer desires control). Some other state transitions are also dependent on the state of the PP command in this configuration 2102, as indicated in the FIG. 21.

Figure 22:
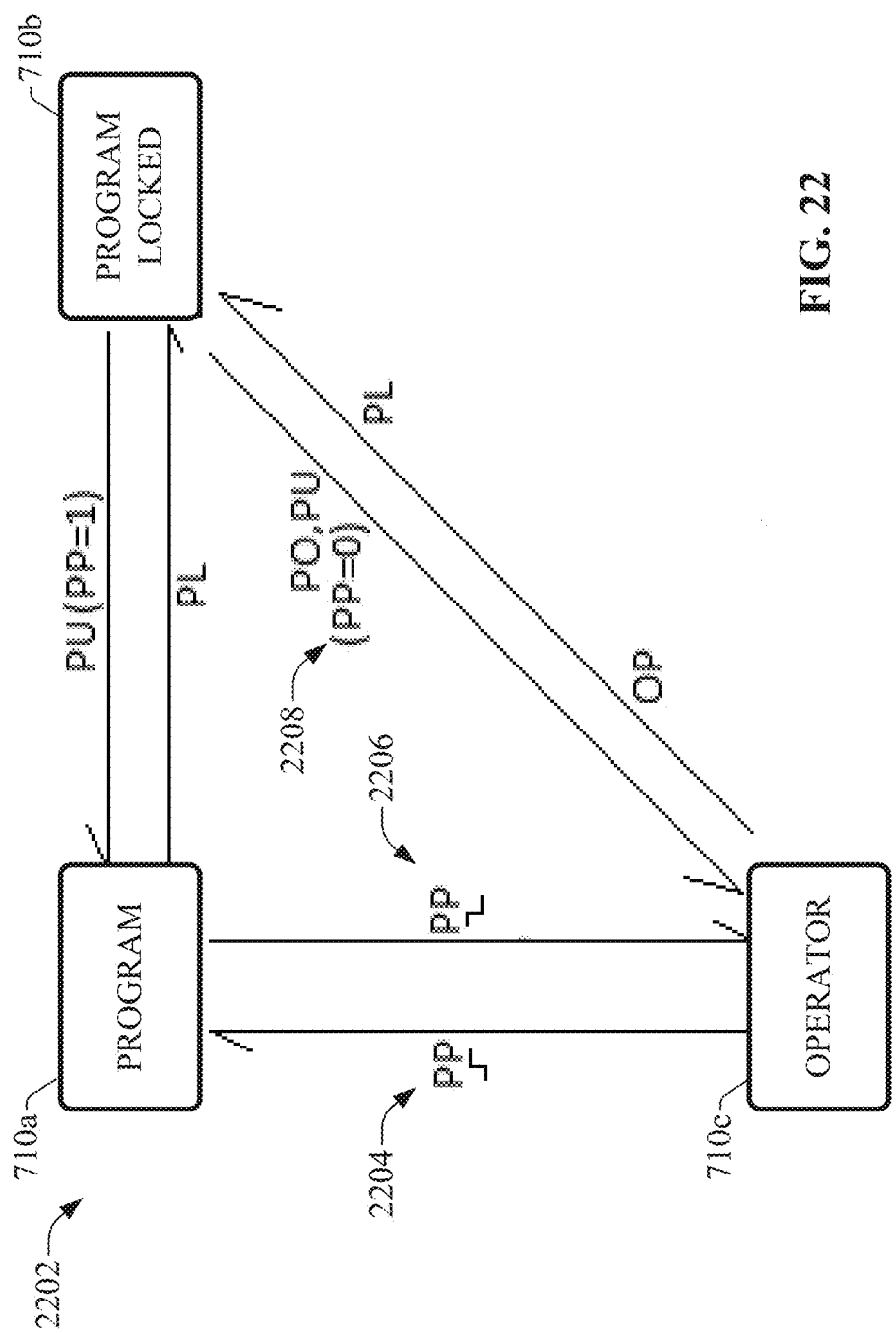
FIG. 22 is a diagram illustrating an example mode model configuration in which program access is the intended relaxed state and Program Request is set as Level.

FIG. 22 is a diagram illustrating an example mode model configuration 2202 in which program access is the intended relaxed state and Program Request is set as Level. Similar to configuration 802 illustrated in FIG. 8, configuration 2202 allows operator control only if and when the program is disinterested in accessing and controlling the target object, and also allows the program to obtain access from the operator at any time. Accordingly, Operator Locked mode is disabled to prevent the operator for obtaining uninterruptable control. In contrast to configuration 802, transitions between Program mode and Operator mode are controlled exclusively by the state of the PP command (commands

2204 and 2206). In general, this configuration 2202 only permits the operator to assume control if the PP command is low (see commands 2206 and 2208).

Figure 23:
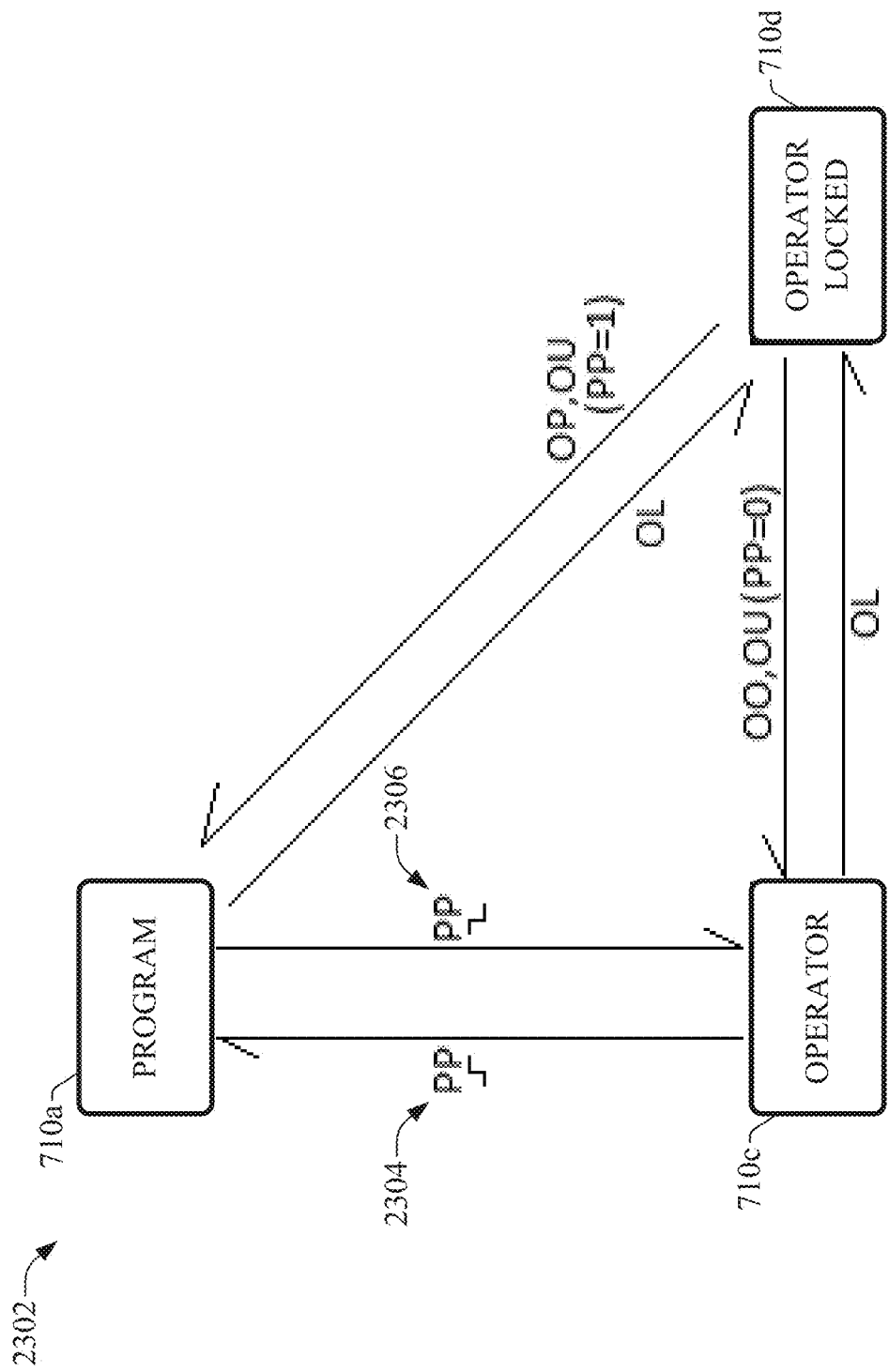
FIG. 23 is a diagram illustrating an example mode model configuration in which operator access is the intended relaxed state, and Program Request is set as Level.

FIG. 23 is a diagram illustrating an example mode model configuration 2302 in which operator access is the intended relaxed state, and Program Request is set as Level. Similar to configuration 1002 illustrated in FIG. 10, this configuration 2302 allows program access and control only if and when the operator is disinterested in accessing the object, and also allows the operator to obtain access from the program at any time. Accordingly, Program Locked mode is disabled. With Program Request set as level, transitions between Program Mode and Operator mode are controlled exclusively by the state of the PP command, as indicated by commands 2304 and 2306. Transitions to Program mode will only occur if the PP command is high.

Figure 24:
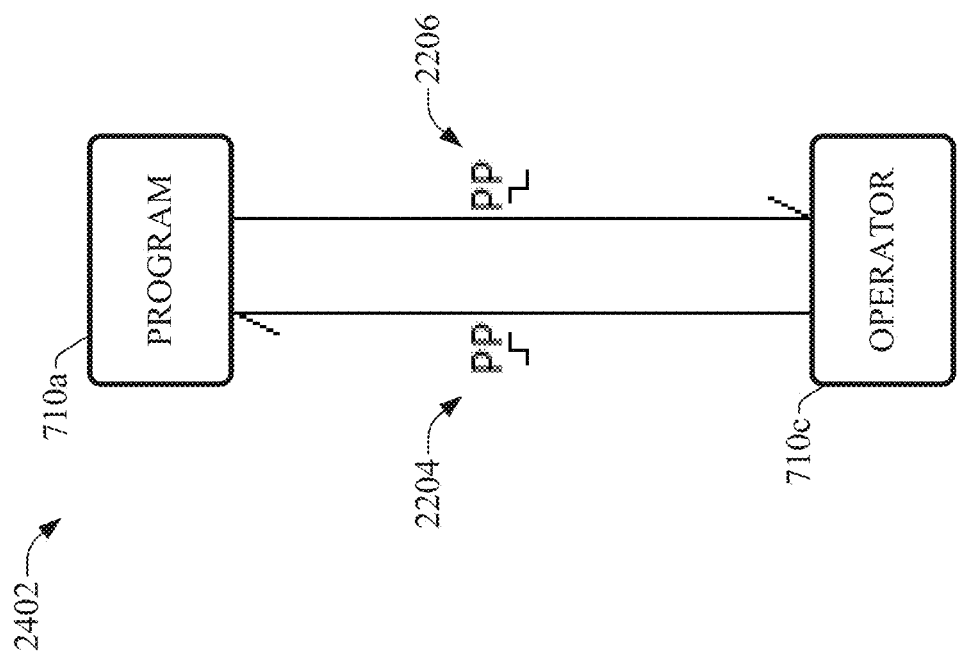
FIG. 24 is a diagram illustrating an example mode model configuration in which all transitions between program control and operator control are based solely on the state of the PP command.

FIG. 24 is a diagram illustrating an example mode model configuration 2402 in which all transitions between program control and operator control are based solely on the state of the PP command In this example, Program Locked and Operator Locked modes are disabled, and Program Request is set as Level such that transitions between Program and Operator modes are entirely a function of the state of the PP command. Specifically, the program has control as long as the PP command is high (command 2404), and the operator has control as long as the PP command is low (command 2406).

Figure 25:
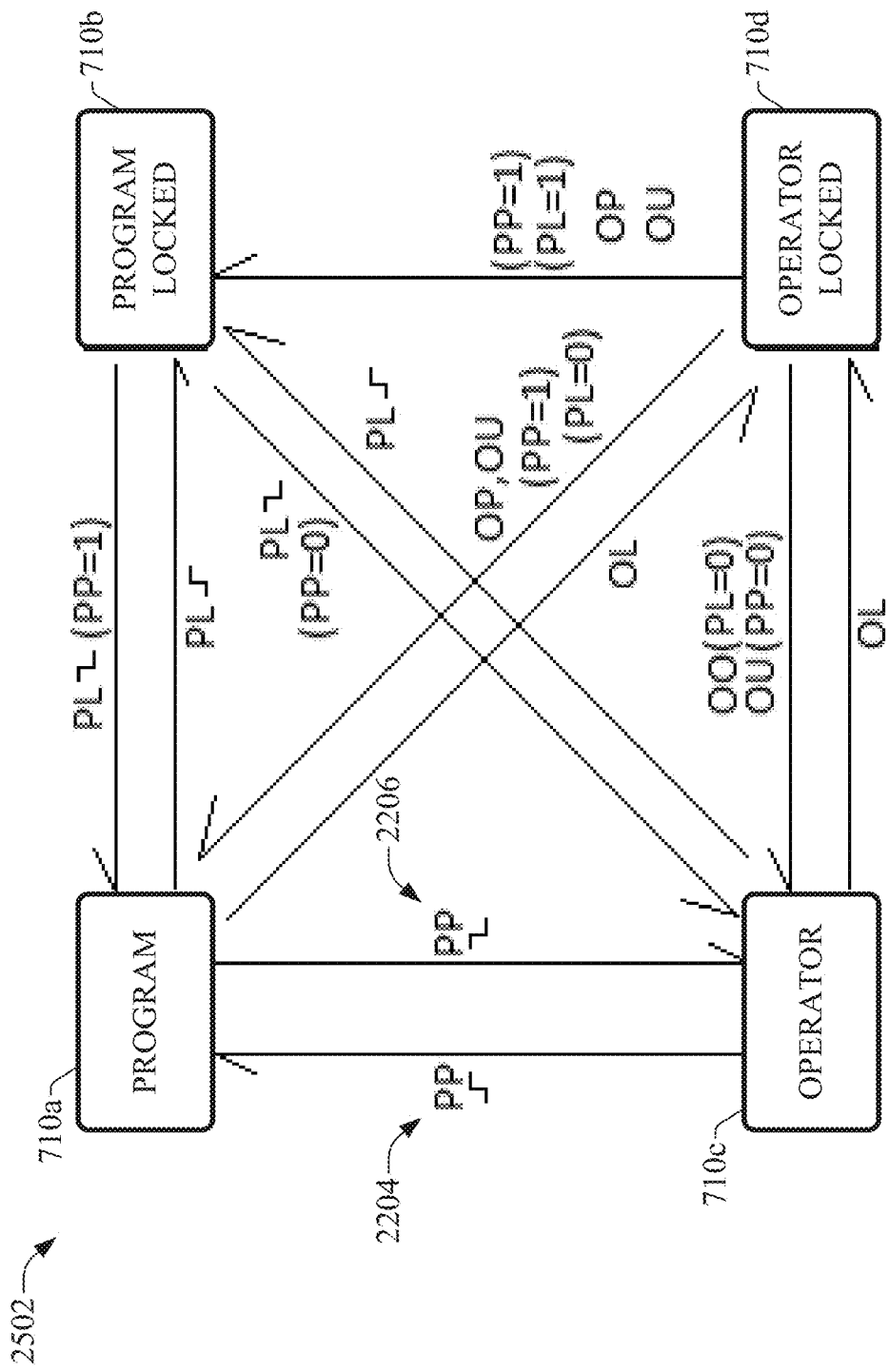
FIG. 25 is a diagram illustrating an example default mode model configuration in which both Program Lock and Program Request are set as Level.

FIG. 25 is a diagram illustrating an example default mode model configuration 2502 in which both Program Lock and Program Request are set as Level. All four modes are used in this configuration, with transitions between Program and Operator modes being controlled solely by the state of the PP command (commands 2504 and 2506), in accordance with the Program Request being set as Level. The PU (program unlock) command is disabled in accordance with the Program Lock being set as Level, and unlocking of Program Locked mode is controlled by the low state of the PL command.

Figure 26:
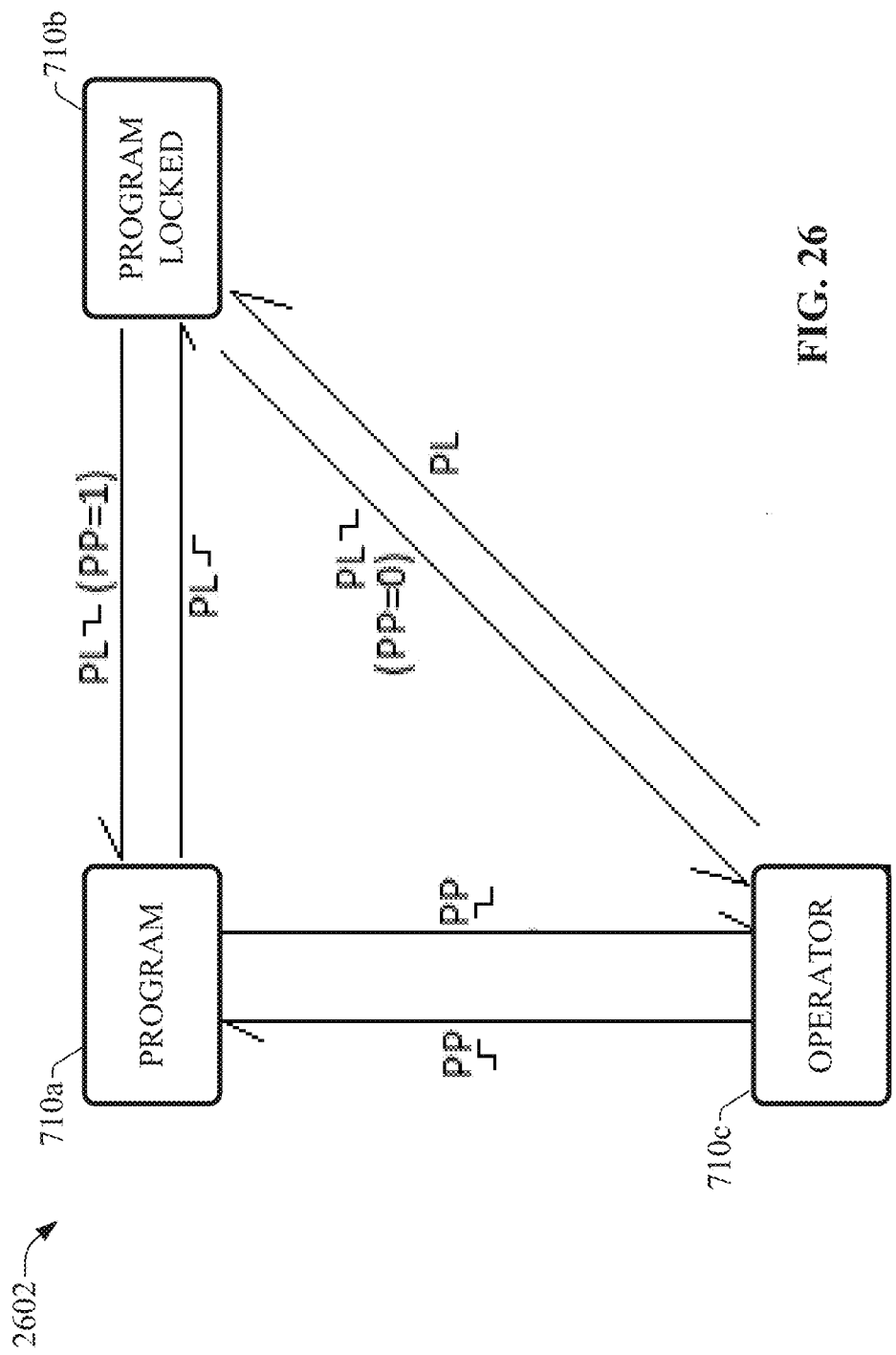
FIG. 26 is a diagram illustrating an example mode model configuration in which program access is the intended relaxed state, and both Program Lock and Program Request are set as Level.

FIG. 26 is a diagram illustrating an example mode model configuration 2602 in which program access is the intended relaxed state, and both Program Lock and Program Request are set as Level. Operator Locked mode is disabled, yielding a configuration generally similar to configuration 802 of FIG. 8, in which operator control is allowed only if the program is disinterested in accessing and controlling the target object, and the program is permitted to obtain access from the operator at any time. With both Program Lock and Program Request set as level, transitions between the three available states are controlled exclusively as a function of the high or low states of the PL command and the PP command, as indicated in the diagram.

The example mode model configurations described above in connection with FIGS. 7-26 are only intended to be exemplary, and it is to be appreciated that any user-defined mode model configuration—including any combination of selected mode states, any commands or conditions for transitioning between the states, and any user-defined restrictions on mode state transitions—are within the scope of one or more embodiments.

Example graphical configuration interfaces—either generated by client interface component 504 or by configuration application 610—can allow the user to easily select from one or more predefined ownership mode models (e.g., one or more of the mode models depicted in FIGS. 7-26). In this way, end users can select a mode model that most closely matches their in-house standards for operator/program arbitration, including selection of which states are to be used or disabled (e.g., disablement of Program Locked mode if the end user does not wish the program to override or prevent operator control at any time), and selection of which commands are to be used to transition between the selected mode states.

In some embodiments, the graphical configuration interface can also allow the user to make further customizations to the mode model via interaction with the interface. For example, selecting one of the pre-defined mode model configurations can cause a state machine representation of the selected mode model to be rendered on the configuration interface display. The user can then interact with the rendered state machine representation to add or remove permitted transitions between the states, to change the conditions for transitioning between any two of the states (e.g., by changing a transition command for a selected transition, by adding commands to a selected transition, or by removing commands from a selected transition), or by adding or removing permitted modes. When the user has developed a mode model that best suits the desired arbitration standard, the resulting mode model design can be saved as mode model data 528. During runtime, the controller's arbitration component 510 will arbitrate between operator and program control in accordance with the user-customized mode model data 528.

The customized mode model for arbitrating between program and operator control can be applied to substantially any level of a control system hierarchy. For example, in some scenarios the ownership mode model can be applied globally to a control program executing on the industrial controller 502, or may be applied to selected function blocks within the control program. Such function blocks may correspond to specific industrial devices or groups of devices, and are used to monitor and/or control aspects of those devices. Thus, the customizable mode model allows the designer to configure the arbitration state machine for selected devices or groups of devices. Moreover, in some embodiments, once the mode model has been configured in accordance with the end user's specifications, the customized mode model data 528 can be exported and loaded on other industrial devices in order to maintain consistency of ownership arbitration standards across control systems of a given industrial facility or enterprise.

Figure 27:
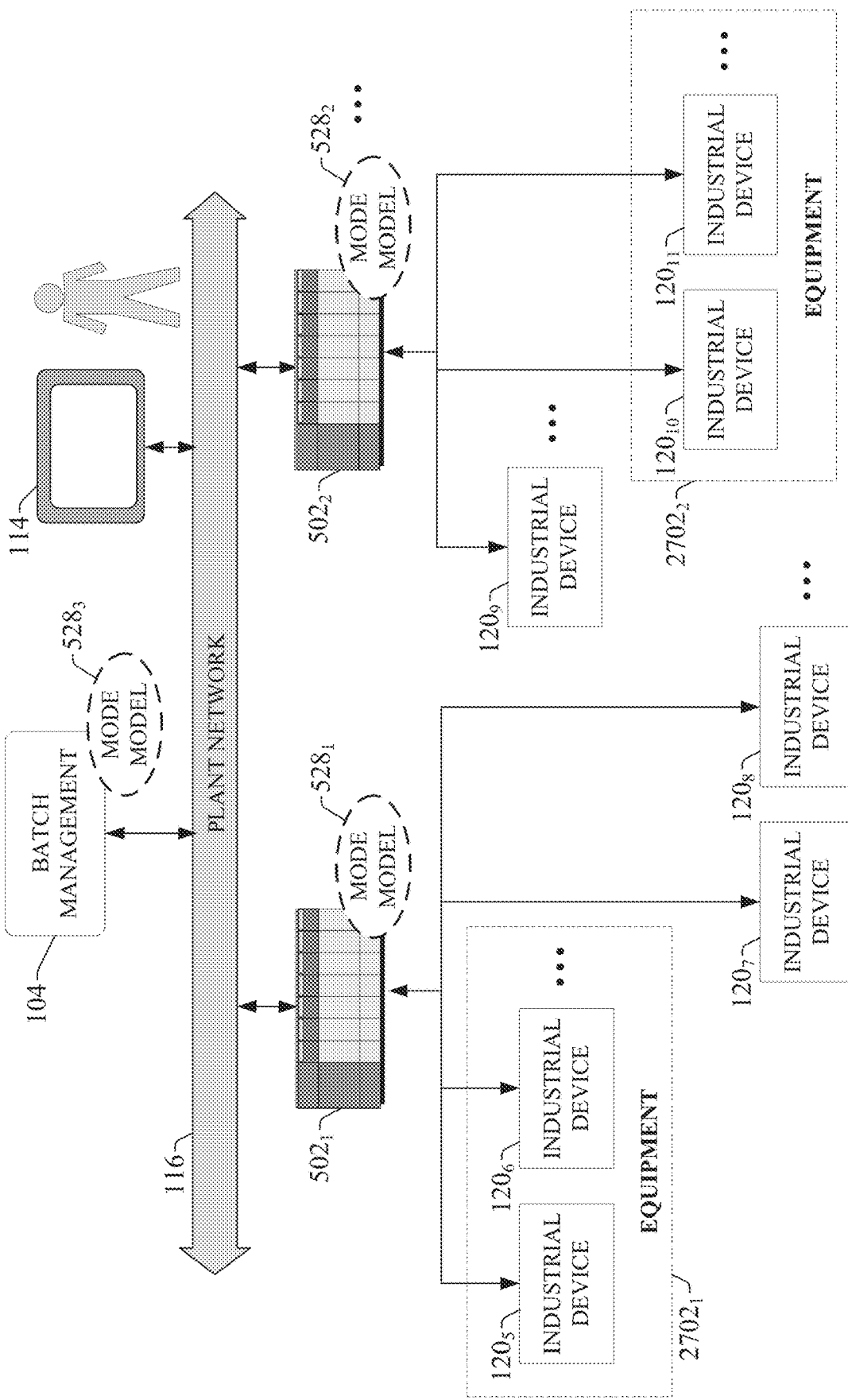
FIG. 27 is a diagram illustrating an example batch control architecture comprising a number of distributed controllers and a batch management system.

Although the examples described above assume that the customized mode models are applied to industrial controllers (e.g., defined within the controller's process library or firmware), customizable mode models can also be applied to other industrial devices or systems in which arbitration between program control and operator control are required, including devices below the controller level such as motor drives, or higher level systems such as batch management systems. FIG. 27 is a diagram illustrating an example batch control architecture comprising a number of distributed controllers 502 and a batch management system 104. In this example, batch management system 104 performs supervisory monitoring and control of industrial controllers 502 in connection with performing industrial batch processes (e.g., food and drug batch processes, plastic manufacturing batch processes, etc.). In this regard, batch management system can manage batch recipes, coordinate operation of distributed control systems and industrial assets in connection with carrying out a batch operation, generate report data, or other such supervisory and reporting features. As depicted in this example architecture, mode model data 528 defining program/operator arbitration mode models can be defined on any of the industrial controllers 502 and/or batch management system 104. In this way, arbitration between program control and control by an operation (e.g., via HMI 114) can be customized at one or both of the controller level or the batch manager level.

In many industrial control systems, subsets or groups of field devices—e.g., valves, pumps, etc.—will always operate in conjunction with one another. For example, a storage tank that is part of a batch system may have an associated outlet valve and a pump that drives the contents of the tank to a destination chamber or tank while the outlet valve is open. The control system may be programmed such that these two industrial devices—the outlet valve and the pump—always work together in a coordinated manner (e.g., the pump will not run unless the outlet valve is first opened). While this example involves only two devices, a given industrial control system may comprise many complex groupings of lower level functions, as illustrated in the example architecture of FIG. 27 in which some sets of industrial devices 120 are grouped into equipment sets 2702 that are known to always work in conjunction. In some scenarios, it may be desirable to apply ownership and mode functionality to these groupings, such that an industrial device within a defined group is never owned without the other devices within the group also being owned by the same entity.

Figure 28:
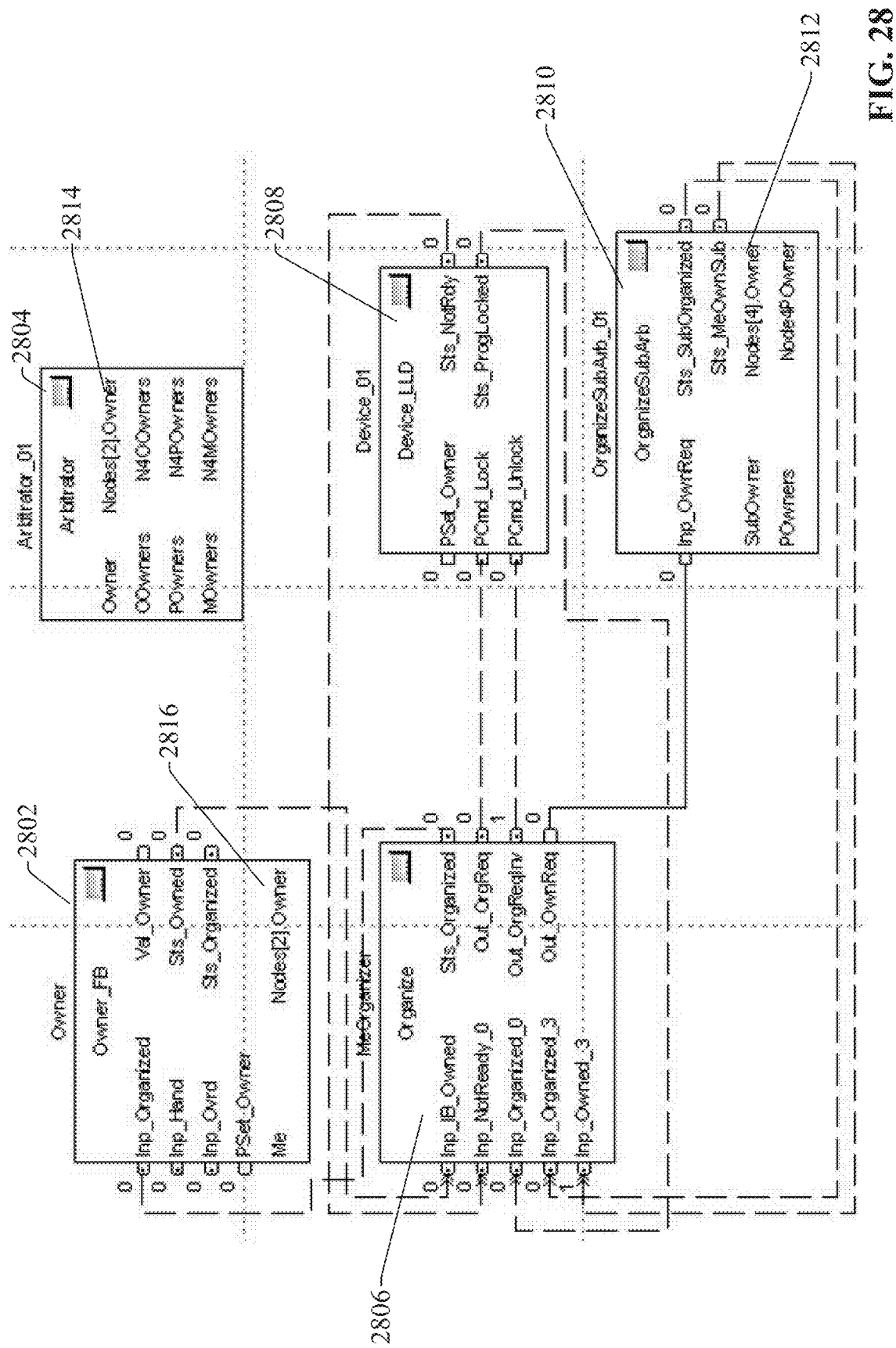
FIG. 28 is example code that can be used to define a device group and manage ownership of the group.

Accordingly, one or more embodiments of industrial controller 502 (or other programmable industrial control devices) can allow the user to define groups of industrial devices within the industrial controller configuration, and to apply customized mode model definitions and ownership functions to selected defined groups. Such groupings can be defined via client interface component 504 and executed and enforced by program execution component 506. In some embodiments the device group definitions can be configured using the same configuration application 610 used to develop the control program 530 and configure the mode model data 528 (see FIG. 6). FIG. 28 is example code that can be used to define a device group and manage ownership of the group according to one or more embodiments. In this example, one or more Device function blocks 2808 representing corresponding one or more industrial devices 120 to be included in the group are linked to an Organizer function block 2806. An Owner function block 2802, which controls ownership of group of devices associated with Organizer function block 2806, is linked to the Organizer function block 2806. In addition to Device function blocks 2808, Organizer function block 2806 can also interface with one or more Sub-organizer function blocks 2810 that link to respective sub-entities (e.g., industrial devices or device groups) that have their own associated ownership function (identified by the name 2812 of the Organizer function block associated with the sub-entity). In this way, ownership chains comprising linked entities (e.g., devices) and sub-entities can be created, and ownership modes can be propagated downward through the defined chains.

Figure 29:
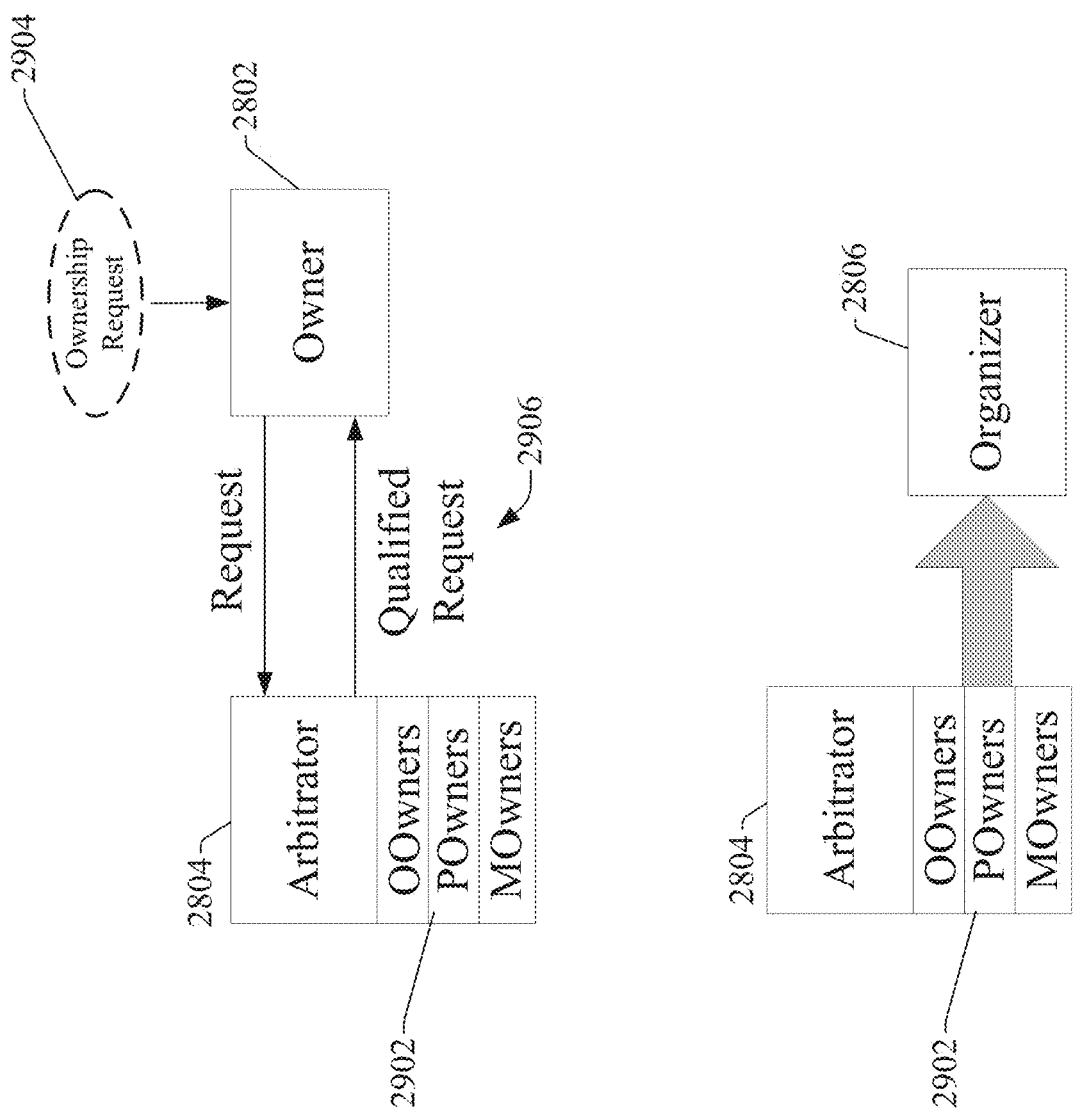
FIG. 29 is a block diagram illustrating generalized data exchanges between functional program entities.

An Arbitrator function block 2804 is associated with the Owner function block 2802 (as specified by the name in the Owner field 2814 matching the name 2816 of the Owner function block). FIG. 29 is a block diagram illustrating generalized data exchanges between the functional program entities according to an example embodiment. The Arbitrator function block 2804 manages ownership requests received from the Owner function block 2802. In particular, when a request 2904 for ownership of the device group associated with the Organizer function block 2806 is generated (that is, a request from the program or from an operator for control of the industrial asset or chain of assets defined by the group definition), the Owner function block 2802 passes the ownership request and the owner identifier associated with the requested (e.g., Program, Operator, or another defined owner identifier) to the Arbitrator function block 2804, which applies the arbitration rules defined by the mode model data 528, and returns a qualified owner request 2906 to the Owner function block 2802 based on the arbitration rules, where the qualified owner request 2906 permits or denies the request for ownership based on the arbitration rules (e.g., the user-defined mode model data 528 associated with the ownership function).

In an example embodiment, the Arbitrator function block 2804 can manage a data stack 2902 that maintains multiple owner identifiers. In the illustrated example, in addition to the Program and Operator owner identifiers (POwners and OOwners), Arbitrator function block 2804 supports a third owner entity associated with maintenance activities (MOwners). In some embodiments, the system can allow any number of additional ownership entities—beyond the Program and Operator entities—to be added and managed by the ownership management system. In an example embodiment, the data stack 2902 can be an in-out array (e.g., a double integer stack). During operation, the Organizer function block 2806 can query the ownership data stack 2902 in order to determine its existence and position in the array. It is to be appreciated that other programmatic architectures for managing ownership of the equipment group or chain are within the scope of one or more embodiments.

Figure 30:
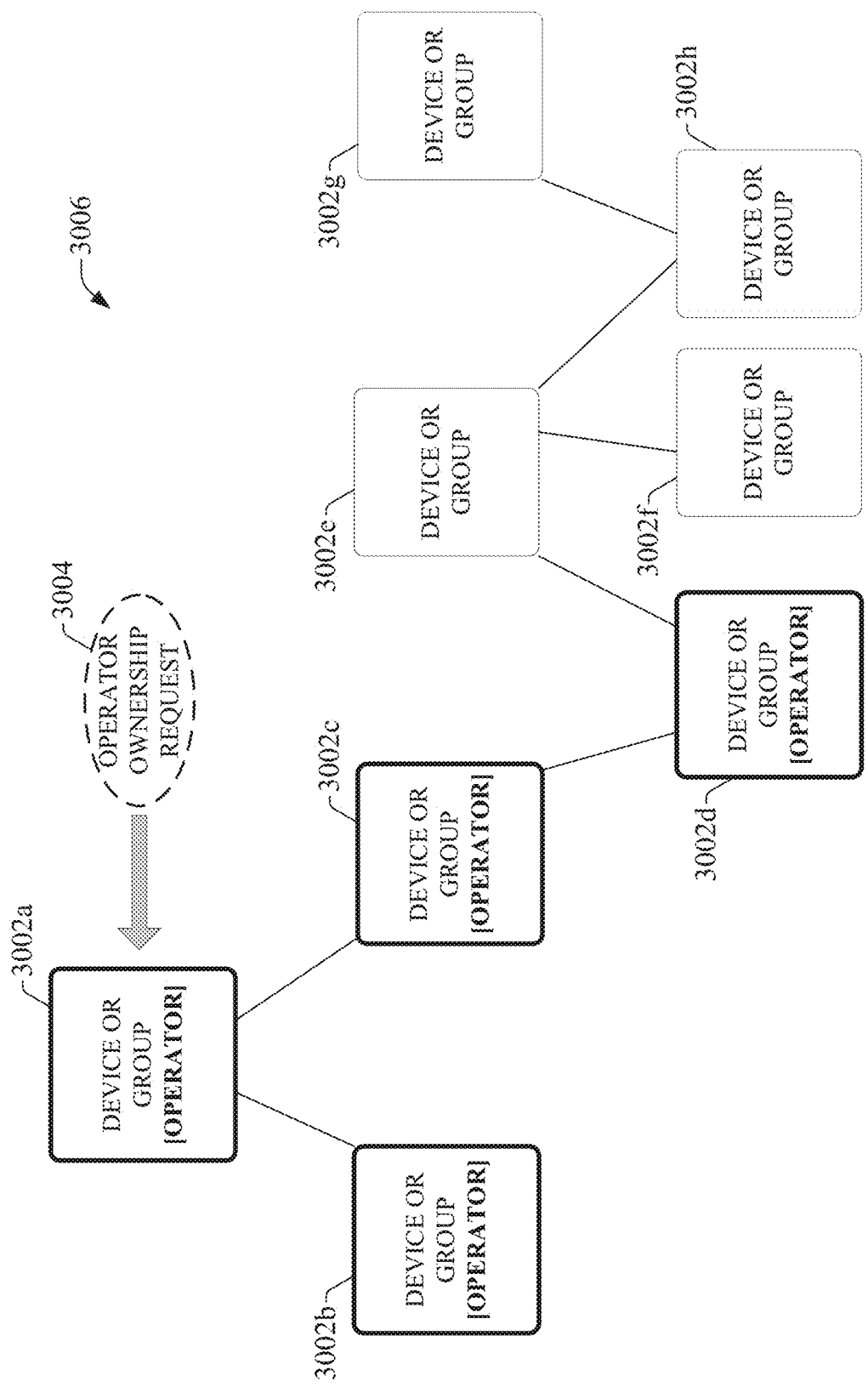
FIG. 30 is a conceptual diagram illustrating an example organizational scheme.

The programmatic architecture described above can allow complex, multi-level equipment organizational schemes to be defined, and ownership management functions to be associated with selected levels or entities within the scheme. FIG. 30 is a conceptual diagram illustrating an example organizational scheme 3006 that can be defined using the ownership definition techniques described above in connection with FIG. 28 (or using another programmatic interface). Organizational scheme 3006 comprises multiple industrial devices or assets 3002, with ownership chains between the devices defined in accordance with the group organizations and sub-organizations configured by the user. In an example scenario, if an operator or program initiates a request 3004 for ownership of device 3002a and is granted ownership in accordance with arbitration rules associated with the device 3002a, ownership is propagated downward to include the devices at lower levels of the ownership chain below the device 3002a (e.g., devices 3002b, 3002c, and 3002d). In an example scenario involving the tank described above, an equipment group comprising at least the outlet valve and the pump associated with the storage tank can be created and an ownership mode model defined for the group. During runtime, the program or the operator can take ownership of the group—arbitrated based on the rules set forth by the mode model—and instruct the group to perform a defined coordinated operation relating to the tank (e.g., a command to drain the tank will cause the industrial controller 502 to open the outlet valve and start the pump).

Conventionally, ownership management within an equipment organization scheme comprising multiple hierarchical levels of industrial devices and equipment has been prohibitively complex, requiring users to either restrict the number of levels within the equipment organizational scheme (e.g., by adhering strictly to the S88 hierarchy), or by programming a global routine for the sole purpose of multilayer ownership management, which can require specific and complicated coding techniques. Such solutions are often coded as continuously scanned chains that manage device ownership in a synchronous manner. These synchronous coding techniques for ownership management can contribute to processor inefficiency and yields a restrictive coding regime. Moreover, such synchronous coding techniques preclude ownership coordination among asynchronous multiprocessor systems, since code for managing ownership of organizational chains is restricted to linear, synchronous execution (e.g., the ownership status of each device must be examined and modified in sequence using continuously executing code).

By contrast, the ownership coding and execution system described above in connection with FIGS. 27-30—operating in conjunction with the customizable ownership arbitration rules—yields ownership code that operates independently and asynchronously. For example, rather than continuously scanning all devices in connection with ownership management, ownership code for a given organizational group or chain only executes in response to a request for ownership of that group, and only the devices included in the chain are examined and updated by the processor (e.g., the processor 520 of the industrial controller). This both mitigates the need to generate complicated ownership management code and reduces the processing load dedicated to managing ownership of equipment control. Moreover, since the resulting ownership management code executes asynchronously, the ownership management scheme can encompass multiple independent or distributed control systems, including systems that are remote relative to industrial controller 502.

Moreover, the ownership coding and execution techniques described above facilitate bidirectional status propagation through a defined ownership chain. For example, if a defined group of devices is the object of an ownership request, and a lower level entity within the ownership chain—e.g., device or entity 3002d in FIG. 30—is either already owned by another entity (e.g., by virtue of its membership in a second ownership chain) or cannot attain the requested mode due to an override condition or a "not ready" status, the upper level entities of the ownership chain will be aware of this status by virtue of the defined hierarchy, and the system can generate appropriate feedback information indicating that the ownership request cannot be satisfied and perform any suitable ownership request failure handling.

The ownership code used to define ownership groups can be easily encapsulated and transported. In some scenarios, the ownership code can reside within the relevant devices with which the ownership code is concerned. For example, an ownership function that owns, organizes, and monitors a given group of devices and/or equipment can fully reside in a code segment (e.g., a segment of a control program) within the relevant equipment. Thus, if that code segment is exported and reimported into a control project, all defined ownership rules and characteristics are transferred with the control code. In other scenarios, ownership and organization functions can reside separately from the lower level entities in order to accommodate modularity, whereby lower level devices or entities may change from project to project, but the project as a whole will still reference collection of lower level entities as a collective (but possibly varying) entity capable of being owned and monitored. This transferability of ownership code can be useful for enterprises that comprise multiple instances of a common function (e.g., a tank discharge) at different locations, but where this common function may be carried out by different combinations of devices at each location.

Figure 31:
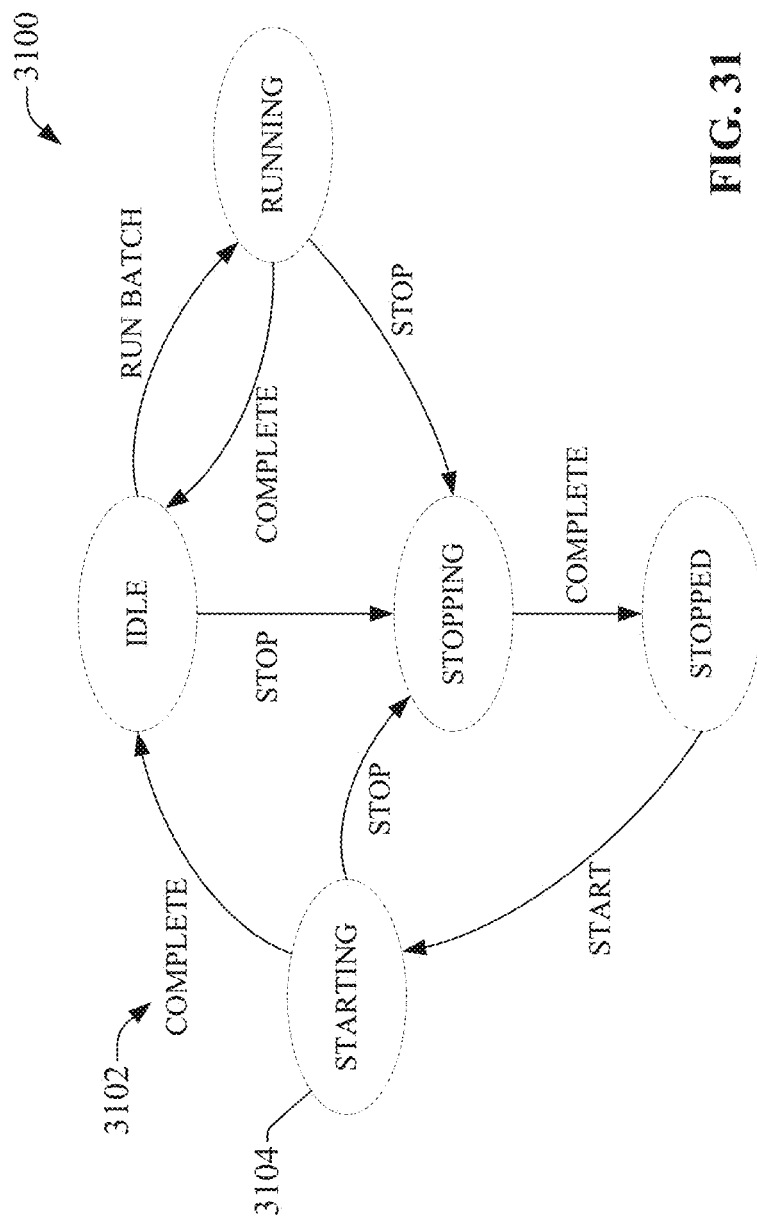
FIG. 31 illustrates an example state machine representing states and transition events for an example automation system, subsystem, or device monitored and controlled by an industrial controller.

As noted above, the asynchronous nature of the ownership arbitration code yielded by embodiments of the systems described herein can facilitate ownership management within the context of distributed automation systems comprising separate, independently executing industrial controllers, such as the example control architecture depicted in FIG. 27. In such distributed control scenarios, one of the distributed industrial controllers 502 may receive an instruction from a remote system—e.g., a batch management system 104, an HMI 114, an ERP or MES system, another industrial controller, etc.—to transition one of its controlled devices, machines, or processes to a desired state (e.g., Opened, Closed, Idle, Home, Stopped, Running, etc.). System designers often use state diagrams as a design tool for developing suitable control programs for their automation systems. FIG. 31 illustrates an example state machine 3100 representing states and transition events for an example automation system, subsystem, or device monitored and controlled by an industrial controller 502. According to state machine modeling, an automation system or machine exists, at any given time, in one of a predefined set of states. Example state machine 3100 models a set of possible system states 3104 as well as transition events 3102 that cause the system to transition from one state to another. For example, according to state machine 3100, if the system is currently in the "Idle" state and receives a "Run Batch" command, the system will transition to a "Running" state. While in the "Running" state, the system may receive either a "Complete" indication that causes the machine to transition back to the "Idle" state, or a "Stop" command that causes the system to transition to the "Stopping" state.

When translated to executable controller programming, commands for transitioning to another state are gated by the current state of the state machine. That is, a command to transition to a desired state will only cause the controlled device or machine to transition to that desired state if the current state of the device or machine permits transition to the desired state. With regard to the example state machine depicted in FIG. 31, transition from the Idle state to the Running state is permitted, and requires only a Run Batch command to initiate the transition. On the other hand, transitioning from the Stopped state to the Running state requires the system to transition through two intermediate states—the Starting state and the Idle state. When an operator is manually issuing control commands, navigation between states requires operator knowledge of both the destination state and the appropriate command or series of commands required to navigate the state machine from the current state to the desired state. Likewise, when a separate programmatic entity is issuing commands to the controller—e.g., a batch management system, an ERP or MES system, another industrial controller, etc.—the programmatic entity must be aware of both the desired destination state and the appropriate command sequence required to achieve the desired destination state.

This control of state machine navigation by remote entities can require extensive bi-directional communication between the industrial controller being instructed and the operator or programmatic entity driving the industrial controller to the desired state, since the remote controlling entity must be provided with repeated feedback indicating when each state transition has been completed, so that the remote entity knows when to issue the command to transition to the next state in the path to the destination state. For distributed systems requiring coordination of multiple subordinate entities, this type of supervisory control can become even more complicated, and may lead to synchronization errors in which entities are inadvertently driven to unexpected states and cannot be driven to the desired destination state directly or easily without knowledge of the command/state structure. For example, with reference to FIG. 27, the batch management system 104 (a programmatic entity), the HMI 114 (an operator-driven entity), or another commanding entity may require all equipment involved in a manufacturing process to transition to a specified state (e.g., Stopped, Paused, Held, etc.). The equipment may comprise multiple machines or devices that are controlled independently by respective industrial controllers 502 (e.g., controllers 502$_1$, 502$_2$, etc.), and these distributed items of equipment may currently be in different states. Using traditional command/state paradigms, the current status of each item of equipment must be determined so that the appropriate command for transitioning the equipment to the next state in the path to the destination state can be issued by the commanding entity. These techniques also require the commanding entity—either the operator or a programmatic entity—to have sufficient knowledge of the underlying state machines for each item of equipment so that the appropriate state transition commands can be selected and sent at the appropriate times. Particularly within the context of remote equipment structures, this conventional command/state paradigm can become complicated.

To address these and other issues, one or more embodiments of industrial controller 502 can support development and execution of destination-based state machines that require, as a command, only an indication of a desired destination state. In response to receipt of a command identifying the desired destination state of a state machine associated with a unit of equipment, the program execution component 506 will identify a path through the state machine from the current state of the equipment to the indicated destination state, and generate a control output sequence that drives the equipment from the current state to the destination state via the path through the state machine. When the destination state has been achieved, the control program will generate an indication that the requested state transition has been completed, which can be read by the commanding entity (e.g., a remote system such as a batch management system, an HMI, etc.). The use of destination-based state machines does not require the controlling entity (e.g., an operator or remote programmatic entity) to have knowledge of the command/state structure of the equipment's underlying state machine. Rather, the controlling entity need only provide the desired destination state, and the destination-based state machine executed by the industrial controller 502 will drive the equipment to the desired state via a suitable control path and provide an indication when the destination state has been reached.

Figure 32:
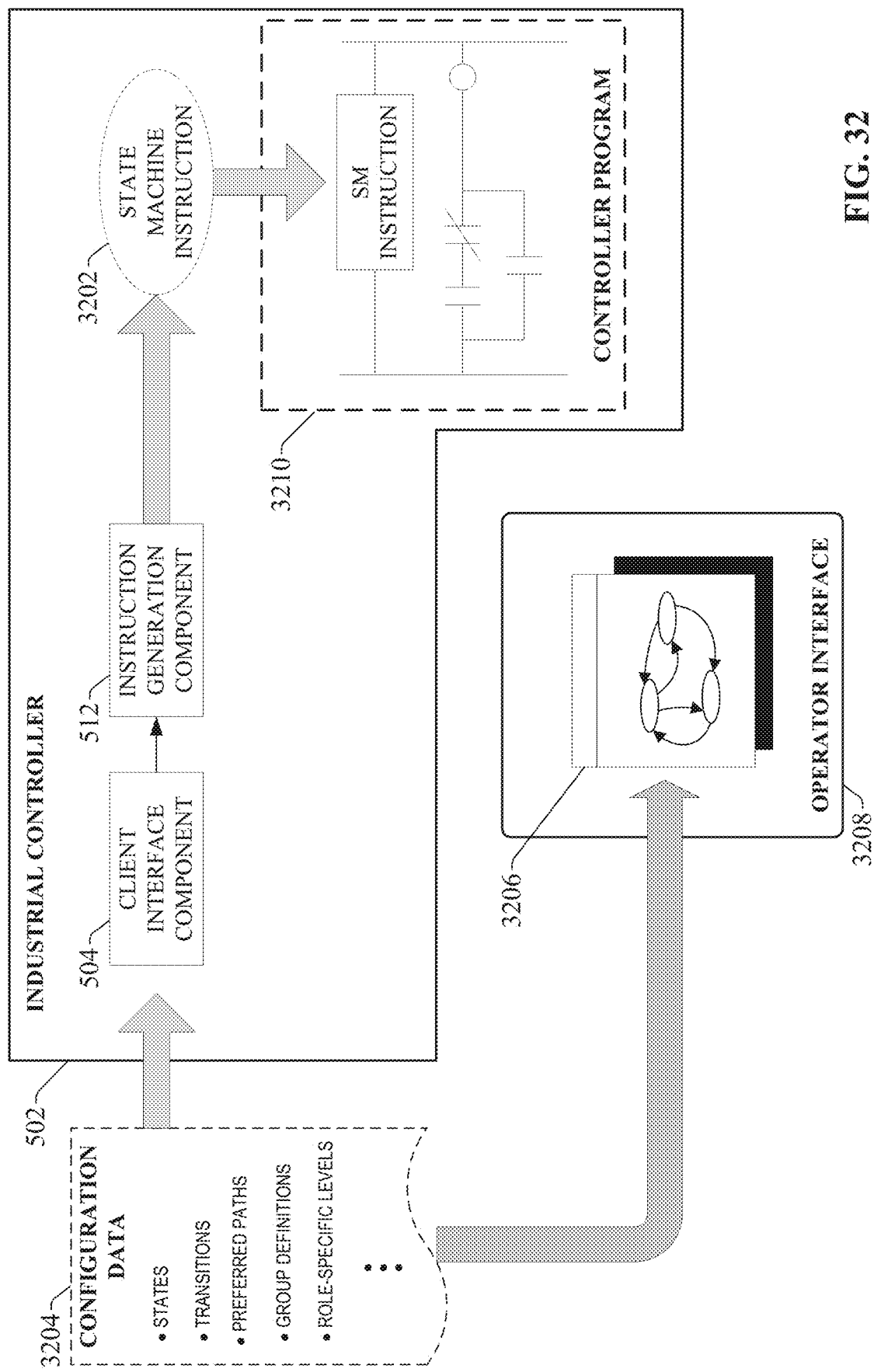
FIG. 32 is a diagram illustrating generation of a destination-based state machine instruction by an industrial controller in accordance with user configuration input.

FIG. 32 is a diagram illustrating generation of a destination-based state machine instruction by the industrial controller 502 in accordance with user configuration input. To facilitate creation of a state machine for controlling a device, machine, process, or item of equipment, the designer can provide state machine configuration data 3204 defining the state machine via client interface component 504. In an example implementation, the user can enter the state machine configuration data 3204 using state machine configuration interface displays provided by configuration application 610 (see FIG. 6), which is used to program and configure industrial controller 502. These configuration interface displays can include features that guide the user through the process of entering information defining the state machine, which is then compiled and integrated as part of the control program. State machine configuration data 3204 can include, for example, identification of the system states comprising the state machine and the commands for transitioning between the states. Configuration data 3204 can also include definitions of preferred paths through the state machine for transitioning between non-adjacent pairs of states. These path definitions can be entered, for example, by identifying the beginning and destination states for which the path is being defined, and identifying which intervening states (if any) should be traversed in response to a request to transition to the destination state while the equipment is in the beginning state. In scenarios in which more than one path between the beginning and destination states are available, the user can select which of the available paths is to be the preferred path for transitioning from the beginning state to the destination state.

Configuration application 610 (or client interface component 504) can provide an intuitive interface for specifying the required states, transitions, and preferred paths for the state machine. For example, in one or more embodiments, the configuration interface can present a list of common predefined system states (e.g., S88 states such as "Idle," "Running," "Stopped," etc.) and allow the user to select the states from the predefined list. Likewise, the configuration interface can present a list of common state transitions and allow the user to associate selected state transitions with the states. The configuration interface can also allow the user to create user-defined states for inclusion in the state machine. In another example, the configuration interface may provide a graphical development environment that allows the user to build a desired state machine by interacting with graphical icons (e.g., state bubbles, transition arrows, etc.) in a drag-and-drop manner.

In addition to the state, state transition, and preferred path definitions, configuration data 3204 can include group definitions and definitions for role-specific levels. Group definitions can allow state machines to be defined completely or in part within other state machines, providing a means to create more intricate state machines suitable for control of complex processes. The role-specific levels can allow multiple different state machines to be created for a given automation system, where each state machine is associated with a particular user role (e.g., operator, maintenance, engineer, administrator, etc.). Role-specific state machines instructions can be used to vary machine behavior based on a role of the user interacting with the system.

After the configuration data 3204 has been entered, instruction generation component 512 can compile the configuration data to yield a state machine instruction 3202. State machine instruction 3202 can be imported into and executed by the industrial controller 502 as part of control program 3210 to enforce the state machine behavior defined by the configuration data 3204. For example, controller program 3210 may be a ladder logic program comprising code sections that control respective aspects of an industrial machine or process. The state machine instruction 3202 can be imported into controller program 3210 and added to a rung of the ladder logic in order to enforce correct state transition behavior of the process. The user may, for example, define which portions of the ladder logic code control the "running" state of the process, which controller address or tag indicates that the "complete" event has occurred, which controller address or tag corresponds to the "starting" state, etc. These definitions can be specified in the configuration data 3204 or, in some embodiments, may be defined using fields accessible through interaction with the state machine instruction 3202. During execution, the state machine instruction 3202 can supervise execution of the ladder logic to enforce adherence to the defined state machine.

In another example, the state machine instruction 3202 can be executed in conjunction with a sequence manager that defines equipment actions and sequences for making a product according to a defined process. In this scenario, the sequence manager can reference the state machine instruction 3202 to determine the current state of the process and determine the next required state given current conditions. The sequence manager can then run the set of instructions corresponding to the next state indicated by the state machine instruction 3202, and provide feedback to the state machine instruction 3202 when the transition to the next step is complete. In this way, the state machine instruction 3202 supervises the steps executed by the sequence manager to ensure that the process adheres to the defined state machine behavior.

The state machine instruction 3202 can be protected within the controller program 3210 so that the state machine cannot be circumvented or modified, ensuring that the controlled process complies with the desired state machine behavior. In this way, modifications to the control program after deployment will not cause the controlled process to deviate from the state machine behavior enforced by the state machine instruction 3202. For example, addition of a new piece of equipment to a stage of the automation system may require maintenance personnel to add to or alter a portion of the controller program 3210 that controls the "running" state of the process. If the desired state machine behavior had been encoded entirely with controller code (e.g., ladder logic), there is a possibility that the modifications would inadvertently alter the state machine behavior. However, with the state machine instruction 3202 in place, the desired state machine behavior is fixed and cannot be circumvented by changes to the controller logic.

Figure 33:
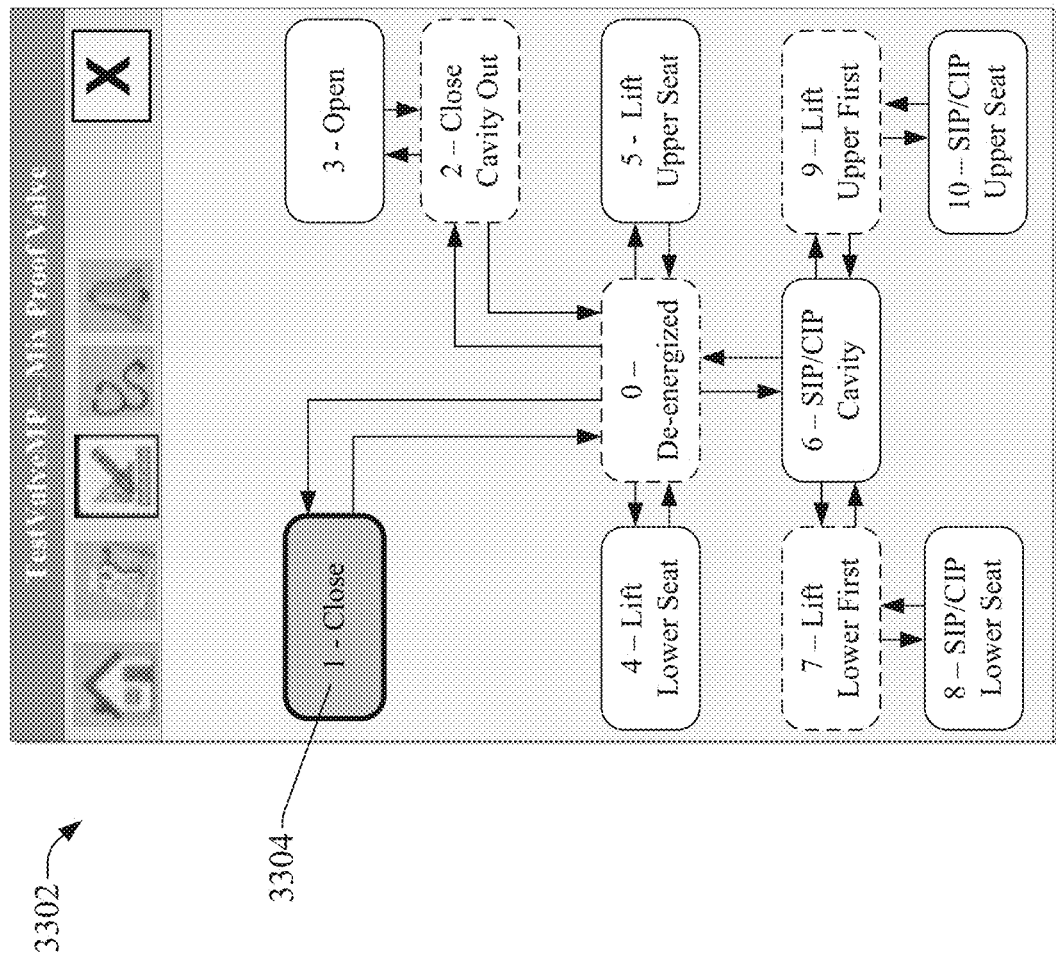
FIG. 33 is a user interface display rendering a graphical representation of an example state machine corresponding to a state machine instruction.

In one or more embodiments, the configuration application 610 can also generate a graphical representation 3206 of the state machine based on the configuration data 3204 provided by the user. The graphical representation 3206 can comprise an animated graphic representing the state machine that can display live state information for the running system based on data read from the state machine instruction 3202. FIG. 33 is a user interface display 3302 rendering a graphical representation of an example state machine corresponding to a state machine instruction 3202. The illustrated example depicts an example state machine for a mix proof valve. Interface display 3302 can be a display of an HMI application or other graphical user interface configured to visualize the system or process controlled by the control program of industrial controller 502. The graphical representation includes state icons corresponding to the states defined by the configuration data, as well as arrows indicating the allowable transitions between the states. During runtime, the graphical representation can indicate the current state of the controlled equipment by rendering the state icon 3304 corresponding to the current state using a different color than the other state icons (in the illustrated example, the mix proof valve is currently in the closed position). In an example scenario, the interface display 3302 can be invoked in a runtime viewing environment by selecting a graphical icon corresponding to the equipment (e.g., a valve graphic) with which the state machine is associated.

During runtime, program execution component 506 executes state machine instruction 3202 in the industrial controller 502 as part of an industrial control program 3210, while the graphical representation 3206 resides in an operator interface 3208 and can be invoked via interface display 3302. The graphical representation 3206 can display state information generated by the state machine instruction 3202 to convey the current state of the automated system.

Since the state machine definition (comprising configuration data 3204) includes preferred path definitions for respective pairs of defined states, program execution component 506 can leverage this pre-defined preferred path information to transition the controlled equipment from a current state to a selected destination state given only the identity of the requested destination state from the controlling entity, even if the current and destination states are non-adjacent (that is, one or more intermediate states are defined between the current and destination state in the state machine definition). Consequently, the controlling entity (e.g., a remote programmatic entity such as a batch management system, or an operator issuing manual commands via an HMI) need not have knowledge of the underlying state machine for the equipment in order to instruct the controller 502 to move the equipment to the desired state. Rather, the controlling entity need only provide an indication of the desired destination state to the controller 502, and the controller will perform the necessary control sequence to drive the equipment to the indicated destination state.

Figure 34:
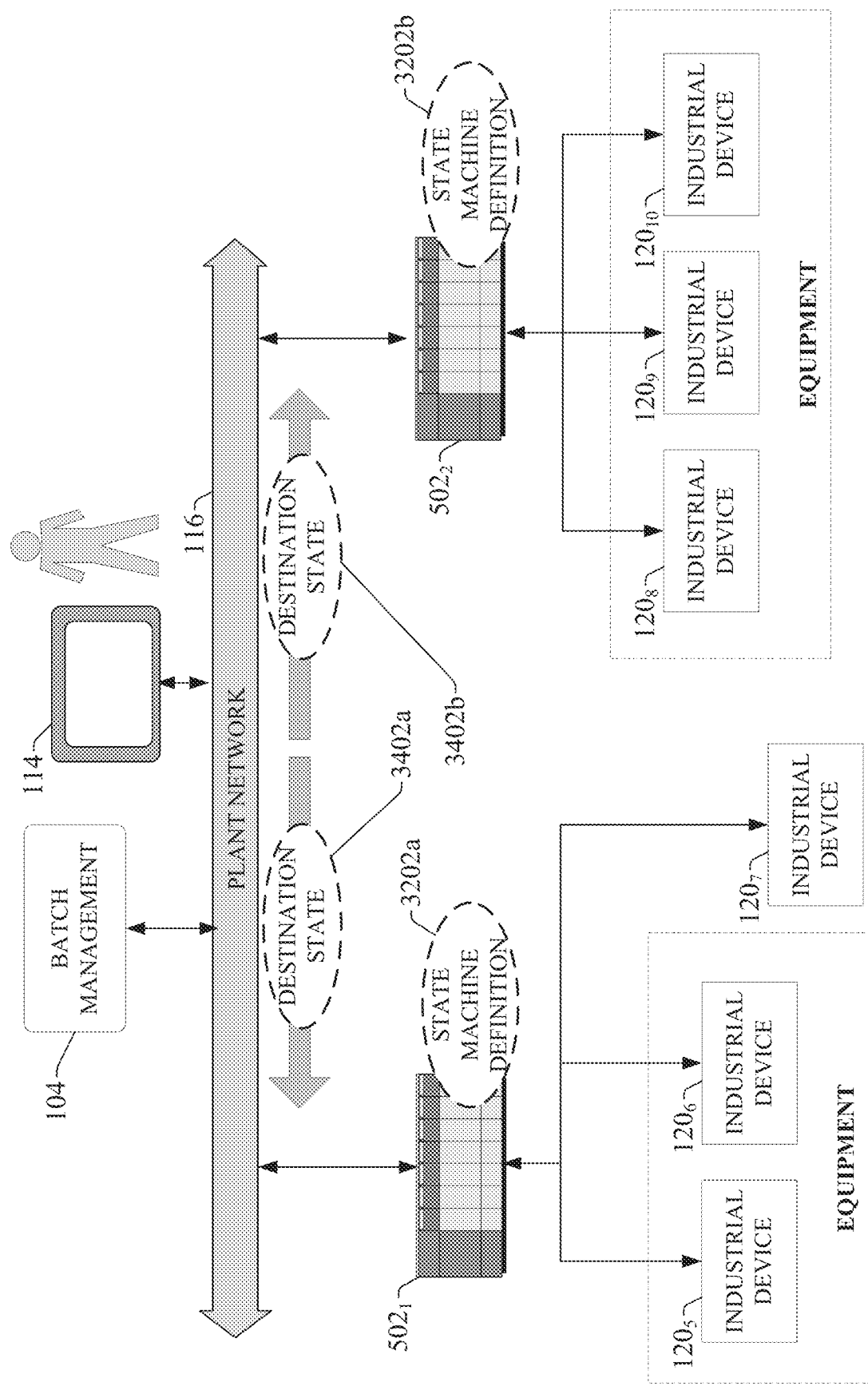
FIG. 34 is a diagram of an example architecture comprising two or more industrial controllers that control respective aspects of a batch process, in which a supervisory control entity sends a desired destination state to the controllers.

FIG. 34 is a diagram of an example architecture comprising two or more industrial controllers 502 that control respective aspects of a batch process. Each industrial controller 502 operates primarily independently to monitor and control their respective portions of the batch process via input and output industrial devices 120 (some of which may be programmatically grouped into equipment groups for ownership management purposes, as described in previous examples). State machine instructions 3202 have been defined for one or more items of equipment controlled by the respective controllers 502. In some instances, a remote or supervisory control entity—such as a batch management system 104 or an operator issuing commands via an HMI—may issue an instruction to place equipment controlled by the respective industrial controllers 502 in a specified state (e.g., Stopped, Paused, Held, etc.). The items of equipment controlled by the respective controllers 502 may be in different states at the time the instruction is issued.

Figure 35:
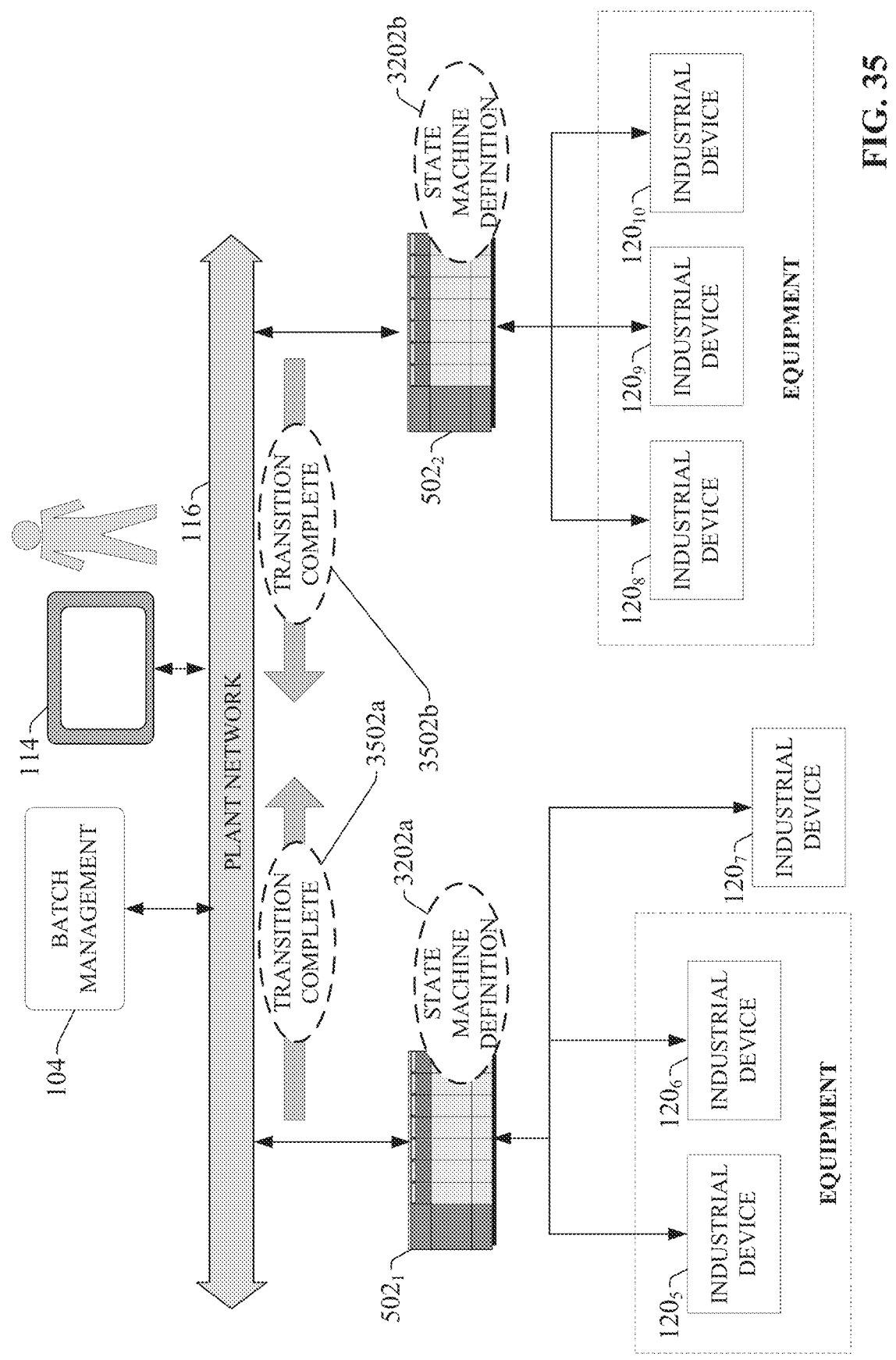
FIG. 35 is a diagram of the example architecture comprising two or more industrial controllers, in which the controllers confirm transition to the desired destination state.

According to the destination-based state machine definitions, the supervisory control entity need only issue send instructions 3402 identifying the desired destination state to the respective controllers 502 in order to initiate the desired transition. In response to receiving these instructions 3402, the program execution component 506 of each controller will issue the necessary control instructions to traverse the equipment to the desired state via the pre-defined preferred state machine path between the current state and the indicated destination state. As illustrated in FIG. 35, in response to successful traversal of the equipment to the indicated destination state, the program execution component 506 of each controller 502 will generate a "transition complete" indication 3502 conveying to the supervisory control entity that the equipment is now in the desired state.

This approach is in contrast to conventional state machine-based control, which requires the supervisory control entity to identify the current state of each item of equipment, determine the transition command required to move the equipment from this current state to the next state in the path to the destination state, issue this transition command, await confirmation from the controller that the transition is complete, and if the destination state is not yet reached, determine the next required state in the path to the destination state and issue the next necessary transition command. In addition to eliminating the need for the remote supervisory control entity to have full knowledge of the underlying state machine definition that controls the equipment, the destination-based state machine techniques described herein can reduce the amount of bi-directional data traffic on the plant network required to affect a desired transition from a current state to a desired destination state.

Figure 36:
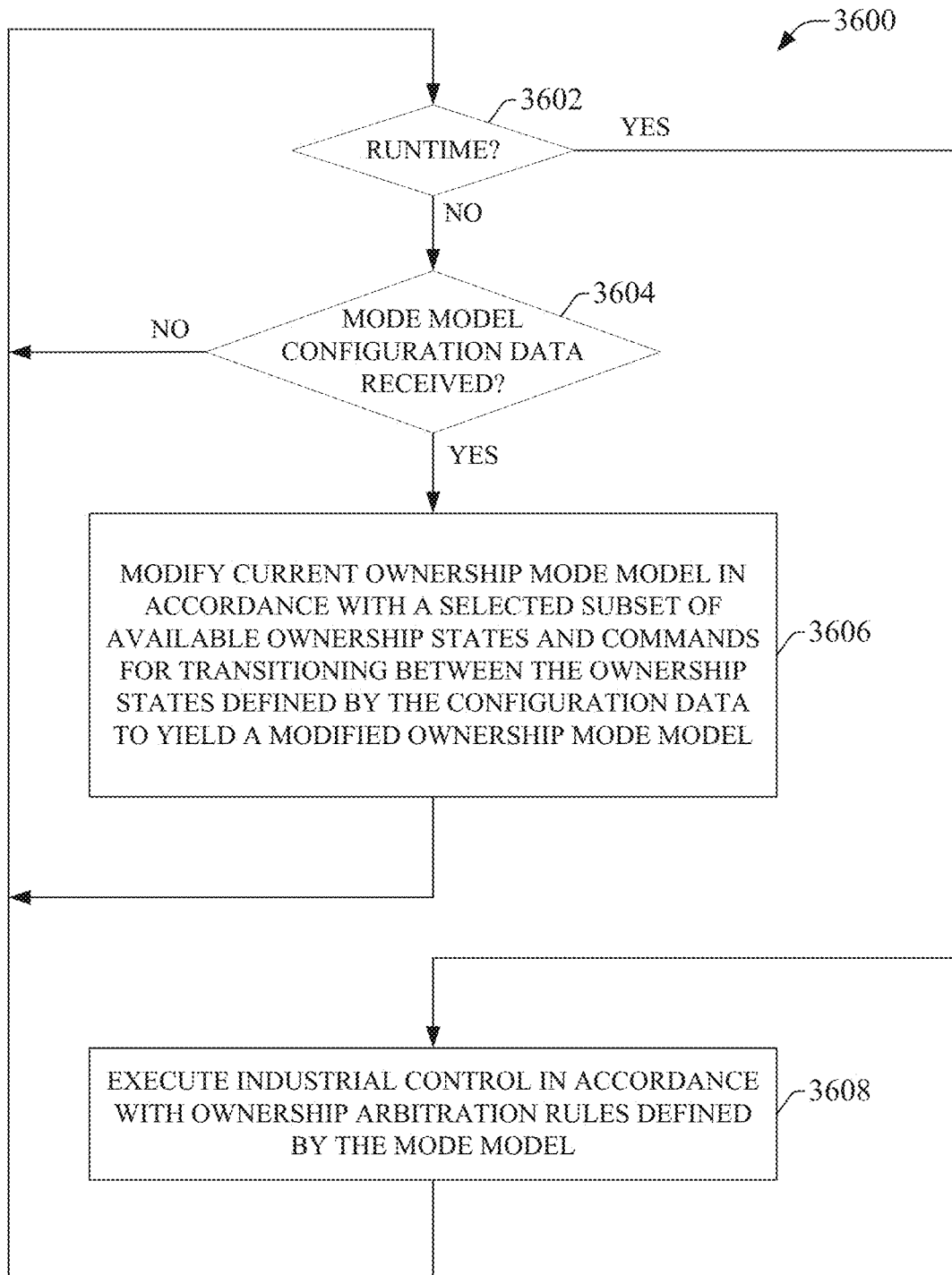
FIG. 36 is a flowchart of an example methodology for configuring a mode model that controls ownership arbitration between a program and an operator within an industrial control device.
Figure 37:
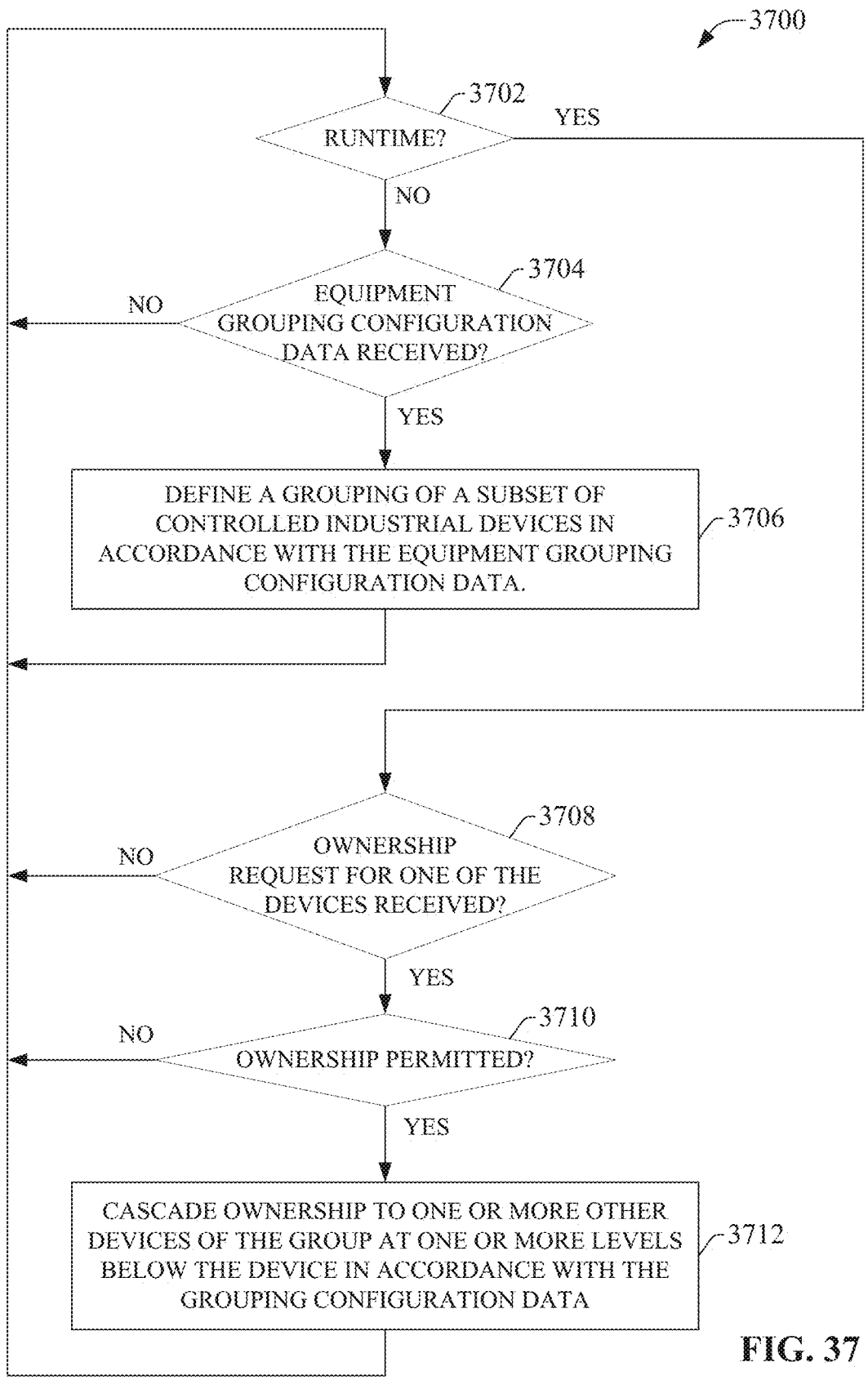
FIG. 37 is a flowchart of an example methodology for defining and managing control ownership of industrial devices in a multi-level organizational scheme.
Figure 38:
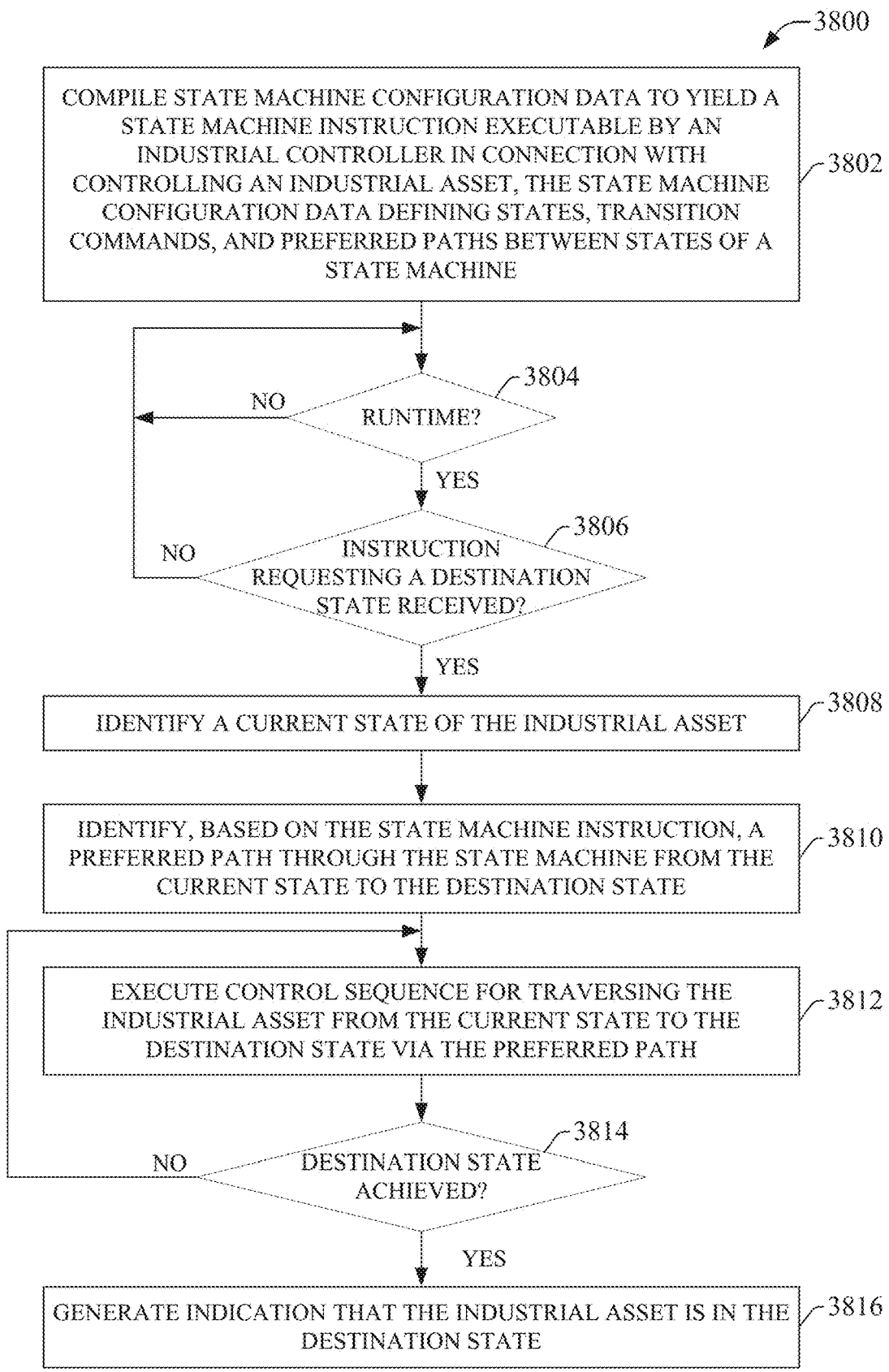
FIG. 38 is a flowchart of an example methodology for compiling and executing a destination-based state machine in an industrial control device.

FIGS. 36-38 illustrate example methodologies in accordance with one or more embodiments of the subject application. While, for purposes of simplicity of explanation, the methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 36 illustrates an example methodology 3600 for configuring a mode model that controls ownership arbitration between a program and an operator within an industrial control device. Initially, at 3602, a determination is made as to whether the industrial control device (e.g., an industrial controller such as a PLC, a motor drive, or another type of industrial device) is currently in runtime mode. If the industrial control device is not in runtime mode (NO at step 3602), the methodology proceeds to step 3604, where a determination is made as to whether mode model configuration data has been received. The mode model configuration data may be received, for example, via a configuration application executing on a client device communicatively connected to the industrial control device. If no mode model configuration data is received (NO at step 3604), the methodology returns to step 3602, and steps 3602 and 3604 are repeated until either the industrial control device switches to runtime mode or mode model configuration data is received.

If mode model configuration data is received (YES at step 3604), the methodology proceeds to step 3606, where a current ownership mode model associated with the industrial control device is modified in accordance with the mode model configuration data received at step 3604. This can include defining the mode model to include a subset of available ownership states specified by the configuration data, and defining transition commands for transitioning between the ownership states as specified by the configuration data. In some embodiments, the mode model configuration data can be generated based on user selection of one of multiple pre-defined mode model configurations. The mode model configuration data can also define user-specified modifications to a selected one of the pre-defined mode model configurations.

After the ownership mode model has been modified yielding a modified ownership mode model at step 3606, the methodology returns to step 3602, and steps 3602 and 3604 are again repeated until the control device switches to runtime mode or additional mode model configuration data is received. If the industrial control device switches to runtime mode (YES at step 3602), the methodology proceeds to step 3608, where the industrial control device executes industrial control of a machine, process, or automation system in accordance with ownership arbitration rules defined by the mode model. In particular, the industrial control device arbitrates between programmatic and operator control ownership based on the ownership arbitration rules represented by the ownership mode model.

FIG. 37 illustrates an example methodology 3700 for defining and managing control ownership of industrial devices in a multi-level organizational scheme. Initially, at 3702, a determination is made as to whether an industrial control device for which an ownership model is to be configured is in runtime mode. If the industrial control device is not in runtime mode (NO at step 3702), the methodology proceeds to step 3704, where a determination is made as to whether equipment grouping configuration data is received (e.g., via a configuration application communicatively connected to the industrial control device). If no equipment grouping configuration data is received (NO at step 3704), the methodology returns to step 3702, and steps 3702 and 3704 are repeated until either the industrial control device switches to runtime mode or equipment grouping configuration data is received.

If equipment grouping configuration data is received (YES at step 3704), the methodology proceeds to step 3706, where a grouping of a subset of controlled industrial devices is defined in accordance with the equipment grouping configuration data received at step 3704. In an example scenario, the industrial control device may be configured to monitor and/or control a set of industrial input and output devices (e.g., valves, pumps, meters, pneumatic actuation devices, etc.) and the equipment grouping configuration data can specify a subset of the industrial devices to be included in an equipment group; e.g., based on the fact that the subset of the industrial devices work in collaboration to perform a common operation of a controlled industrial process. The equipment grouping configuration data can also define hierarchical levels of the subset of industrial devices comprising the group based on functional relationships between the industrial devices.

After the grouping has been defined at step 3706, the methodology returns to step 3702, and steps 3702 and 3704 are repeated until the industrial control device switches to runtime mode or additional equipment grouping configuration data is received. If the industrial control device switches to runtime mode (YES at step 3702), the methodology proceeds to step 3708, a determination is made as to whether an ownership request for one of the industrial devices in the grouping established at step 3706 is received. The ownership request may be, for example, a request to transfer control ownership from a program executed by the industrial control device to an operator, or vice versa. If no ownership request is received (NO at step 3708), the methodology returns to step 3702, and steps 3702 and 3708 are repeated until the industrial control device switches out of runtime mode or an ownership request is received.

If a request for ownership of the industrial device within the grouping is received (YES at step 3708), the methodology proceeds to step 3710, where a determination is made as to whether the requested ownership is permitted. This determination can be based, for example, on ownership arbitration rules for the group defined in accordance with methodology 3600 illustrated in FIG. 36. If the ownership request is not currently permitted (NO at step 3710), the methodology returns to step 3702. Alternatively, if the ownership request is permitted (YES at step 3710), the methodology proceeds to step 3712, where, in accordance with the grouping configuration data, control ownership is cascaded to one or more other devices within the groups at one or more defined levels below the industrial device for which the ownership request was received at step 3708.

FIG. 38 illustrates an example methodology 3800 for compiling and executing a destination-based state machine in an industrial control device (e.g., an industrial controller such as a PLC or another type of industrial control device). Initially, at 3802, state machine configuration data is compiled to yield a state machine instruction executable by an industrial controller (or another industrial control device) in connection with controlling an industrial asset. The state machine configuration data defines states of the state machine, transition commands for transitioning between adjacent states, and preferred paths between non-adjacent states of the state machine.

At 3804, a determination is made as to whether the industrial controller is in runtime mode. When the industrial controller switches to runtime mode (YES at step 3804), the methodology proceeds to step 3806 where a determination is made as to whether an instruction is received requesting that the industrial asset be transitioned to an indicated destination state. When such an instruction is received (YES at step 3806), the methodology proceeds to step 3808, where a current state of the industrial asset is identified. At 3810, a preferred path through the state machine from the current state to the destination state is identified based on the state machine instruction compiled at step 3802 (e.g., based on the preferred path information encoded in the state machine instruction).

At 3812, a control sequence for traversing the industrial asset from the current state identified at step 3808 to the destination state requested at step 3806 via the preferred path identified at step 3810 is executed by the industrial controller. If the current state and the destination state are not adjacent states per the state machine, this can include controlling the industrial asset to traverse one or more intermediate states defined by the state machine. However, the source of the request received at step 3806 is not required to receive feedback regarding the transition through the state machine, or to initiate individual transition commands between adjacent states within the path. At 3814, a determination is made as to whether the industrial asset has achieved the destination state. If the industrial asset has not yet achieved the destination state (NO at step 3814), step 3812 continues to execute until the industrial asset reaches the destination state indicted by the request received at step 3806. When the destination state is achieved (YES at step 3814), the methodology proceeds to step 3816, where an indication that the industrial asset is in the destination state is generated by the industrial controller.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 39:
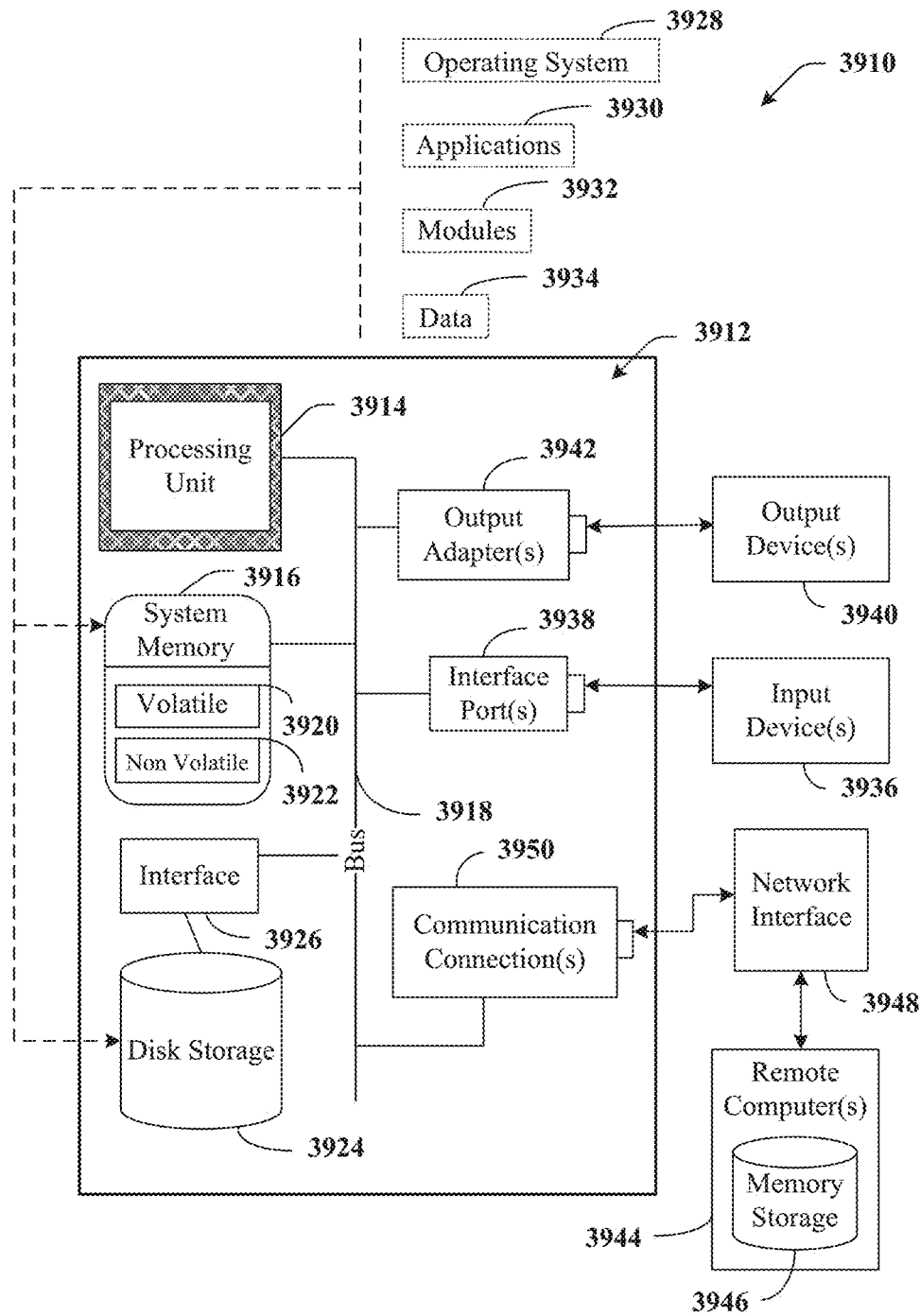
FIG. 39 is an example computing environment.
Figure 40:
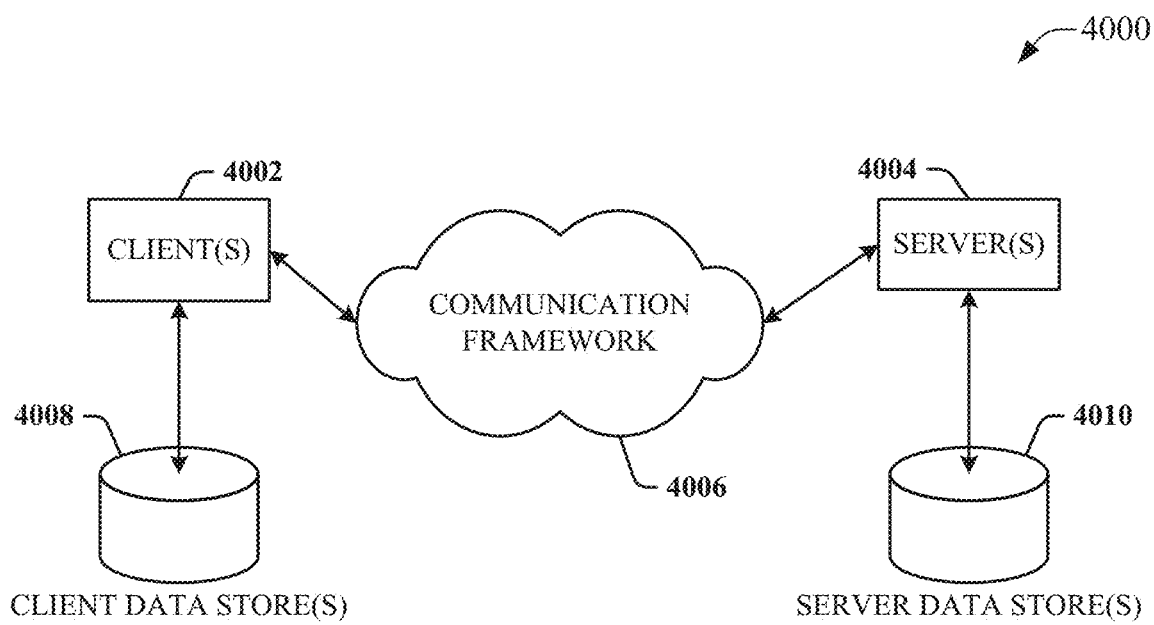
FIG. 40 is an example networking environment.

In order to provide a context for the various aspects of the disclosed subject matter, FIGS. 39 and 40 as well as the following discussion are intended to provide a brief, general description of a suitable environment in which the various aspects of the disclosed subject matter may be implemented.

With reference to FIG. 39, an example environment 3910 for implementing various aspects of the aforementioned subject matter includes a computer 3912. The computer 3912 includes a processing unit 3914, a system memory 3916, and a system bus 3918. The system bus 3918 couples system components including, but not limited to, the system memory 3916 to the processing unit 3914. The processing unit 3914 can be any of various available processors. Multi-core microprocessors and other multiprocessor architectures also can be employed as the processing unit 3914.

The system bus 3918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 3916 includes volatile memory 3920 and nonvolatile memory 3922. The basic input/output system (BIOS), containing the basic routines to transfer information between elements within the computer 3912, such as during start-up, is stored in nonvolatile memory 3922. By way of illustration, and not limitation, nonvolatile memory 3922 can include read only memory (ROM), programmable ROM (PROM), electrically programmable ROM (EPROM), electrically erasable PROM (EEPROM), or flash memory. Volatile memory 3920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 3912 also includes removable/non-removable, volatile/nonvolatile computer storage media. FIG. 39 illustrates, for example a disk storage 3924. Disk storage 3924 includes, but is not limited to, devices like a magnetic disk drive, floppy disk drive, tape drive, Jaz drive, Zip drive, LS-100 drive, flash memory card, or memory stick. In addition, disk storage 3924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 3924 to the system bus 3918, a removable or non-removable interface is typically used such as interface 3926.

It is to be appreciated that FIG. 39 describes software that acts as an intermediary between users and the basic computer resources described in suitable operating environment 3910. Such software includes an operating system 3928. Operating system 3928, which can be stored on disk storage 3924, acts to control and allocate resources of the computer 3912. System applications 3930 take advantage of the management of resources by operating system 3928 through program modules 3932 and program data 3934 stored either in system memory 3916 or on disk storage 3924. It is to be appreciated that one or more embodiments of the subject disclosure can be implemented with various operating systems or combinations of operating systems.

A user enters commands or information into the computer 3912 through input device(s) 3936. Input devices 3936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3914 through the system bus 3918 via interface port(s) 3938. Interface port(s) 3938 include, for example, a serial port, a parallel port, a game port, and a universal serial bus (USB). Output device(s) 3940 use some of the same type of ports as input device(s) 3936. Thus, for example, a USB port may be used to provide input to computer 3912, and to output information from computer 3912 to an output device 3940. Output adapters 3942 are provided to illustrate that there are some output devices 3940 like monitors, speakers, and printers, among other output devices 3940, which require special adapters. The output adapters 3942 include, by way of illustration and not limitation, video and sound cards that provide a means of connection between the output device 3940 and the system bus 3918. It should be noted that other devices and/or systems of devices provide both input and output capabilities such as remote computer(s) 3944.

Computer 3912 can operate in a networked environment using logical connections to one or more remote computers, such as remote computer(s) 3944. The remote computer(s) 3944 can be a personal computer, a server, a router, a network PC, a workstation, a microprocessor based appliance, a peer device or other common network node and the like, and typically includes many or all of the elements described relative to computer 3912. For purposes of brevity, only a memory storage device 3946 is illustrated with remote computer(s) 3944. Remote computer(s) 3944 is logically connected to computer 3912 through a network interface 3948 and then physically connected via communication connection 3950. Network interface 3948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 3948 can also encompass near field communication (NFC) or Bluetooth communication.

Communication connection(s) 3950 refers to the hardware/software employed to connect the network interface 3948 to the system bus 3918. While communication connection 3950 is shown for illustrative clarity inside computer 3912, it can also be external to computer 3912. The hardware/software necessary for connection to the network interface 3948 includes, for exemplary purposes only, internal and external technologies such as, modems including regular telephone grade modems, cable modems and DSL modems, ISDN adapters, and Ethernet cards.

FIG. 40 is a schematic block diagram of a sample computing environment 4000 with which the disclosed subject matter can interact. The sample computing environment 4000 includes one or more client(s) 4002. The client(s) 4002 can be hardware and/or software (e.g., threads, processes, computing devices). The sample computing environment 4000 also includes one or more server(s) 4004. The server(s) 4004 can also be hardware and/or software (e.g., threads, processes, computing devices). The servers 4004 can house threads to perform transformations by employing one or more embodiments as described herein, for example. One possible communication between a client 4002 and servers 4004 can be in the form of a data packet adapted to be transmitted between two or more computer processes. The sample computing environment 4000 includes a communication framework 4006 that can be employed to facilitate communications between the client(s) 4002 and the server(s) 4004. The client(s) 4002 are operably connected to one or more client data store(s) 4008 that can be employed to store information local to the client(s) 4002. Similarly, the server(s) 4004 are operably connected to one or more server data store(s) 4010 that can be employed to store information local to the servers 4004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An industrial controller, comprising:
   memory that stores executable components; and
   one or more processors, operatively coupled to the memory, that execute the executable components, the executable components comprising:
      a program execution component configured to execute an industrial control program that facilitates control, by the industrial controller, of one or more industrial assets;
      an arbitration component configured to arbitrate between program requests, from the industrial control program, for control of a portion of the industrial control program and operator requests, from a human-machine interface communicatively connected to the industrial controller, for control of the portion of the industrial control program based on arbitration rules defined by mode model data, wherein
         the mode model data defines a set of ownership modes and transition commands for transitioning between the ownership modes, and
         the ownership modes comprise one or more of a Program mode that allows program control of the portion of the industrial control program, an Operator mode that allows human-machine interface control of the portion of the industrial control program, a Program Locked mode that locks program control of the portion of the industrial control program, and an Operator Locked mode that locks human-machine interface control of the portion of the industrial control program;
      arbitration between the program requests and the operator requests comprises assigning, during runtime, control of the portion of the industrial control program to a selected one of the industrial control program or the human-machine interface based on the arbitration rules;
      a client interface component configured to exchange data with a configuration application that executes on a client device communicatively connected to the industrial controller; and
      a mode model configuration component configured to modify the mode model data in accordance with mode modal configuration data received from the configuration application via the client interface component.

2. The industrial controller of claim 1, wherein the mode model configuration data identifies a subset of available ownership modes that are to be used for arbitration between the program requests and the operator requests, and a subset of available transition commands for transitioning between the subset of the available ownership modes.

3. The industrial controller of claim 1, wherein the portion of the industrial control program comprises a state machine instruction that, in response to execution by the industrial controller, causes the industrial controller to control operation of the industrial asset in accordance with a state machine defined by the state machine instruction.

4. The industrial controller of claim 3, wherein
   the state machine instruction is configured to, in response to receipt of a control instruction identifying a destination state of the state machine, initiate transition of the industrial asset from a current state to the destination state via a pre-defined path between the current state and the destination state defined by the state machine instruction, and
   the current state and the destination state are non-adjacent states of the state machine.

5. The industrial controller of claim 1, wherein the industrial control program defines a multi-level group of related industrial assets that are monitored and controlled by the industrial controller, and the arbitration component is configured to arbitrate between program requests for control of the group of related industrial assets and operator requests for control of the group of related industrial assets.

6. The industrial controller of claim 5, wherein the arbitration component is configured to, in response to determining, based on the arbitration rules, that an operator request or a program request for control ownership of the group of related industrial assets is allowed, establish the control ownership for all industrial assets in the group of related industrial assets.

7. The industrial controller of claim 5, wherein the multi-level group of related industrial assets is defined in the industrial control program as an organize function block linked to a set of device function blocks representing the related industrial assets.

8. The industrial controller of claim 7, wherein the program requests and the operator requests for control of the group of related industrial assets are managed by an owner function block linked to the organizer function block.

9. The industrial controller of claim 1, wherein the mode model configuration data specifies a selected mode model of multiple pre-defined mode models that are selectable via the configuration application.

10. A method for configuring ownership arbitration for an industrial control system, comprising:
    receiving, by an industrial controller comprising a processor that executes an industrial control program, mode model configuration input defining a modification to a default mode model used by the industrial controller to arbitrate between program requests generated by the industrial control program and operator requests received from a human-machine interface for control of an aspect of the industrial control program, wherein
- the mode module configuration input comprises an indication of one or more ownership modes to be included in the modified mode model and transition conditions for transitioning between the one or more ownership modes, and
- the ownership modes comprise at least one of a Program mode that allows program control of the aspect of the industrial control program, an Operator mode that allows human-machine interface control of the aspect of the industrial control program, a Program Locked mode that locks program control of the aspect of the industrial control program, and an Operator Locked mode that locks human-machine interface control of the aspect of the industrial control program;

modifying, by the industrial controller, the default mode model in accordance with the mode model configuration input to yield a modified mode model;

receiving, by the industrial controller during runtime, one of a program request generated by the industrial control program or an operator request from the human-machine interface for control of the aspect of the industrial control program; and arbitrating, by the industrial controller, between the one of the program request or the operator request based on the modified mode model, wherein the arbitrating comprises assigning control privileges for the aspect of the industrial control program to a selected one of the industrial control program or the human-machine interface.

11. The method of claim 10, wherein the receiving the mode model configuration input comprises:
receiving one or more identities of a selected subset of available ownership modes to be used for arbitration between the program request and the operator requests; and
receiving identities of a subset of available transition conditions for transitioning between the selected subset of the available ownership modes.

12. The method of claim 10, further comprising receiving, by the industrial controller, equipment grouping input that selects a subset of industrial devices controlled by the industrial controller for inclusion in a multilevel equipment group,
wherein the arbitrating comprises arbitrating between the program requests and the operator requests for control of the multilevel equipment group.

13. The method of claim 12, wherein the receiving the equipment grouping input comprises receiving programming input that links a set of device function blocks representing the subset of the industrial devices to an ownership function block in the industrial control program.

14. The method of claim 13, wherein the receiving the equipment grouping input further comprises linking an ownership function block to the organizer, wherein the ownership function block manages the program requests and the operator requests for control of the multilevel equipment group.

15. The method of claim 10, further comprising defining, by the industrial controller as the aspect of the industrial control program, a state machine instruction that causes the industrial controller to perform control of an item of industrial equipment in accordance with a defined state machine,
wherein the arbitrating comprises arbitrating between the program requests and the operator requests for control of the state machine instruction.

16. The method of claim 15, further comprising:
in response to receiving a control instruction identifying a destination state of the state machine:
identifying, by the industrial controller, a current state of the item of industrial equipment;
identifying, by the industrial controller based on the state machine instruction, a path through the state machine from the current state to the destination state, wherein the current state and the destination state are non-adjacent states of the state machine; and
controlling, by the industrial controller, the item of industrial equipment to transition the item of industrial equipment from the current state to the destination state via the path.

17. The method of claim 10, wherein the receiving the mode model configuration input comprises receiving a selection of a pre-defined mode model from a set of pre-defined mode models defined on the industrial controller.

18. A non-transitory computer-readable medium having stored thereon executable instructions that, in response to execution, cause an industrial controller comprising a processor to perform operations, the operations comprising:
executing an industrial control program that facilitates control of industrial devices;
in response to receiving mode model configuration data defining a change to a default ownership mode model, modifying the default ownership mode model in accordance with the mode model configuration data to yield a modified ownership mode model, wherein the mode model configuration data defines ownership modes to be included in the modified ownership mode model and commands for transitioning between the ownership modes, and the ownership modes comprise at least one of a Program mode that allows program control of a portion of the industrial control program, an Operator mode that allows human-machine interface control of the portion of the industrial control program, a Program Locked mode that locks program control of the portion of the industrial control program, and an Operator Locked mode that locks human-machine interface control of the portion of the industrial control program; and
arbitrating, during runtime based on the modified ownership mode model, between program ownership requests for the portion of the industrial control program and operator ownership requests for the portion of the industrial control program received from a human-machine interface communicatively connected to the industrial controller,
wherein the arbitrating comprises selecting one of the industrial control program or the human-machine interface for control of the portion of the industrial control program based on the modified ownership mode model.

19. The non-transitory computer-readable medium of claim 18, further comprising receiving equipment grouping input that selects a subset of the industrial devices controlled by the industrial controller for inclusion in a multilevel equipment group,
wherein the arbitrating comprises arbitrating between the program requests and the operator requests for control of the multilevel equipment group.

20. The non-transitory computer-readable medium of claim 18, wherein the receiving the mode model configuration data comprises:
receiving one or more identities of a selected subset of available ownership modes to be used for arbitration between the program request and the operator requests; and
receiving identities of a subset of available transition conditions for transitioning between the selected subset of the available ownership modes.

* * * * *